United States Patent [19]
Griffith

[11] Patent Number: 5,495,093
[45] Date of Patent: Feb. 27, 1996

[54] SOLDERING APPARATUS PROCESSOR HAVING TEMPERATURE SELECTION, CALIBRATION AND HEATING CONTROL OF TIP

[75] Inventor: Robert C. Griffith, Woodland Hills, Calif.

[73] Assignee: Edsyn, Inc., Van Nuys, Calif.

[21] Appl. No.: 13,968

[22] Filed: Feb. 5, 1993

[51] Int. Cl.$^6$ .................................................... H05B 1/02
[52] U.S. Cl. ...................... 219/497; 219/505; 219/501; 219/481; 219/241; 219/233; 374/172; 323/235
[58] Field of Search .................................. 219/497, 499, 219/501, 505, 506, 481, 508, 233, 240, 241; 323/235, 236; 374/172, 173

[56] References Cited

U.S. PATENT DOCUMENTS

| | | | |
|---|---|---|---|
| 3,646,577 | 2/1972 | Ernst | 219/241 |
| 4,420,055 | 12/1983 | Grutzediek et al. | 177/212 |
| 4,595,816 | 6/1986 | Hall et al. | 219/121 CD |
| 4,698,774 | 10/1987 | Abe et al. | 364/477 |
| 4,775,775 | 10/1988 | Spigarelli et al. | 219/382 |
| 4,935,600 | 6/1990 | Paschschwall | 219/241 |
| 5,014,210 | 5/1991 | Postlewait et al. | 364/477 |
| 5,120,936 | 6/1992 | Shyu et al. | 219/497 |

Primary Examiner—Mark H. Paschall
Attorney, Agent, or Firm—Daniel T. Anderson

[57] ABSTRACT

A soldering system is disclosed having a stored program microcontroller by which one or more temperatures can be selected for a soldering iron tip. The system then automatically maintains such tip temperature during the soldering operation. The programmed microcontroller is coupled through input/output and interface circuits to a heating control that in turn is connected to the iron heater element for switching AC power in units of full waveform cycles across the element while the temperature of the tip is measured by a resistor sensor and an associated bridge measurement circuit so as to produce a signal that is applied to an input of the microcontroller forming a feedback loop. This causes the resistor sensor and hence the iron tip to reach the desired temperature. A thermocouple is provided for measuring and calibrating the actual temperature of the iron tip thus ensuring that the resistor sensor and associated feedback loop causes the microprocessor to drive the heater element as needed to cause the soldering tip to stabilize at the selected temperature. The external thermocouple probe may also be used separately and simultaneously with the soldering operation to ensure that the temperature of a probed component does not exceed a predetermined safe level.

17 Claims, 7 Drawing Sheets

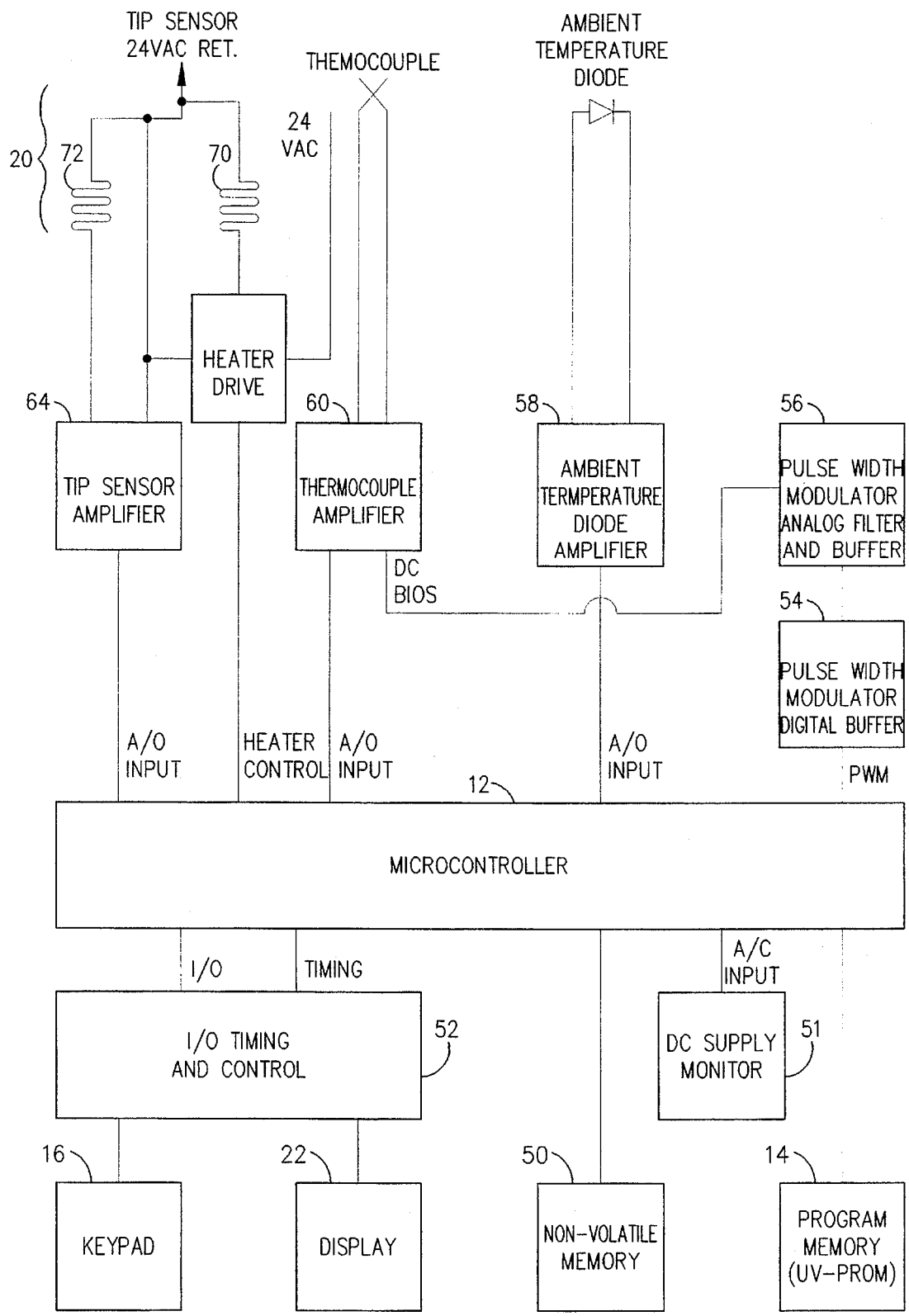
F I G. 1

PINS 2 & 3 TO
HEATER CONTROL
PINS 1 & 3 TO
SENSOR BRIDGE

SOLDERING APPARATUS PROCESSOR HAVING TEMPERATURE SELECTION, CALIBRATION AND HEATING CONTROL OF TIP

BACKGROUND OF THE INVENTION

This invention relates generally to the field of electrical control of electrically energized soldering devices and, more particularly, to a computer processor for selecting, calibrating and controlling heat to the tip of a precision soldering iron.

Although aspects of the present invention may be applied to a variety of soldering systems, it is particularly applicable to selecting and controlling the heat at the tip of a soldering tool used for precision soldering of electrical and electronic joints, especially in the environment of heat sensitive electronic components. Solid state devices, including large scale integrated circuits known as computer and digital "chips" are examples of such heat sensitive devices.

A number of devices and systems for controlling the temperature of soldering devices have been proposed, including the above-identified prior application, Ser. No. 07/749,659, of the present inventor; however, there remain operational aspects which need improvement and additional features are desired that cannot be implemented in hardware circuitry. For example, in precision soldering of miniature circuitry, especially when the soldering joints are near heat sensitive components which can be destroyed by inadvertent overheating, precision control of the temperature at the tool tip is critical. This temperature control at the to-be-soldered junction, as well as in the adjacent circuit components, is not easily achieved using conventional soldering technology.

For example, while systems have been developed which allow the user to select a desired tip temperature using a dial or other user control, often times the actual tip temperature of the iron does not match the dial selected temperature. There could be a variety of reasons for this, including lack of calibration of the thermoelectrical characteristics of the heating device and temperature feedback measurement, lack of precision of analog temperature selection dials which are susceptible to parallax error when trying to match the index mark on the control knob to the temperature graduations, and absence of precision calibration of the apparatus to a known temperature standard over the entire thermal range. While the parallax error can be alleviated in devices that have a digital readout, equipment that is equipped with such readouts often does not have the precision calibration and feedback control needed to provide a reliable correspondence between the displayed selected temperature on the readout and the actual tip temperature of the soldering tool.

In those prior art devices which have calibration procedures, often times the difficulty and excessive time required for the calibration process detracts from optimum maintenance and precision of the equipment.

Still other shortcomings of existing soldering control equipment are the lack of security over the temperature settings and calibration parameters, inflexibility in the soldering control to adapt quickly to different soldering tips which are likely to have diverse thermoelectric properties, and the need for the station to quickly change from one to another of several pre-established temperature settings for soldering joints having scheduled, critical temperature set points. Other drawbacks of certain prior art equipment include the inability to retain in memory temperature settings and calibration constants generated from prior soldering procedures. Thus, for example, in a multi-temperature, multi-tip soldering procedure, it would be desirable to store the various control parameters overnight or between shifts to avoid resetting the instrument at the start of work each day or shift. Furthermore, it would be desirable to prevent others from changing these settings without proper authorization.

SUMMARY OF THE INVENTION

Thus, in accordance with the preferred and exemplary embodiment of the invention, a soldering system having a stored program processor is provided in which one or more temperatures of a thermoelectric load, such as the heating element and associated tip of a soldering iron, can be selected. The system then automatically maintains such temperature during the soldering operation. In the preferred embodiment, the processor is a microcontroller means, the operation of which is governed by a stored program in a PROM. The programmed microcontroller is coupled through input/output and interface circuits to a heating control that in turn is connected to the thermoelectric load for driving the load to a temperature selected and entered on a keypad. The temperature of the tip is measured by a resistor sensor and associated bridge measurement circuit so as to produce a signal that is applied to an input of the microcontroller forming a feedback loop. This causes the resistor sensor and hence the iron tip to reach the desired temperature.

Also, in the preferred embodiment, a thermocouple is provided with the soldering station for measuring and calibrating the temperature of the actual tip of the iron thus ensuring that the resistor sensor and associated feedback loop causes the microprocessor to drive the thermoelectric load as needed to cause the soldering tip to stabilize at the selected temperature.

Still another and related aspect of the preferred embodiment is that the external thermocouple probe may be used independently and simultaneously with the soldering operation by touching the thermocouple probe to any heat sensitive component or surface near the joint being soldered to ensure that its temperature does not exceed a predetermined safe level for adjacent components.

Other aspects of the preferred embodiment include the provision for a plurality of precision calibration processes and associated circuits for developing the control and measurement signals for such calibration processes. First, a low level amplifier means capable of measuring microvolts is provided as part of the input circuit to the microcontroller for measuring the output voltage of the external thermocouple. To calibrate this low voltage amplifier circuit and remove an offset voltage inherent in low voltage amplifier design, a calibration procedure is selected by a user entry on the keypad to bias out the low voltage offset on the thermocouple amplifier using a pulse width modulated output of the microcontroller. The thermocouple itself is also calibrated over its range of temperature values, for example, from 75° F. through 900° F. by a software driven menu that instructs the user to place the external probe thermocouple on a temperature standard, and successfully setting the standard to temperatures prompted on a display screen of the soldering station. Once the thermocouple has been calibrated, which may be needed only once a month or less frequently, a resistor sensor embedded in the soldering tip as a tip sensor, is calibrated by an automatic multi-temperature calibration routine that is simply started by user selection on the keypad and is henceforth carried out without user operations automatically as described more fully below.

Following calibration, the desired tip temperature setpoint is entered on the keypad. Thereupon, the microcontroller receives at one of its A/D conversion inputs the measured resistor sensor resistance and with scaling from stored calibration constants, drives the thermoelectric heater by a heater element drive TRIAC circuit under control of the microcontroller to the selected tip temperature.

For multiple component soldering procedures, the user enters a plurality of preselected temperatures so that you need not memorize each of the temperatures required for a given multi-step process. By merely responding to menu prompts on the display the user quickly switches from one preselected temperature to another during the soldering procedure. Likewise, a plurality of different soldering iron tips and their associated thermo calibration characteristics are stored and retrieved by the microcontroller with the user keypad without requiring recalibration of the soldering iron each time its tip is changed. The preselected temperatures, tip memory calibration constants, and other changeable operating characteristics are safely stored in a non-volatile RAM device provided in the preferred embodiment and interfaced to the microcontroller for retaining these values when the power is turned off and for reinitializing the microcomputer or microcontroller when turned on.

Still another aspect of the preferred embodiment is to provide a security code routine in the microprocessor software enabling a supervisor or other person of authority to lock the device against changes to the various temperature and tip memory settings. The lock is releasable only upon entering the proper security code.

For the convenience and compactness of the soldering station, once the various temperature and tip selections are made on the station keypad, the user places over the keypad a protective cover that is formed with a recessed tray holding a tip-wiping sponge, and an iron holder is supported on top of the unit above the digital display for resting the iron when not in use. The front of the soldering station housing includes a receptacle into which the external thermocouple plugs into for either the calibration procedures described above or for using external thermocouple probe as a temperature measuring instrument during the soldering process.

It is thus seen that a very powerful computer processor regulates the temperature of the soldering tip to great precision and accommodates a very flexible schedule of temperatures and tips as well as provides for quick and highly accurate thermocouple calibration of the apparatus.

These and further features, objects and advantages of the invention will become apparent to those skilled in the art from the following detailed description and appended drawings.

BRIEF DESCRIPTION OF THE DRAWINGS

FIG. 1 is an overall block diagram of the soldering station equipped with a microcontroller governed by a stored program and interfaced through input/output ports to the various circuitry and to the soldering iron itself, which includes a thermoelectric load (or heater) and a temperature sensor (resistor).

DETAILED DESCRIPTION

Figure 2:
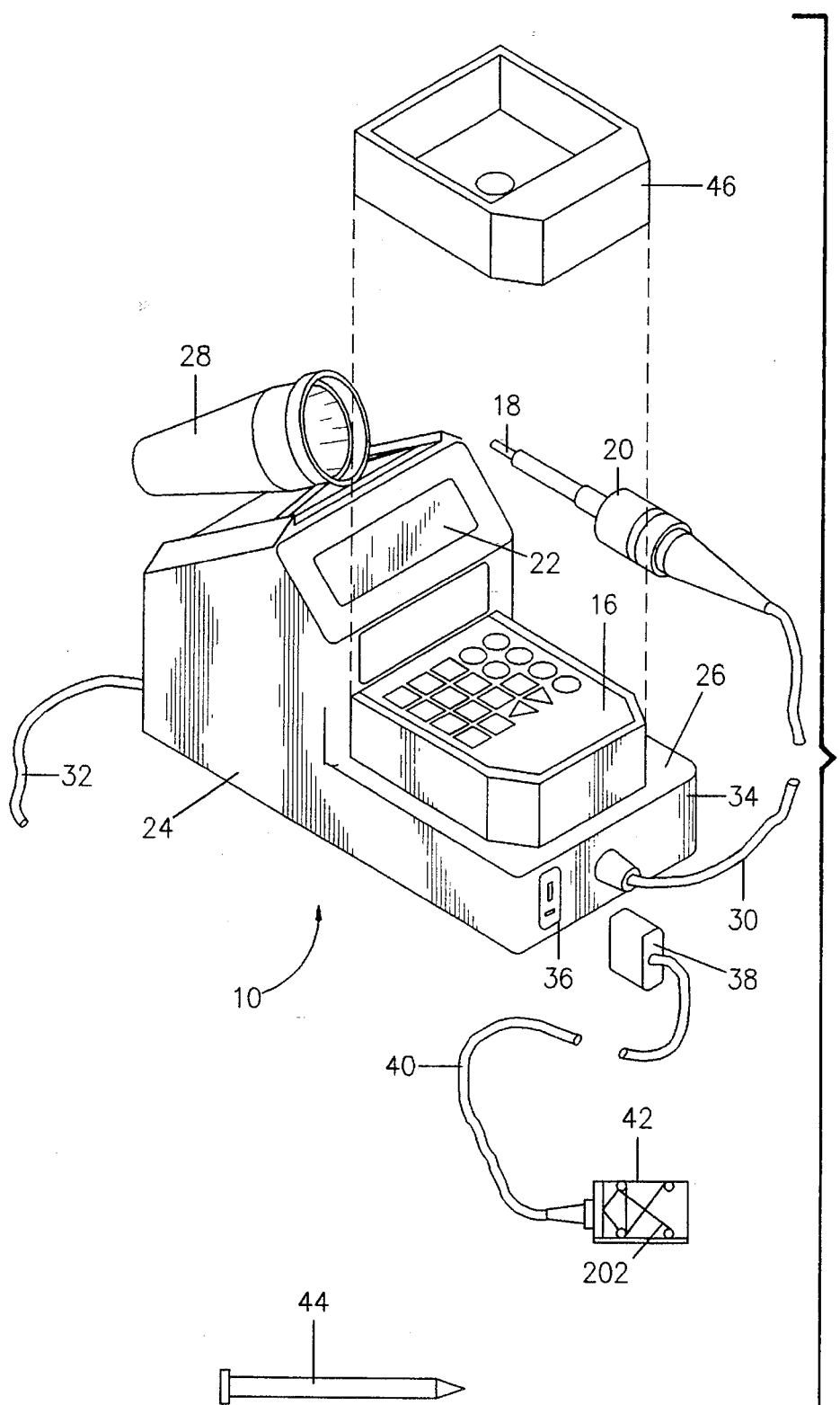
FIG. 2 is an isometric view of the exterior appearance of the soldering station showing the keypad in a horizontal plane at the front of the unit, a digital LCD display sitting in a generally vertical but somewhat rearwardly, upwardly inclined plane and a cylindrical holder supported on top of the station housing for receiving the soldering iron when at rest.

With reference to FIGS. 1 and 2, a soldering apparatus 10 (FIG. 2) contains a built-in microprocessor or microcomputer provided in the preferred embodiment by microcontroller 12 (FIG. 1) having a stored program contained in program memory 14. In response to user entries on a keypad 16 (FIGS. 1 and 2), the processing of microcontroller 12 affords temperature selection, calibration, and heating control of tip 18 of soldering iron 20. The operating conditions, including temperature selection, tip type, calibration steps and operating performance including heating element duty cycle, are presented to the user in a convenient LCD digital diplay 22 (FIGS. 1 and 2). Apparatus 10 as shown in FIG. 2 includes a housing 24 having a regular polygon base with a front porch 26 on which keypad 16 sits to present a horizontal array of user keys, and toward the rear of the polygon base an integral portion of the housing rises vertically to mount in a generally vertical but rearwardly and upwardly inclined plane the digital display 22. On a rearwardly and downwardly sloping top surface housing 24 mounts a generally cylindrical soldering iron holder 28. Soldering iron or device 20 is coupled to the electrical circuits of apparatus 10 by a heater and sensor lead cord 30 and the entire apparatus is powered by standard AC current via a power cord 32. At a front panel 34 of housing 24, a thermocouple attachment receptacle 36 removably accepts a plug 38 that is connected over a cable 40 to the crosswires of a thermocouple temperature measuring device 42 for the iron tip, or optionally to an elongated thermocouple general use probe 44. Thermocouple device 42 is configured to measure the actual tip temperature of device 20 by placing tip 18 at the crosspoint of the thermocouple wire junction for calibration purposes and the optional probe 44 is used as described below in a temperature measuring method during the soldering process. A generally rectangular cover 46 fits over keypad 16 and provides a tray recess on the upper surface for holding a tip-cleaning sponge. Cover 46 is simply pulled off of the apparatus to access keypad 16.

Figure 7:
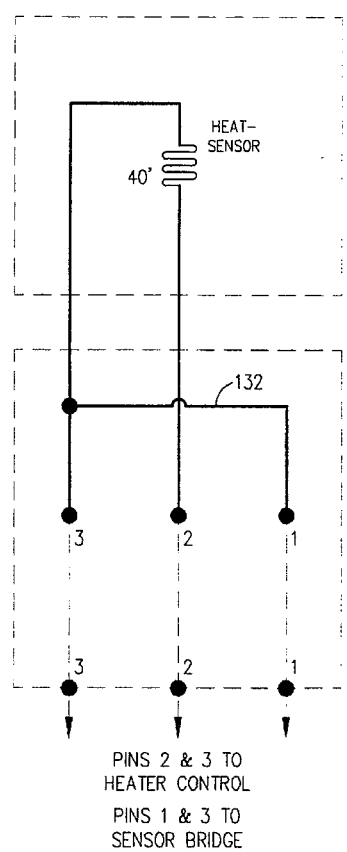
FIG. 7 shows an alternative embodiment of the thermoelectric load (heater) element and temperature sensor (resistor) for a different soldering iron configuration.

All of the electronics, including the power supply, are contained within housing 24 and may be mounted on a printed circuit board (not shown) for ease of assembly and repair. With reference to FIG. 1, microcontroller 12, program memory 14, here in the form of an IUV erasable programmable ROM (or PROM), a non-volatile memory 50, IO timing and control 52, pulse width modulator digital buffer 54 and an associated pulse width modulator analog filter and buffer 56, ambient temperature diode amplifier 58, thermocouple amplifier 60, heater driver 62 and tip sensor amplifier 64, and a DC supply monitor 51 are all contained as discrete or large scale integrated circuitry within housing 24 to select, regulate and calibrate the temperature of the soldering device 20, and to measure temperature using thermocouple probes 42 and 44. Other functions are provided as described more fully below. The temperature of tip 18 of soldering device 20 is obtained by driving a thermoelectric load or heater element 70 contained within the protruding cylindrical nose of device 20. Mounted in close proximity to element 70 on device 20 is a tip sensor element 72 in the form of a resistor sensor which, as indicated in FIG. 1, is combined in a circuit with heater driver 62 and tip sensor amplifier 64. An alternative configuration uses a single resistive element for both heater and sensor functions as shown in FIG. 7.

Figure 3A:
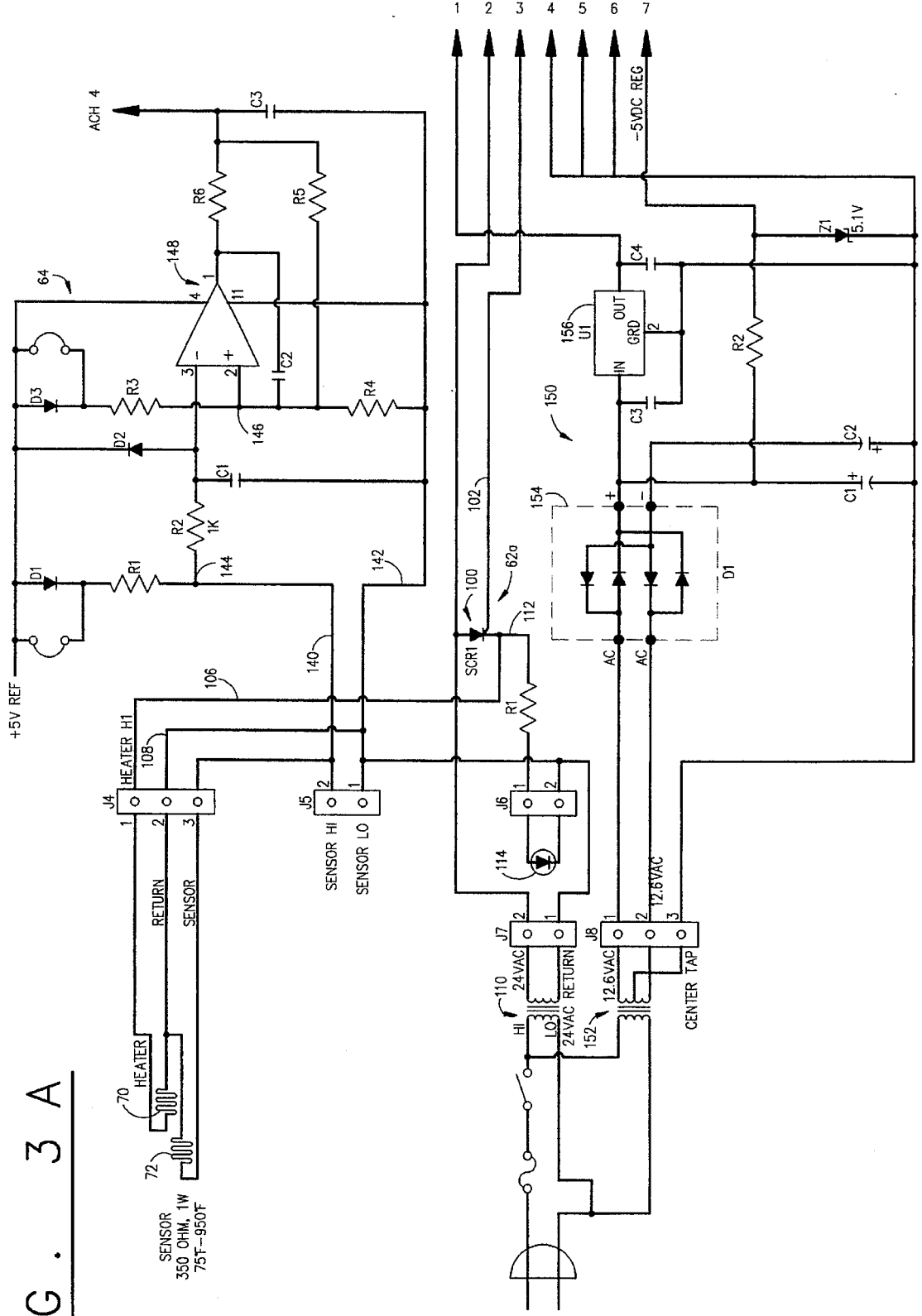
FIGS. 3A and 3B together are a detailed circuit schematic illustrating the preferred power supply, thermoelectric load (heater element), and associated TRIAC drive circuit, the sensor element (resistor) and associated bridge measuring circuit, optical isolator circuit for triggering the TRIAC heater switch, and non-volatile RAM for storing settings and calibration factors, all connected to various input and output ports of the microcontroller.
Figure 3B:
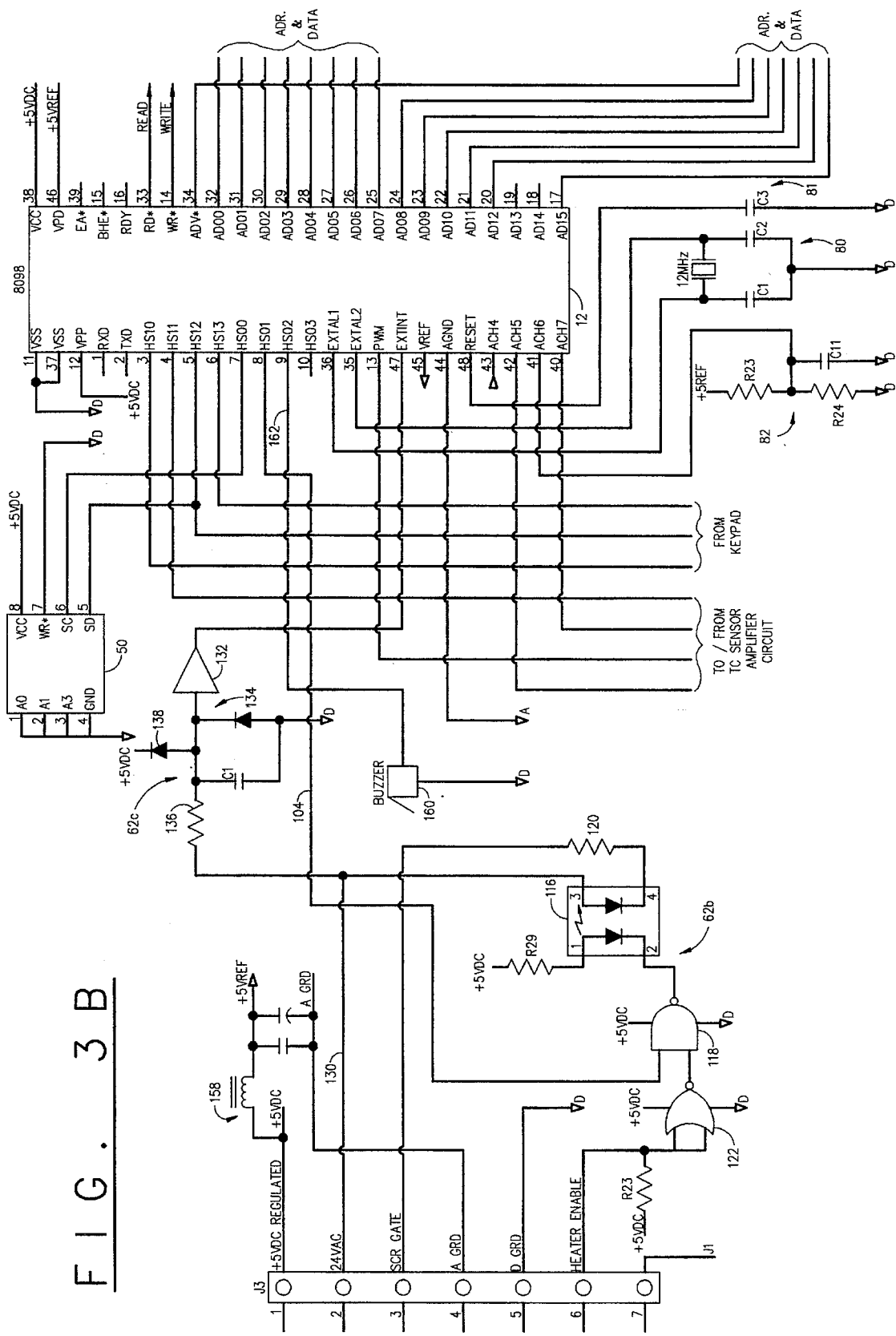

With reference to FIGS. 3A and 3B, the microprocessor, or it can be called a microcomputer, of apparatus 10 is, in the preferred embodiment, an 8098 microcontroller available from Intel Corporation of Santa Clara, Calif., and includes in addition to the basic microprocessor functions an internal RAM, A-to-D 10 bit conversion, pulse width modulation (PWM) output and A/D multiplexing. A crystal controlled clock circuit 80 regulates the basic clock timing of microcontroller 12 and a divider filter circuit 82 provides a reference DC input to an A-to-D converter input 41 of microcontroller 12 for monitoring power supply level. The microcontroller is reset on powerup by reset compacitor 81.

Heater drive 62 is shown in FIGS. 3A and 3B as TRIAC switching circuits 62a and an electro-optical isolator and logic circuit 62b. TRIAC switching circuit 62a includes a TRIAC device 100 having a lead 102 that is triggered through the electro-optical isolator and logic circuit 62b in response to trigger timing output signals from microcontroller 12 over lead 104. The timing of these triggers is software controlled so as to cause the anode-cathode main current channel of TRIAC 100 to conduct full cycles of a 24 volt AC source through heater element 70 over a lead 106, denoted heater hi, and a return lead 108 connected across a 24 volt unfiltered secondary of a 24 volt power supply transformer 110, the primary of which is connected to standard alternating current supply. The cathode lead 112 of the TRIAC 100 is also connected through a resistor R1 and terminal junction J6 across an LED indicator 114 to display the powered condition of heater 70 when switch TRIAC 100 is triggered on. Circuit 62b includes electro-optical isolator 116 in which the control input terminal 2 receives a logical low signal from NAND gate 118 in response to the output of microcontroller 12 over lead 104. Isolator 116 through the optical communication path drives the TRIAC gate through resistor 120 and trigger lead 102 switching the TRIAC "on" at times determined by the software program operating microcontroller 12 and a zero crossing detector circuit 62c to ensure switching only at the zero crossings of the 60 cycle 24 volt AC power source. The number of full cycles of 24 volt AC power delivered by the switched TRIAC to the heater element 70 is also determined by the software program operating microcontroller 12 in response to the feedback control loop using tip sensor 72 and a bridge measurement circuit 64 described below. Electro-optical isolator 116 prevents interference between the relatively high current switching operations of TRIAC 100 and the sensitive low level logic and control signals associated with the microcontroller 12. NAND gate 118 is normally enabled to respond to the high speed output HS01 from microcontroller 12 over lead 104 by an inverter 122 having a heater enable signal through terminal 6 of J3 to power supply ground. This can be disabled by opening the ground lead to disable NAND gate 118 and hence prevent triggering of the electro-optical isolator for trouble shooting and test purposes only. Normally, NAND gate 118 is enabled for all normal operating conditions.

While the TRIAC triggering circuit through electro-optical isolator 116 determines the actual triggering time duration, a zero crossing detector circuit 62c of the heater drive 62 monitors the 24 volt AC source over lead 130 and applies an interrupt at external interrupt terminal 47 of microcontroller 12 to initiate the heater cycle as well as initiate measurement of tip sensor 72. For this purpose, cross-over detector circuit 62c includes a CMOS logic buffer 132 having an input connected to a parallel capacitor diode network 134 coupled through an input resistor 136 to the 24 volt AC lead 130. A clamping diode 138 connected to positive 5 volt DC limits the voltage swing at the input to buffer 132. In operation, circuit 62c looks at the 24 volt alternating current cycle and whenever the voltage level relative to ground D drops below 2 volts, the output of buffer 132 goes low, and when the AC waveform climbs above 2 volts the high going output of CMOS buffer 132 triggers the external interrupt. The heater drive subroutine of microcontroller 12 as described further below takes over and provides the necessary timing for ensuring that an integral number of full cycles of AC heater voltage are applied to the heater by operating TRIAC 100 through the electro-optical isolator 116 in response to high-speed output 01 over lead 104 as described above. In other words, the zero crossing detector circuit 62c, in combination with the internal timing of microcontroller 12, establishes the proper turn on/turn off time of the heater element 70. The switching of TRIAC 100 occurrs at substantially zero crossing (i.e., less than 2 volts) to minimize switching transient and hence safeguard the sensitive digital and analog circuitry from unwanted biasing and switching noise.

Turning now to the tip sensor amplifier shown as circuit 64 in FIG. 3a, a balanced bridge formed on one side by the legs of resistor R1 and the resistance of resistor sensor 72 with the other branch legs of the bridge being resistors R3 and R4. Sensor 72 is connected via terminal J4 over leads 140 and 142 as indicated. A voltage appearing across the bridge between junction 144 and 146 causes an input to terminals of IC amplifier 148 having associated RC feedback and filtering consisting of C1, R2 and C2, R6 and R5, and C3. The bridge output representing the resistance of resistor sensor 72 and hence, when calibrated and scaled, the temperature of the soldering iron tip is applied as an analog signal to A-to-D converter input ACH4 at terminal 43 of microcontroller 12. When the heater is used as the sensor, as shown in the alternative embodiment of FIG. 7, the shunt around Diode D1, appearing in FIG. 3A, is removed so that Diode D1 is placed in the bridge circuit to prevent the heater voltage from being applied through the sensing bridge to the 5 volt reference. Diode D3 shunted in FIG. 3B in the other branch of the bridge is likewise placed in the circuit by removing the shunt for the embodiment of FIG. 7 to balance out the voltage drop across D1, equalizing the branches of the bridge.

The DC power source is provided by supply circuit 150, including a step down transformer 152, full wave diode rectifier network 154, IC regulator 156 and filter capacitors C1, C2, C3, C4, resistor R2 and a regulator zener diode Z1. To isolate the electro-optical TRIAC trigger circuit from bridge sensor amplifier circuit 64, separate grounds are used, a ground A for the bridge circuit, and a ground D for the digital and TRIAC switching circuit, in which ground A is associated with a separately filtered and choked 5 volt reference provided by filter circuit 158, and this 5 volt reference is monitored by an A-to-D converter input to microcontroller 12 as described above in connection with reference source circuit 82.

With further reference to FIG. 3B, a non-volatile RAM holding 256 bytes of data allows apparatus 10 to store temperature settings, tip types and the associated calibration parameters and to retain this data without battery backup when the unit is turned off or disconnected from power. Non-volatile RAM 50 receives data in serial form at SC and SD inputs at pins 6 and 5, respectively, from the high speed HS data outputs HS 12 and HS 0 of microcontroller 12. The storage operation of nonvolatile RAM 50 is controlled by the software program of microcontroller 12 as explained below in the software description.

In a preferred embodiment as shown in FIG. 3B, apparatus 10 is equipped with an audible alarm in the form of a buzzer 160 that is activated on command by the software program operating microcontroller 12 at high speed port HS 02 over line 162 as indicated. Buzzer 160 may be sounded when the stored program in microcontroller 12 executes alarm subroutines, such as monitoring a selectable temperature threshold. Also, it may be actuated to provde an audible user feedback when the various calibration steps are executed by the microcontroller as described herein.

Figure 4:
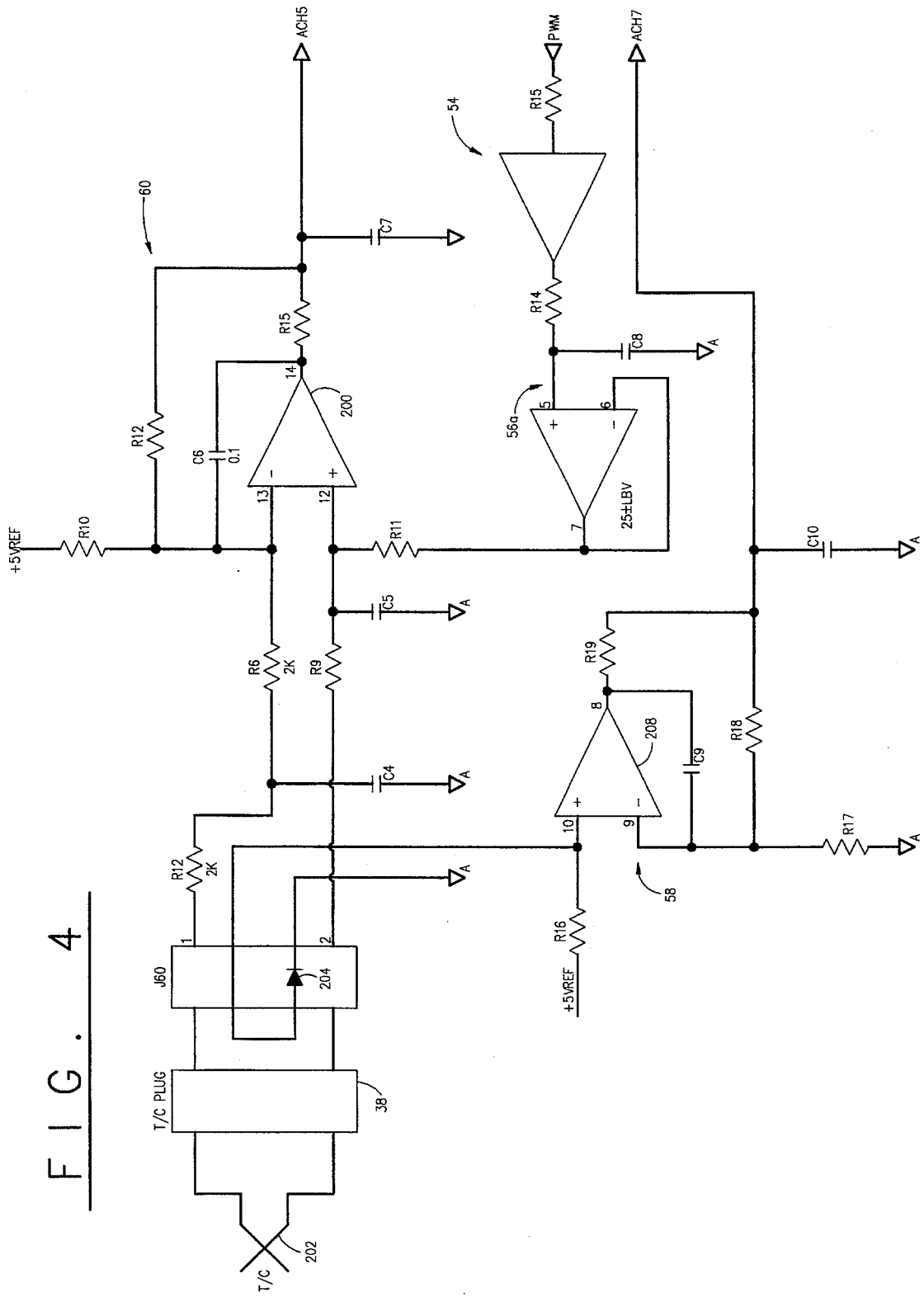
FIG. 4 is a detailed schematic circuit of the external thermocouple probe and its temperature sensing circuit, including a low voltage amplifier and microcontroller adjusted bias amplifier for calibrating the low voltage amplifier, all under the control of the microprocessor through input/output ports having internal A-to-D conversion.

The thermocouple and associated biased amplifier circuit, including ambient temperature compensation, is shown in a preferred configuration in FIG. 4 as thermocouple amplifier 60 having the main TC amplifier output at lead ACH5 which goes to an A-to-D converter port at pin 42 of microcontroller 12 as indicated in FIG. 3B. The ACH5 output is provided by one of four amplifier components in an integrated circuit here being amplifier 200 including RC feedback network of R12 and C6, biasing resistor R10 and output filter formed by R15 and C7 connected to output terminal 14. The input terminals 12 and 13 of amplifier 200 are connected in a balanced configuration through a pair of input resistors R6 and R9, through an RC filter of R4 C4 to the terminal strip J60 that in turn is connected to the thermocouple plug 38. The crossed wires that form the actual thermocouple junction 202 are shown on tip probe 42 of FIG. 2 and the leads from this junction extend through plug 38 to the terminal strip 60 at contacts 1 and 2. The terminals 1 and 2 at junction J60 form an additional second order thermocouple effect due to the dissimilar contact metals and it is at this location that an ambient temperature compensating diode 204 is placed in direct proximity with the contact junctions at terminals 1 and 2. The voltage across compensating diode 204 is measured through a compensating amplifier 58 to produce an ambient correction voltage at ACH7 which is converted to digital form by the internal A-to-D conversion port in microcontroller 12 and used in software to provide an ambient temperature correction to the measured signal value of the thermocouple output that is available at ACH5 from amplifier 200. As illustrated, compensating amplifier 58 includes another operational amplifier 208 of the IC having the non-inverting input connected to diode 204 and biased by a +5 volt reference through R16 with the resulting output available at pin 8. Feedback RC filtering for amplifier 208 includes R19, C9, R18 and C10 as well as a biasing resistor R17 connected to the inverting input at pin 9.

Because the thermocouple amplifier 60 must measure a relatively low level signal on the order of microvolts across the thermocouple junction 202, the amplification is relatively high and includes offset error due to the inherent characteristics of amplifier 200. For this purpose, it is necessary to generate a calibrated bias signal at the non-inverting input at pin 12 of amplifier component 200 to remove this offset and for this purpose as shown in FIG. 1, a pulse with modulator digital buffer 54 receiving a software generated PWM (pulse width modulation) output from microcontroller 12 creates an adjustable bias after filtering and buffering by filter and buffer 56 which as shown in FIG. 4 is then applied through biasing resistor R11 to pin 12 of amplifier component 200. The PWM output of microcontroller 12 is adjusted in software as described more fully below in connection with the description of the calibration software by writing a selectable number to a register that forms a ratio with a fixed number such as 256. The resulting adjustable duty cycle signal forms a pulse width modulated output that is then buffered and filtered to form a steady state regulated DC signal at pin 12 of amplifier component 200 that forms the thermocouple amplifier bias. It is necessary to calibrate this bias from time to time to eliminate drift in other time and temperature dependent variables, and this adjustment is performed as explained below as the amplifier bias calibration.

Figure 5:
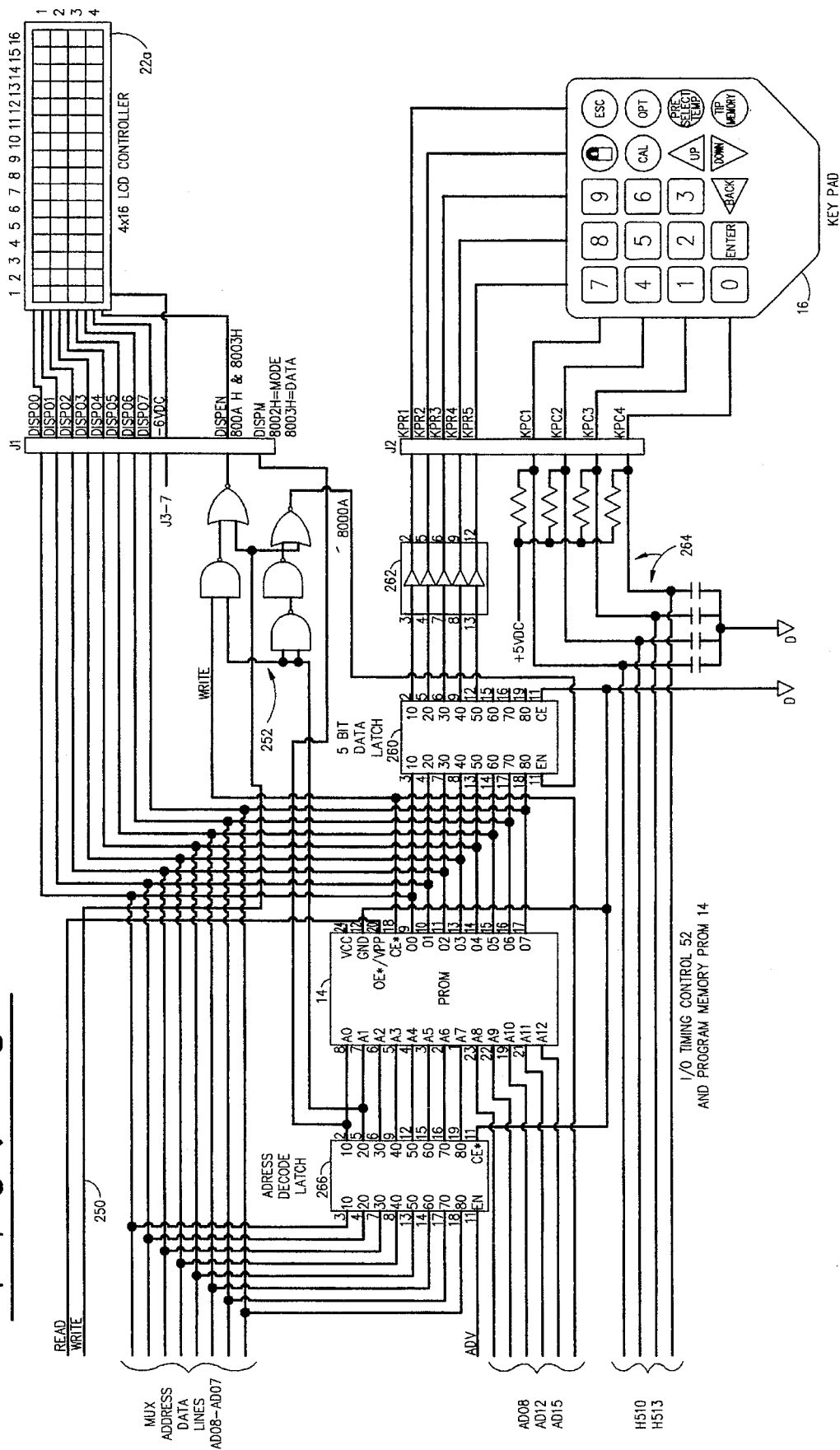
FIG. 5 is a simplified diagram showing the stored program memory (PROM) governing the operation of the microprocessor, and address decoding and data latching for polling user entries on the keypad and displaying data on the LCD.

With reference to FIG. 5, the microcontroller 12 is interfaced with a 4×16 LCD controller 22a that is integrated with the actual LCD visual display 22 (see FIGS. 1 and 2) and is written to by data on multiplexed addressed data lines AD00 through AD07. A write signal at the write output of the microcontroller is passed over lead 250 to decode logic 252 that selectively writes data to each of 16 columns by sequential timing signals on control lead DISPEN. Controller 22a retains in its internal memory (not separately shown) the columnar and row data written from the microcontroller to generate the various user interface and prompt screens presented on display 22 of apparatus 10 in FIG. 2. Additionally, as shown in FIG. 5, keypad 16 is polled by the microcomputer 12 using a 5 bit data latch 260 which has 5 outputs that act through a 5 channel buffer 262 to poll each of the 5 rows of keys on keypad 16 to sense key actuation. If any one of the keys of the polled column is touched by the user, the corresponding output is generated over row leads KPC1 through KPC4 which are shaped by an RC network indicated at 264 and are read by the high speed data ports HS10–HS13 of microcontroller 12 for execution of the user entered commands in software.

The stored program memory for governing the operation of microcontroller 12 is stored in a PROM 14 having its address and data terminals connected respectively to the 8 bit multiplexed address-data lines AD00–AD07 in cooperation with address decode latch 266. The address pins A8–A12 are connected to the corresponding address lines of microcontroller 12 to augment the addressing of PROM 14 to output the multiplexed 8 bit data onto lines AD00–AD07 as illustrated.

Figure 6:
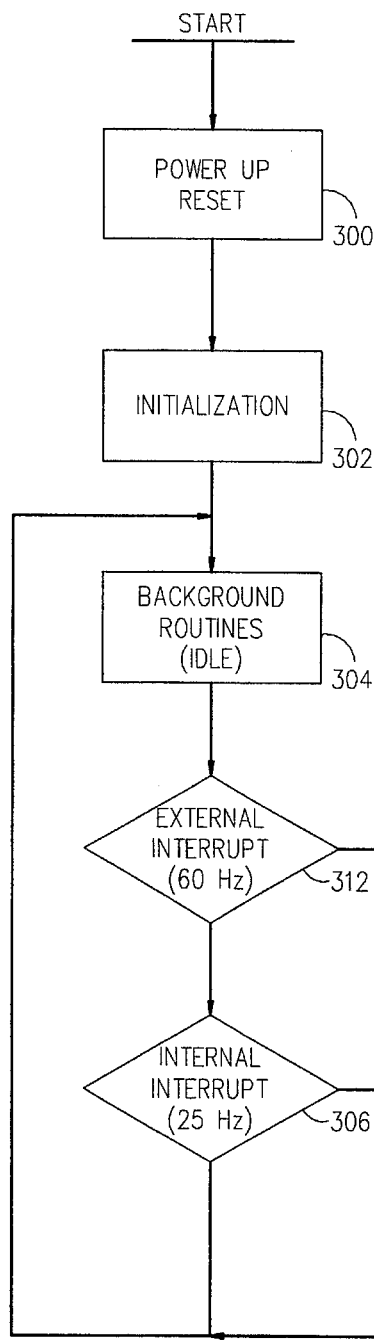
FIG. 6 is a simplified flow diagram of the software programming and operation of the soldering apparatus processor provided by a programmed microcontroller.

With reference to FIG. 6, the stored program in PROM 14 is loaded into an internal RAM of microcontroller 12 and the operation of the soldering apparatus is carried out in accordance with the simplified flow diagram of software in the following manner. At start, a power-up of the apparatus causes the microcontroller 12 to be reset at 300 by a capacitor reset circuit 81 shown in FIG. 3b and connected to the reset terminal of microcontroller 12. Then, at 302, the apparatus is initialized by loading the program from ROM 14 into internal RAM and loading the various temperature settings, tip styles and related calibration constants from non-volatile RAM 50 into the internal memory of microcontroller 12 as well as initializing the microcomputer interrupts, software registers and routines including display and keypad circuits. Thereafter, at 304, the microcontroller begins cycling through a series of background subroutines including the setting of a 25 hertz timer for internal interrupt and enabling the internal and external interrupts which continues repetitively in a background idle mode until one of two interrupts occurs.

The first of the interrupt is an external interrupt at 312 occurring at zero crossing of the alternating current heater waveform, in this instance being at a 60 Hz cyclic rate on the positive zero crossing. A second interrupt at 306 occurs every 25 Hz according to an internal timing subroutine. Assuming for the moment that the first interrupt occurs at the 25 Hz rate, this internal interrupt diverts the software programming flow to carry out LCD display writing and keyboard polling subroutines at 308 and 310, which upon completion return the program flow to the background idle loop 304. Thus, 25 times a second the display and keyboard subroutines are called for and executed so that the apparatus displays all the pertinent screen data on display 22 as required by the program as well as monitors keypad 16 for user commands.

The external interrupt at 312 occurs once every 60 Hz at the time of the alternating current zero crossing detected by circuit 62c as described above. This interrupt at 312 then diverts the programming control of microcontroller 12 to implement a heater control subroutine at 314 and a tip sensor measurement subroutine at 316. Upon completion of these subroutines, the control is returned to the background idle mode at 304. More specifically, the initialize, idle and interrupts are described as follows:

Digital Soldering Iron Software Flow

Initialize chip
  Disable interrupts
  Clear pending interrupts
  Initialize stack pointer
  Initialize interrupt mask
    External interrupts
    Software timers
  Initialize High Speed Input mode
  Initialize IOC0 (8098 ucontroller I/O)
  Initialize IOC1 (8098 ucontroller I/O)
Initialize software registers
  Keyboard constants
  Miscellaneous constants
Initialization routines
  Initialize display mode
  Initialize display sceen1 (main mode)
  Read bias from non-volatile RAM
  Read tip number from non volatile RAM
    Test if tip is in a valid range (out of range if new non-volatile RAM) If out of range initialize to nominal values.
  Read set temperatures from non-volatile RAM
    Test if set temperatures are in a valid range (out of range if new non-volatile RAM). If out of range initialize to nominal values.
  Read selected tip constants from non-volatile RAM
    Test if tip constants are in a valid range (out of range if new non-volatile RAM). If out of range initialize to nominal values.
  Read thermocouple constants from non-volatile RAM
    Test if thermocouple constants are in a valid range (out of range if new non-volatile RAM). If out of range initialize to nominal values.
  Read last set temperature.
Control segment
  Set software timer to interrupt at a 25 hertz rate
  Enable interrupts
  Loop on self (idle loop while waiting for interrupts)
  Set software timer to interrupt at a 25 hertz rate
  Output sync pulse for test purposes
  Scan keyboard
  Test if new keypressed (debounce logic)
  Is the automatic amplifier bias flag set?
    Yes: run automatic amplifier bias routine
    No: continue to Scale thermocouple
  Scale thermocouple
  Is the automatic thermocouple couple scaling flag set?
    Yes: run automatic thermocouple scaling routine
    No: continue to Is automatic tip scaling flag set
  Is automatic the tip scaling flag set?
    Yes: run automatic tip scaling routine
    No: continue to Refresh displays
  Refresh displays
    Is the main mode active?
      Yes: Update entry line (1)
        Update set line (2)
        Update tip temperature line (3)
        Is power flag set?
          Yes: Update power indicator line (4)
            Continue to Has a new key been pressed?
          No: Update power off message line (4)
            Continue to Has a new key been pressed?
      No: continue to Is the calibrate mode 1 active?
    Is the calibrate mode 1 active?
      Yes: Is the tip automatic calibration active?
        Yes: Update set temperature line (2)
          Update tip temperature line (3)
          Update thermocouple temperature line (4)
          Continue to Has a new key been pressed?
        No: Update tip temperature line (3)
          Update thermocouple temperature line (4)
          Continue to Has a new key been pressed?
      No: Continue to Is the calibrate mode 2 active?
    Is the calibrate mode 2 active?
      Yes: Is the thermocouple automatic calibration active?
        Yes: Update test temperature request line (3)
          Update thermocouple temperature line (4)
          Continue to Has a new key been pressed?
        No: Update thermocouple temperature line (4)
          Continue to Has a new key been pressed?
      No: Continue to Is the calibrate mode 3 active?
    Is the calibrate mode 3 active?
      Yes: Update thermocouple bias line (4)
        Continue to Has a new key been pressed?
      No: Continue to Is the main option 5 active?
    Is the main option 4 active?
      Yes: Update entry line (1)
        Update set temperature line (2)
        Update tip temperature line (3)

Update thermocouple temperature line (4)
    Continue to Has a new key been pressed?
    No: Continue to Is the main option 5 active?
Is the main option 5 active?
    Yes: Update thermocouple temperature line (3)
        Continue to Has a new key been pressed?
    No: Continue to Has a new key been pressed?
Has a new key been pressed?
    Yes: Continue to mode select test routine
        Assemble keypad number if mode not selected
        Continue to Reset test sync pulse
    No: Continue to Reset test sync pulse
Reset test sync pulse
End Timer 1 rate service
Digital Soldering Iron Software Flow
Interrupt at sixty hertz rate (at positive crossover transition)
    Turn off heater (redundant for safety)
    Delay 400 nsec before reading A/D (to allow time for TRIAC to turn off)
    Process A/D channel 5 (thermocouple)
        Filter A/D channel 5
    Call heater controller (HEATER_CNTL:)
    Process A/D channel 6 (2.49 volt reference)
    Process A/D channel 7 (ambient temperature diode)
        Filter A/D channel 7
End sixty hertz rate service

Heater Control Subroutine

The heater is controlled at a rate of 40/(input power frequency) in hertz. This gives a 40/60 or ⅔ hertz rate for sixty hertz and 40/50 or ⅘ rate for 50 hertz. The following example assumes a sixty hertz standard power source.

The number of cycles of heater power at each interval of control rate is equal to percent of heater power×40.

The heater is controlled by measuring the temperature error then outputing one cycle of heater power for one degree of temperature error. A temperature error of 40 degrees would output 40 cycles of heater power each control cycle (⅔ hertz) or 100 percent duty cycle.

If the heater is consuming 10 cycles of power (25 percent duty cycle) each control cycle, then a temperature offset of 10 degrees would result. To correct for this offset a correction term is computed by slewing a correction integrator (register) until the sum of the output temperature+set point+ the correction integrator, are equal to zero. The time constant of the correction term is much longer than the time constant of the control loop. The result is sensor temperature that is equal to the set point temperature. The temperature correction register is not slewed if the power output is over 25 percent. This insures that the correction does not change for large load conditions. The correction term is also limited to 20 degrees. (Under normal idle condition the correction term is less than 10 degrees). This insures that large temperature changes due to load or change in set point will not change the correction term.

---

Heater Controller Software Flow:
HEATER_CNTL:
    Save TEMPW1 on stack (temporary word 1)
    Save TEMPB1LONG on stack (temporary byte 1 long)
        Is CYCLE_COUNT = 0 (test for first count of 40)
            Yes: compute error (set temperature-filter tip temperature)
                Scale correction (divide correction by 4)
                Add correction to error
                Is error positive
                    Yes: continue to Is error <= 40
                    No: set error to 0
                        continue to Is error <= 40
POSITIVE:       Is error <= 40
                    Yes: continue to Put error in heater percent
                    No: set error to 40
                        continue to Put error in heater percent
LESS_THAN_40:   Put error in heater percent
                Put heater percent in power level (for display indicator)
                Scale power level (divide by 4 for a range of 0 to 10)
                Filter power
                CALL HEATER_COUNT (HEATER_COUNT returns to next instruction)
                Restore TEMPW1 from stack (temporary word 1)
                Restore TEMPB1LONG from stack (temporary byte 1 long)
HEATER_COUNT
    Save TEMPW1 on stack (temporary word 1)
    Have 40 cycles been outputted
        Yes: Test the TEMP_RD_FLAG, has temperature been read by 40 counts
            Yes: continue at Is counter <= heater percent required
            No: run GET_A_D_4 (A/D channel 4-tip sensor

```
                          bridge)
                          run SCALE_TIP (tip sensor scaling routine)
                          continue at Is counter <= heater percent
                          required
         Is counter <= heater percent required
                  Yes: Is heater enable flag on
                          Yes: turn on heater
                                  delay 10 msec (to insure full cycle)
                                  continue at Turn heater off
                          No: continue at Turn heater off
                  No: continue at Turn heater off
OFF_CYCLE:        Turn heater off
                  Add 2 cycle to heater percent required
                  Is counter = heater percent +2
                          Yes: run GET_A_D_4 (A/D channel 4-tip
                                  sensor bridge) run SCALE_TIP (tip sensor
                                  scaling routine)
                                  set TEMP_RD_FLAG (temperature has been
                                  read)
                                  Is heater percent > 25
                                          Yes: continue to Increment cycle
                                                  counter
                                          No: Is temp error = 0
                                                  Yes: continue to Increment
                                                          cycle counter
                                                  No: Is set temperature < tip
                                                          temperature
ERROR_HIGH:                                                Yes: decrement correction
                                                                  is correction < 0
                                                                          Yes: set correction
                                                                                  to 0
                                                                                  continue to
                                                                                  Increment cycle
                                                                                  counter
                                                                          No: continue to
                                                                                  Increment cycle
                                                                                  counter
                                                                  No: increment correction
                                                                          is correction > 20
                                                                                  Yes: set correction
                                                                                          to 20
                                                                                          continue to
Increment cycle
counter
                                                                                  No: continue to
                                                                                          Increment cycle
                                                                                          counter
                          No: continue to Increment cycle count
NO_TEMP_OUT:     Increment cycle counter
TEST_40:         Is cycle counter = 39 (0–39 is = 40 counts)
                  Yes: set cycle counter to 0
                          clear TEMP_RD_FLAG (clear temperature read
                          flag)
                          continue to Restore TEMPW1 from stack
                  No: continue to Restore TEMPW1 from stack
         Restore TEMPW1 from stack (temporary word 1)
RETURN (return to instruction after "CALL HEATER_COUNT")
```

With further reference to FIG. 6, following the execution of the heater control subroutine at 316, the microcontroller 12 will idle in the background subroutines 304 until the internal timer interrupt at 306 causes the display subroutine to be implemented and also polls the keypad at routine 310. Assuming that the system is to be calibrated by the user, the calibration key abbreviated "CAL" is pressed and the microcontroller 12 reads that key press as described above in the input/output and timing control section shown in FIG. 5 to call for the calibration subroutine which is now described.

Automatic Calibration Including Calibration Computing and Storing Scaling Factors Routine There are three automatic calibration routines. They are: Automatic bias, Automatic thermocouple scaling, and Automatic tip sensor scaling. Each routine is selected from the CAL mode screen. Lock codes can be incorporated to prevent unauthorized persons from calibrating the soldering iron. Lock codes are entered from the LOCK mode screen. The LOCK mode screen will automatically appear if the CAL mode is selected and LOCK code had been previously entered from the LOCK mode screens. CAL mode is entered by pressing the CAL key. LOCK mode is entered by pressing the LOCK mode key or attempting to enter CAL will a lock code is active.

The CAL mode screen has three automatic calibration choices. They are:

1) TIP TEMP (calibration of tip sensor)
2) TC TEMP (calibration of thermocouple)
3) AMPL BIAS (calibration of thermocouple amplifier bias)

The calibration routines are implemented in software in the following way:

Automatic Calibration of the Thermocouple Amplifier Bias

The Thermocouple couple amplifier (¼ of the LMC660C) has an maximum input offset voltage of 6.3 millivolts. This offset voltage must be eliminated in order to measure the very low voltages associated with the thermocouple. This offset voltage is remove by generating a bias voltage with the 8098 ucontrollers pulse width modulator then applying is to the input of the thermocouple amplifier. The automatic thermocouple bias software routine measures the amplifier output to determine if an offset voltage is present, then computes a duty cycle that will produce the required correction bias. The thermocouple amplifier input is first shorted with a jumper to produce a zero input level. This operation is queued by the CAL 3 mode screen

AMP_AUTO_BIAS

Is the BIAS_RUN_FLAG set? (set from the CAL MODE screen option 3)

Yes: subtract 100 from amplifier output (to insure a 100 bit margin)

scale error (error=amplifier output voltage)

integrate bias error transfer integrated bias error to the pulse width modulator get filtered thermocouple amplifier output scale output round error Is amplifier output=100 bits of the A/D converter?

Yes: clear BIAS_RUN_FLAG restore CAL mode main screen write new bias to non volatile memory continue to RETURN No: continue to RETURN No: continue to RETURN RETURN from subroutine (to the Timer 1 control software)

Automatic Calibration of the Thermocouple Scale Factors

The scaling constants (used by the thermocouple scaling routine) reside in temporary storage. These constants are saved in the non volatile memory and are initialized at power up initialization. The scaling constants are modified by the automatic thermocouple scale factor routine during the automatic calibration sequence. The automatic calibration sequence is started by selecting option 2 from the CAL mode main screen.

The thermocouple automatic calibration routine requires a thermocouple reference voltages at the thermocouple input. These voltages represent temperatures of 75 degrees, 100 degrees, 300 degrees, 500 degrees, 700 degrees, and 900 degrees. The operator is queued to SET TC 75 DEG F etc. as required by the automatic calibration procedure. The operator sets the input voltage (representing the requested temperature) then presses the CAL button as queued. The automatic calibration routine then adjusts the scale factor for that temperature segment as used by the thermocouple scaling routine. This sequence continues until all the temperature segments have been calibrated. The software then exits the automatic calibration routine and displays CALIBRATION COMPLETE on the screen.

FIRST_CAL_2: (Beginning of the thermocouple automatic calibration routine) (The first press of the CAL button, from the CAL 2 mode, initializes the required registers, set the TC_CAL_FLAG, and initializes the CAL 2 mode active screen.)

Clear index2

Put scale factor base address in index4

Put test temperature base address in index3

Get first test temperature (75 degrees)

Scale test temperature

Set TC_CAL_1 FLAG

CALL INIT_DISP_C2B

RETURN (to Timer 1 control routine)

CAL2_PRESSED: (Subsequent presses of the CAL button as queued by the thermocouple automatic calibration routine (TC_CAL)

Set TC_RUN_FLAG (queues TC_CAL to run)

CALL WRITE RUNNING (display RUNNING on screen)

RETURN (to timer 1 control routine)

TC_CAL: (body of the thermocouple automatic calibration routine)

Is the TC_CAL_FLAG set?

Yes: Is the $TC_{13}$ RUN_FLAG set?

Yes: initialize test temperature base address compute test temperature address get test temperature scale test temperature error=test temperature–thermocouple temperature Is error equal to zero?

Yes: continue to Increment index2

No: scale error get scale factor base address get indexed (index4) scale factor update bias or scale factor by adding error continue to RETURN NEXT_SF2: Increment index2 twice get test temperature base address get indexed (index3) test temperature for display scale test temperature for display CALL ERASE_RUNNING (erase running message on screen)

Is index2=12

Yes: clear TC-CAL-FLAG

Display CALIBRATION COMPLETE message save thermocouple scale factors in non volatile RAM continue to Exit cal 2 run No: continue to Exit cal 2 run No: continue to Exit cal 2 run No: continue to Exit cal 2 run

EX_CAL2_RUN:

Exit cal 2 run

Clear TC_RUN_FLAG

RETURN (to timer 1 control routine)

Automatic Calibration of the Tip Sensor Scale Factors

The scaling constants (used by the tip sensor scaling routine) reside in temporary storage. These constants are saved in the non volatile memory and are initialized at power up initialization. The scaling constants are modified by the tip sensor automatic scale factor routine during the automatic calibration sequence. The automatic calibration sequence is started by selection option 1 from the CAL mode main screen.

The tip sensor is calibrated by comparing the tip sensor temperature reading with the temperature read by the a thermocouple attached to the internal thermocouple amplifier, through the front panel thermocouple connector. The tip sensor calibration is initiated by pressing the CAL button while in the CAL 1 mode (as queued from the display). The tip sensor calibration is completely automatic and proceeds as follows:

The control point is set to a test temperature of 200 degrees. The heater control loop then adjust the unscaled tip sensor to 200 degrees. One minute after temperature control has been established (may vary for different tips), the tip temperature is measured using the thermocouple. If the thermocouple temperature does not equal the set point temperature, the tip sensor scale factor is adjusted (for that temperature segment) until the thermocouple temperature and the set point temperature are equal (±one degree). If the thermocouple temperature and the set point temperature are equal for a total of 15 seconds (may vary) the set point is set to the next temperature. This sequence continues until all the temperature segments have been calibrated. The software then exits the automatic calibration routine and displays CALIBRATION COMPLETE on the screen.

```
FIRST_CAL_1:    (Beginning of the tip sensor automatic calibration
                routine)
                (The first press of the CAL button, from the CAL 1
                mode, initializes the required registers,
                initializes the required delays, set the
                TIP_RUN_FLAG, and initializes the CAL 1 mode
                active screen.)
    Clear index2
    Put scale factor base address in index4
    Put test temperature base address in index3
    Get first test temperature (200 degrees)
    Scale test temperature
    Initialize 60 second delay
    Initialize 15 second delay
    Set TIP_RUN_FLAG
    CALL INIT_DISP_C1B
    RETURN (to Timer 1 control routine)
TIP_CAL: (body of the tip sensor automatic calibration routine)
    Is the TIP_RUN_FLAG set?
    Yes: has temperature control been reestablished?
        (TEST_NULLT:)
DELAY_CAL:      Yes: Decrement 60 second delay counter
                    Is the delay counter equal = 0 ?
MORE_CAL:       Yes: error = thermocouple temperature-set point
                    temperature
TEST NULL:      Is 1 <= error <= 1 ?
DEC_NULL_CNT:   Yes: decrement 15 second null delay counter
                    Is the delay counter = 0 ?
                    Yes: continue to NEXT SF1 (Next scale
                        factor)
                    No: continue to RETURN
                    No: limit error to +/- 10 degrees
                    Scale error
                    Get scale factor base address
                    Get indexed scale factor (indexed with
                    SCALE_INX2)
                    Add error to Indexed scale factor
                    Save new indexed scale factor
                    continue to RETURN
                No: continue to RETURN
            No: continue to RETURN
    No: continue to RETURN
NEXT_SF1: (Next scale factor)
        Increment index2 twice (increment index register twice)
        Is index2 = 8 (is automatic scaling complete?)
END_CAL1_RUN:   Yes: Clear TIP_RUN_FLAG
                    Display CALIBRATION COMPLETE message
                    Save tip sensor scale factors in non volatile
                    RAM
                    continue to RETURN
                No: Initialize 15 second null counter
                    (TIP_CAL_NULL)
                    Initialize 60 second delay (settling time)
                    Get test temperature base address
                    Get indexed (index2) test temperature
                    Update set point temperature with indexed
                    test temperature
                    Scale set point temperature (to read in
                    Fahrenheit)
                    continue to RETURN
RETURN (EX_CAL1:)   (to timer 1 control routine)
```

SCALE_TC

The thermocouple is inherently nonlinear. The thermocouple nonlinearity is compensated for in the thermocouple scaling routine. The thermocouple scaling routine fits a second order curve in 200 degree segments resulting in an excellent scaling accuracy through the entire range of operating temperatures. One of the problems that had to be overcome was matching the beginning and end of each 200 degree segment without discontinuities or sudden changes in scaling.

The problem of matching the end points of the 200 degree segments was solved by computing each segment as a correction to the previous scale factor over a 200 degree interval as follows:

The correction intervals for the thermocouple are: 100 to 300, 300 to 500, 500 to 700, and 700 to 900 degrees Fahrenheit.

Where SC=square coefficient

At 99 degrees the scaling is k1(99)+[k1(99)]^2(SC)+75.

At 100 degrees the scaling is [k1(100)+[k1(100)]^2(SC)+75]+(100−100)k2.

At 200 degrees the scaling is [k1(100)+[k1(100)]^2(SC)+75]+(200−100)k2.

Note that the linearity correction term k2 at 100 is multiplied by 0 at the end points of the to curves. This insures that no discontinuity or sudden change in scaling occurs. At 200 degrees the linearity correction is multiplied by 100 degrees. Each successive correction interval is added as required.

The total equation solved is:

Where t−unscaled thermocouple temperature from A/D converter

SC=squared coefficient for second order fit.

^2=squared for t<100 degrees scaled $t = k1(t) + [k1(t)]^2(SC) + 75$ for 100≤t<300 degrees scaled $t = [k1(t) + [k1(t)]^2(SC) + 75] + (t-100)k2$ for 300≤t<500 degrees scaled $t = [k1(t) + [k1(t)]^2(SC) + 75] + (t-100)k2 + (t-300)k3$ for 500≤t<700 degrees scaled $t = [k1(t) + [k1(t)]^2(SC) + 75] + (t-100)k2 + (t-300)k3 + (t-500)k4$ for t≧700 degrees scaled $t = [k1(t) + [k1(t)]^2(SC) + 75] + (t-100)k2 + (t-300)k3 + (t-500)k4 + (t-700)k5$

SCALE_TIP

The tip sensor is located on the soldering iron heater element just ahead of the heater at the end closest to the tip. While the sensor is fairly linear, the sensor temperature differs from the tip temperature by an amount determined by the thermal resistance from the tip to the sensor and the sensor to the heater. The tip temperature also differs from the heater element. The thermal loads caused by the ambient air and mounting system cause a lower temperature at the tip. This temperature offset varies with the tip temperature, becoming greater at high temperatures. The result is a sensor that gives a non-linear measurement of tip temperature. (approximately 20 degrees over the operating range of the iron. This nonlinearity is compensated for in the tip scaling routine.

The tip scaling routine fits a second order curve in 200 degree segments. The thermocouple scaling routine is used for the tip sensor scaling and differs in the initialization constants and out put filters. The scaling temperatures for the tip are chosen to match its operating range, The output filter is added to insure a smooth temperature reading at the display, The HEATER_CNTL software uses the unfiltered tip temperature to insure good response, (a filter can be added to tune the response of the system and may be added for larger tips to improve response, The loop response for the smaller tips is about right without the added lag in the feedback.)

| | | |
|---|---|---|
| TST_TEMP_1: | 04B0H | ;test temperature 1 = 75 degrees F. |
| TST_TEMP_2: | 0640H | ;test temperature 2 = 100 degrees F. |
| TST_TEMP_3: | 12C0H | ;test temperature 3 = 300 degrees F. |
| TST_TEMP_4: | 1F40H | ;test temperature 4 = 500 degrees F. |
| TST_TEMP_2: | 2BC0H | ;test temperature 5 = 700 degrees F. |
| TST_TEMP_5: | 3840H | ;test temperature 6 = 900 degrees F. |

Tip scaling:
SCALE_TIP: Put test temperature base address in index register
Put scale factor base address in index1
Get ambient temperature (75 degrees)
Get scale factor squared coefficient
Get unfiltered tip sensor (TIP_RAW)
Filter TIP_RAW
CALL SCALE_TX (Scaling routine)
Filter TIP_OUT
Update MAIN_OUT with filtered TIP_OUT (for display)

Thermocouple scaling:
SCALE_TC: Put test temperature base address in index register
Put scale factor base address in index1
Get ambient temperature (75 degrees)
Get scale factor squared coefficient
Get filtered thermocouple (TC_FIL)
Add thermocouple bias (TC_BIAS computed during Auto bias routine)
SUBT_DIODE: Subtract ambient temperature compensation diode
CALL SCALE_TX (Scaling routine)
Update TC_OUT (Scaled thermocouple)

Scaling routine (common to thermocouple and tip sensor)
SCALE_TX: Initialize curve fitting counter to 4
CALL SCALE_TC_K1 (Scale first scale factor)
SCALE_AGAIN: Is temperature greater than indexed test temperature
Increment test temperature index
Yes: CALL SCALE_TC_KX (Scale thermocouple constant N)
decrement curve fitting counter -continued

```
                    is curve fitting counter = 0
                        Yes: Continue to End scaling
                        No: jump back to SCALE_AGAIN
                    No: continue to End scaling
END_SCALE:      End scaling
SCALE_TC_K1:    Scale filtered thermocouple with indexed scale
                factor
                Increment scale factor index
                Add ambient (75 degree)
                Square temperature
                Multiply squared temperature by square coefficient
                Add squared term to temperature
                RETURN to next instruction after CALL SCALE_TC_K1
Digital Soldering Iron Software Flow
SCALE_TC_KX:    Temperature'=temperature − indexed test
                temperature
                Increment test temperature index
                Slope correction = temperature' × indexed scale
                factor
                Increment scale factor index
                Temperature = temperature + slope correction
                RETURN to next instruction after CALL SCALE_TC_KX
```

Operation

The keypad 16 and the 4×16 LCD display 22 (FIG. 2) are the main user interfaces. The numeric keys on keypad 16 are used to enter values for:

Temperature Set Point

Security Code

Select Options

Select Tip Memory

Select Preselected Temperature

The Enter key executes what has been input into the keypad or to accept a choice.

The Back Arrow key allows you to back out a previous entry. Up and Down Arrow keys are used to scroll temperature setting or highlight memory or option choices for selection by the Enter key as follows:

Increase or Decrease Temperature by scrolling

Highlight a listed memory choice

Highlight an option choice

The Cal key prompts type of calibration choices. There is calibration of the station to a temperature calibrator traceable to the NBS. The other is calibration to soldering tip sensor temperature that is carried out automatically when selected.

The Lock key (padlock icon) allows the user to set or deactivate a lock code that has been input by the user.

The Tip Memory key allows storage for 3 calibrated soldering tips that are commonly used. This is helpful when changing to a certain style of tip for a particular soldering job without having to recalibrate each time you change a tip.

The Pre-Select Temp key allows 3 predetermined temperature settings that the user can program in and recall for a specific temperature required. This will eliminate the need to remember or enter in the temperature needed for a particular soldering sequence.

The Opt (Options) key when pressed shows a screen menu of options that can be executed, including:

Temperature meter so you can measure components and other soldering stations

Read both soldering tip temperature and device under soldering operation to monitor component temperature Set station to turn off by the use of 1 and 0 keys The ESC (Escape) key cancels the previous selection or entry.

When the soldering apparatus is turned on, the main operating screen appears on LCD 22 as follows:

Entry

Set

Tip

Power

The user then enters the desired operating temperature (set point) e.g., 300°, on numeric keys of keypad 16 and presses the Enter key causing the heater element to be driven so that the desired temperature set point is measured by the tip sensor (Tip). The LCD 22 screen should then display:

Entry 300°

Set 300°

Tip 300°

Power

The "power" line shows a variable number of horizontal bars to indicate the duty cycle of AC power being applied to the resistive heater element. The tip line shows the measured temperature of the tip sensor.

From the main mode screen, any one of the various mode keys "Cal", "Lock", "Tip Memory", "Pre-Select Temp", or "Opt" keys cause corresponding user menus and prompts to be displayed as described above and in the accompanying software program.

FIG. 7 shows an alternative embodiment in which the same element serves as both heater and tip temperature sensor. It operates in basically the same way with the heater control and bridge measurement circuits except that as described above in connection with FIG. 3A, the diodes D1 and D3 are unshunted to protect the bridge circuit from the large heater voltage when the sensor and heater are the same element.

A complete listing of the microcomputer program is provided in the APPENDIX for completeness of the disclosure.

While only particular embodiments have been disclosed herein, it will be readily apparent to persons skilled in the art that numerous changes and modifications can be made to this embodiment, including the use of equivalent means, devices and method steps, without departing from the spirit of the invention. For example, the program operating in microcontroller 12 may be augmented to contain a subroutine for measuring the phase change (melt point) of the solder joint. This is achieved by monitoring in the microcontroller the time rate of change of the temperature of either the tip or the separate TC probe, and detecting a marked change in rate as the phase change (melt) point. The temperature (and, if desired, elapsed time to melt from application of heat) can be displayed and stored in memory for use in later soldering procedures.

APPENDIX

©1993 EDSYN INC.

This portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

```
LOC  OBJECT        STMT      SOURCE STATEMENT
                     1       $title('THIRTEENTH.A96')
                     2       ;2-2-93
                     3       ;thirteenth assembly for EDSYN digital iron using Intel 8098
                     4
                     5       ;          ******** SYMBOLIC NAMES FOR I/O REGISTERS *********
                     6
 0000                7       ZERO          EQU   00H:WORD          ;R
 0002                8       AD_START      EQU   02H:BYTE          ; W
 0002                9       AD_LO_BYTE    EQU   02H:BYTE          ;R
 0003               10       AD_HI_BYTE    EQU   03H:BYTE          ;R
 0003               11       HSI_MODE      EQU   03H:BYTE          ; W
 0004               12       HSI_TIME      EQU   04H:WORD          ;R
 0004               13       HSO_TIME      EQU   04H:WORD          ; W
 0006               14       HSO_MODE      EQU   06H:BYTE          ; W
 0006               15       HSI_STATUS    EQU   06H:BYTE          ;R
 0007               16       SERIAL_BUFFER EQU   07H:BYTE          ;R/W
 0008               17       INT_MASK      EQU   08H:BYTE          ;R/W
 0009               18       INT_PENDING   EQU   09H:BYTE          ;R/W
 0011               19       SERIAL_STATUS EQU   11H:BYTE          ;R
 0011               20       SERIAL_CON    EQU   11H:BYTE          ; W
 000A               21       WATCHDOG      EQU   0AH:BYTE          ; W
 000A               22       TIMER1        EQU   0AH:WORD          ;R
 000C               23       TIMER2        EQU   0CH:WORD          ;
 000E               24       PORT0         EQU   0EH:BYTE          ;R
 000E               25       BAUD_RATE     EQU   0EH:BYTE          ; W
 000F               26       PORT1         EQU   0FH:BYTE          ;R/W
 0010               27       PORT2         EQU   10H:BYTE          ;R/W
 0015               28       IOS0          EQU   15H:BYTE          ;R
 0015               29       IOC0          EQU   15H:BYTE          ; W
 0016               30       IOS1          EQU   16H:BYTE          ;R
 0016               31       IOC1          EQU   16H:BYTE          ; W
 0017               32       PWM_CONTROL   EQU   17H:BYTE          ; W
 0018               33       SP            EQU   18H:WORD          ;R/W
                    34
                    35       ;          ****** END SYMBOLIC NAMES FOR I/O REGISTORS *******
                    36
                    37       ;.         **************** REGISTER FILE ******************
                    38
 001A               39       TEMPB3        EQU   1AH:BYTE                      ;R/W  temp storage byte 3
 001B               40       TEMPB4        EQU   1BH:BYTE                      ;R/W  temp storage byte 4
 001C               41       TEMPB1LONG    EQU   1CH:WORD ;LONG                R/W   temp storage byte 1 and 2
 001C               42       TEMPB1        EQU   1CH:BYTE ;LONG LO BYTE        R/W   temp storage byte 1
 001D               43       TEMPB2        EQU   1DH:BYTE ;LONG HI BYTE        R/W   temp storage byte 2
 001E               44       TEMPW1        EQU   1EH:WORD                      ;R/W  temp word
 0020               45       SCALEW1       EQU   20H:WORD ;LONG                R/W   temp storage word
 0020               46       SCALEW1L      EQU   20H:BYTE ;LONG                R/W   overlaping bytes
 0021               47       SCALEW1H      EQU   21H:BYTE                      ;R/W  overlaping bytes
 0022               48       SCALEW2       EQU   22H:WORD                      ;R/W  temp storage word
 0022               49       SCALEW2L      EQU   22H:BYTE                      ;R/W  overlaping bytes
 0023               50       SCALEW2H      EQU   23H:BYTE                      ;R/W  overlaping bytes
 0024               51       SCALEW3       EQU   24H:WORD ;LONG                R/W   temp storage word
```

MCS-96 MACRO ASSEMBLER    THIRTEENTH.A96                                              02/04/93 10:35:11

```
LOC  OBJECT        STMT      SOURCE STATEMENT
0024               52    SCALEW3L     EQU   24H:BYTE  ;LONG      R/W   overlaping bytes
0025               53    SCALEW3H     EQU   25H:BYTE             ;R/W  overlaping bytes
0026               54    SCALEW4      EQU   26H:WORD             ;R/W  temp storage word
0026               55    SCALEW4L     EQU   26H:BYTE             ;R/W  overlaping bytes
0027               56    SCALEW4H     EQU   27H:BYTE             ;R/W  overlaping bytes
0028               57    SCALEW5      EQU   28H:WORD  ;LONG      R/W   temp storage word
0028               58    SCALEW5L     EQU   28H:BYTE  ;LONG      R/W   overlaping bytes
0029               59    SCALEW5H     EQU   29H:BYTE             ;R/W  overlaping bytes
002A               60    SCALE_INX    EQU   2AH:WORD             ;R/W  temp storage word
002A               61    SCALE_INXL   EQU   2AH:BYTE             ;R/W  overlaping bytes
002B               62    SCALE_INXH   EQU   2BH:BYTE             ;R/W  overlaping bytes
002C               63    SCALE_INX1   EQU   2CH:WORD             ;R/W  scaling index
002E               64    SCALE_INX2   EQU   2EH:WORD             ;R/W  scaling index
0030               65    SCALE_INX3   EQU   30H:WORD             ;R/W  scaling index
0032               66    SCALE_INX4   EQU   32H:WORD             ;R/W  scaling index
0034               67    INDEXB1      EQU   34H:BYTE             ;R/W  indexing register #1
                   68    ;             *************** END REGISTER FILE ***************
                   69
                   70    ;             *********** MISCELLANEOUS REGISTER FILES *********
                   71
0035               72    KEY_PREVIOUS EQU   35H:BYTE             ;R/W  previous key pressed
0036               73    NEW_KEY_FLAG EQU   36H:BYTE             ;R/W  a new key has been pressed
0037               74    E_DATA       EQU   37H:BYTE             ;R/W  keyboard entry data
0038               75    MODE_STATUS  EQU   38H:BYTE             ;R/W  mode status byte
0039               76    NUM_OF_DIG   EQU   39H:BYTE             ;R/W  number of significant digits
003A               77    ENTRY_NUM    EQU   3AH:BYTE             ;R/W  position of entry digit
003B               78    KEY          EQU   3BH:BYTE             ;R/W  last KEY pressed
003C               79    ENTRY_DATA   EQU   3CH:WORD             ;R/W  entry line data word
003E               80    MAIN_SET     EQU   3EH:WORD             ;R/W  set line data word
003E               81    MAIN_SETL    EQU   3EH:BYTE             ;R/W  set line data low byte
003F               82    MAIN_SETH    EQU   3FH:BYTE             ;R/W  set line data high byte
0040               83    MAIN_OUT     EQU   40H:WORD             ;R/W  output line data word
0042               84    ELSB         EQU   42H:WORD             ;R/W  entry LSB
0042               85    ELSBL        EQU   42H:BYTE             ;R/W  entry LSB low
0043               86    ELSBH        EQU   43H:BYTE             ;R/W  entry LSB high
0044               87    E2SB         EQU   44H:WORD             ;R/W  entry 2SB
0044               88    E2SBL        EQU   44H:BYTE             ;R/W  entry 2SB low
0045               89    E2SBH        EQU   45H:BYTE             ;R/W  entry 2SB high
0046               90    EMSB         EQU   46H:WORD             ;R/W  entry MSB
0046               91    EMSBL        EQU   46H:BYTE             ;R/W  entry MSB low
0047               92    EMSBH        EQU   47H:BYTE             ;R/W  entry MSB high
0048               93    TLSB         EQU   48H:WORD             ;temp LSB
0048               94    TLSBL        EQU   48H:BYTE             ;temp LSB low
0049               95    TLSBH        EQU   49H:BYTE             ;temp LSB high
004A               96    T2SB         EQU   4AH:WORD             ;temp 2SB
004A               97    T2SBL        EQU   4AH:BYTE             ;temp 2SB low
004B               98    T2SBH        EQU   4BH:BYTE             ;temp 2SB high
004C               99    TMSB         EQU   4CH:WORD             ;temp MSB
004C              100    TMSBL        EQU   4CH:BYTE             ;temp MSB low
004D              101    TMSBH        EQU   4DH:BYTE             ;temp MSB high
004E              102    CAL_INDEX    EQU   4EH:WORD             ;R/W  cal index register
0050              103    HX0A         EQU   50H:WORD             ;R/W  hex tens
0052              104    HX64         EQU   52H:WORD             ;R/W  hex hundreds
0054              105    DIVIDEND     EQU   54H:WORD  ;LONG      R/W   dividend distination word
0054              106    QUOTIENT     EQU   54H:BYTE             ;R/W  quotient lower (DEST) byte
0055              107    REMAINDER    EQU   55H:BYTE             ;R/W  remainder upper (DEST) byte
0056              108    TIP_RAW      EQU   56H:WORD             ;R/W  tip sensor A/D value
```

MCS-96 MACRO ASSEMBLER    THIRTEENTH.A96                                              02/04/93 10:35:11

```
LOC  OBJECT       STMT        SOURCE STATEMENT
0058            109    TIP_INTR      EQU  58H:WORD      ;R/W  A/D channel 4 - tip integrater
005A            110    TC_RAW        EQU  5AH:WORD      ;R/W  A/D channel 5 - thermocouple
005C            111    VCC_RAW       EQU  5CH:WORD      ;R/W  A/D channel 6 - Vcc/2
005E            112    DIODE_INTR    EQU  5EH:WORD      ;R/W  ambient diode integrater
0060            113    DIODE_FIL     EQU  60H:WORD      ;R/W  A/D channel 7 - ambient diode
0062            114    TIP_OUT       EQU  62H:WORD      ;R/W  scaled tip temperature
0064            115    TC_OUT        EQU  64H:WORD      ;R/W  scaled thermocouple temperature
0066            116    ERROR         EQU  66H:WORD      ;R/W  thermocouple temperature error
0068            117    CAL_SET       EQU  68H:WORD      ;R/W  cal mode set line data word
006A            118    TEMP_RD_FLAG  EQU  6AH:BYTE      ;R/W  main temperature output flag
006B            119    TIP_RUN_FLAG  EQU  6BH:BYTE      ;R/W  tip cal run flag
006C            120    POWER_FLAG    EQU  6CH:BYTE      ;R/W  heater enable flag
006D            121    TC_RUN_FLAG   EQU  6DH:BYTE      ;R/W  cal 2 run flag
006E            122    TC_BIAS       EQU  6EH:WORD      ;R/W  thermocouple bias
006E            123    TC_BIASL      EQU  6EH:BYTE      ;R/W  thermocouple bias low byte
006F            124    TC_BIASH      EQU  6FH:BYTE      ;R/W  thermocouple bias high byte
0070            125    TC_K1         EQU  70H:WORD      ;R/W  thermocouple gain K1
0070            126    TC_K1L        EQU  70H:BYTE      ;R/W  thermocouple gain K1 low byte
0071            127    TC_K1H        EQU  71H:BYTE      ;R/W  thermocouple gain K1 high byte
0072            128    TC_K2         EQU  72H:WORD      ;R/W  thermocouple gain K2
0072            129    TC_K2L        EQU  72H:BYTE      ;R/W  thermocouple gain K2 low byte
0073            130    TC_K2H        EQU  73H:BYTE      ;R/W  thermocouple gain K2 high byte
0074            131    TC_K3         EQU  74H:WORD      ;R/W  thermocouple gain K3
0074            132    TC_K3L        EQU  74H:BYTE      ;R/W  thermocouple gain K3 low byte
0075            133    TC_K3H        EQU  75H:BYTE      ;R/W  thermocouple gain K3 high byte
0076            134    TC_K4         EQU  76H:WORD      ;R/W  thermocouple gain K4
0076            135    TC_K4L        EQU  76H:BYTE      ;R/W  thermocouple gain K4 low byte
0077            136    TC_K4H        EQU  77H:BYTE      ;R/W  thermocouple gain K4 high byte
0078            137    TC_K5         EQU  78H:WORD      ;R/W  thermocouple gain K5
0078            138    TC_K5L        EQU  78H:BYTE      ;R/W  thermocouple gain K5 low byte
0079            139    TC_K5H        EQU  79H:BYTE      ;R/W  thermocouple gain K5 high byte
007A            140    TC_FIL        EQU  7AH:WORD      ;R/W  unscaled filtered thermocouple
007C            141    RETN_ADDRESS  EQU  7CH:WORD      ;R/W  subroutine return address
007E            142    TIP_FIL       EQU  7EH:WORD      ;R/W  unscaled filtered tip sensor
0080            143    TIP_K1        EQU  80H:WORD      ;R/W  tip scaling gain K1
0080            144    TIP_K1L       EQU  80H:BYTE      ;R/W  tip scaling gain K1 low byte
0081            145    TIP_K1H       EQU  81H:BYTE      ;R/W  tip scaling gain K1 high byte
0082            146    TIP_K2        EQU  82H:WORD      ;R/W  tip scaling gain K2
0082            147    TIP_K2L       EQU  82H:BYTE      ;R/W  tip scaling gain K1 low byte
0083            148    TIP_K2H       EQU  83H:BYTE      ;R/W  tip scaling gain K1 high byte
0084            149    TIP_K3        EQU  84H:WORD      ;R/W  tip scaling gain K3
0084            150    TIP_K3L       EQU  84H:BYTE      ;R/W  tip scaling gain K1 low byte
0085            151    TIP_K3H       EQU  85H:BYTE      ;R/W  tip scaling gain K1 high byte
0086            152    TIP_K4        EQU  86H:WORD      ;R/W  tip scaling gain K4
0086            153    TIP_K4L       EQU  86H:BYTE      ;R/W  tip scaling gain K1 low byte
0087            154    TIP_K4H       EQU  87H:BYTE      ;R/W  tip scaling gain K1 high byte
0088            155    TIP_K5        EQU  88H:WORD      ;R/W  tip scaling gain K5
0088            156    TIP_K5L       EQU  88H:BYTE      ;R/W  tip scaling gain K1 low byte
0089            157    TIP_K5H       EQU  89H:BYTE      ;R/W  tip scaling gain K1 high byte
008A            158    TC_INTR       EQU  8AH:WORD      ;R/W  thermocouple integrater
008C            159    BIAS_INT      EQU  8CH:WORD      ;R/W  OP amp auto bias integrater
008C            160    BIAS_INTL     EQU  8CH:BYTE      ;R/W  OP amp auto bias integrater low
008D            161    BIAS_INTH     EQU  8DH:BYTE      ;R/W  OP amp auto bias integrater high
008E            162    BIASW1        EQU  8EH:WORD      ;R/W  OP amp auto bias register
0090            163    BIAS_RUN_FLAG EQU  90H:BYTE      ;R/W  OP amplifier auto bias run flag
0091            164    TC_CAL_FLAG   EQU  91H:BYTE      ;R/W  thermocouple auto scaling flag
0092            165    HEX_DATA      EQU  92H:WORD      ;R/W  hex buffer
```

MCS-96 MACRO ASSEMBLER    THIRTEENTH.A96                                      02/04/93 10:35:11

```
LOC  OBJECT       STMT        SOURCE STATEMENT
0094              166    CYCLE_COUNT   EQU  94H:WORD      ;R/W  input power cycle counter
0096              167    HTR_PERCENT   EQU  96H:WORD      ;R/W  heater duty cycle
0098              168    MAIN_OUT_TEMP EQU  98H:WORD      ;R/W  MAIN OUT temperary register
009A              169    TIP_TEMP      EQU  9AH:WORD      ;R/W  temperary register
009C              170    CORRECTION    EQU  9CH:WORD      ;R/W  temperature offset correction
009E              171    POWER         EQU  9EH:WORD      ;R/W  output power power level
009E              172    POWERL        EQU  9EH:BYTE      ;R/W  POWER low byte
009F              173    POWERH        EQU  9FH:BYTE      ;R/W  POWER high byte
00A0              174    POWER_INT     EQU  0A0H:WORD     ;R/W  power intergrater
00A2              175    TIP_SELECT    EQU  0A2H:BYTE     ;R/W  number of selected tip
00A3              176    TEMP_SELECT   EQU  0A3H:BYTE     ;R/W  number of selected temperature
00A4              177    TIPF_OUT      EQU  0A4H:WORD     ;R/W  TIP output filter for response
00A6              178    SET_DELAY     EQU  0A6H:WORD     ;R/W  TIP CAL SET delay counter
00A8              179    TIP_CAL_NULL  EQU  0A8H:WORD     ;R/W  TIP CAL null counter
00AA              180    TC_DISP       EQU  0AAH:WORD     ;R/W  thermocouple display register
00AC              181    TC_DISP_INT   EQU  0ACH:WORD     ;R/W  thermocouple display integrater
00AE              182    ALARM_SET     EQU  0AEH:WORD     ;R/W  alarm set temperature
00AE              183    ALARM_SETL    EQU  0AEH:BYTE     ;R/W  alarm set temperature low byte
00AF              184    ALARM_SETH    EQU  0AFH:BYTE     ;R/W  alarm set temperature high byte
00B0              185    DELAY         EQU  0B0H:BYTE     ;R/W  variable delay time 100 msec/bit
00B1              186    CAL_COMP_FLAG EQU  0B1H:BYTE     ;R/W  calibration complete flag
00B2              187    STAR_FLAG     EQU  0B2H:BYTE     ;R/W  power indicator flag
00B3              188    ALARM_FLAG    EQU  0B3H:BYTE     ;R/W  TC temperature alarm flag
                  189
                  190    ;          ********** END MISCELLANEOUS REGISTER FILES *******
                  191
                  192    ;          **************** I/O ADDRESSES *****************
                  193
8000              194    COLUMN        EQU  8000H:BYTE    ;  W
8002              195    DISPLAY_MODE  EQU  8002H:BYTE    ;  W
8003              196    DISPLAY_DATA  EQU  8003H:BYTE    ;  W
                  197
                  198    ;          **************** END I/O ADDRESSES **************
                  199
                  200    ;          *************** INTERRUPT VECTORS **************
                  201
2000              202    INT_VEC_TIMER EQU  2000H:WORD    ;timer overflow interrupt vector
2002              203    INT_VEC_AD    EQU  2002H:WORD    ;A/D conversion complete interrupt vector
2004              204    INT_HSI_AVAL  EQU  2004H:WORD    ;HSI data availabel interrupt vector
2006              205    INT_HISPEED   EQU  2006H:WORD    ;high speed outputs interrupt vector
2008              206    INT_HSIO      EQU  2008H:WORD    ;HSI.0 interrupt vector
200A              207    INT_TIMERS    EQU  200AH:WORD    ;software timers interrupt vector
200C              208    INT_SERIAL    EQU  200CH:WORD    ;serial port interrupt vector
200E              209    INT_EXTERNAL  EQU  200EH:WORD    ;external interrupt vector
2010              210    INT_SOFTWARE  EQU  2010H:WORD    ;software trap interrupt vector
                  211
                  212    ;          ************* END INTERRUPT VECTORS ************
                  213
                  214
                  215    ;************************** RESERVED WORDS ********************************
                  216
                  217    ;          *************** INTERRUPT VECTORS **************
                  218
2000              219            CSEG AT 2000H            ;interrupt vectors
2000 503F         220            DCB  50H,3FH             ;timer
2002 603F         221            DCB  60H,3FH             ;A/D conversion complete
2004 703F         222            DCB  70H,3FH             ;HSI data availabel
```

MCS-96 MACRO ASSEMBLER    THIRTEENTH.A96                                    02/04/93 10:35:11

```
LOC  OBJECT              STMT    SOURCE STATEMENT
2006 803F                223             DCB  080H,3FH              ;HSO
2008 903F                224             DCB  090H,3FH              ;HSI.0
200A A03F                225             DCB  0A0H,3FH              ;software timers
200C C03F                226             DCB  0C0H,3FH              ;serial port
200E D03F                227             DCB  0D0H,3FH              ;external interrupt
2010 F03F                228             DCB  0F0H,3FH              ;software trap
                         229
                         230     ;   ************** END INTERRUPT VECTORS **************
                         231
                         232     ;   ***************** MISCELLANEOUS ******************
                         233
2012                     234             CSEG AT 2012H             ;reserved words 2012H to 2017H
2012 FFFFFFFFFFFF        235             DCB  0FFH, 0FFH, 0FFH, 0FFH, 0FFH, 0FFH
                         236
                         237
                         238     ;   *************** END MISCELLANEOUS ***************
                         239
                         240     ;   ********** CHIP CONFIGURATION REGISTER **********
                         241
2018                     242             CSEG AT 2018H             ;CCR, Chip Configuration Register
2018 E5                  243             DCB  0E5H                 ;chip configuration byte
                         244                                       ;   bit 0, reserved          =1
                         245                                       ;   bit 1, 8 bit wide buss   =0
                         246                                       ;   bit 2, WR*               =1
                         247                                       ;   bit 3, ALE/ADV*          =0
                         248                                       ;   bit 4, IRC0 3 wait states=0
                         249                                       ;   bit 5, IRC1 3 wait states=1
                         250                                       ;   bit 6, no lock required  =1
                         251                                       ;   bit 7, no lock required  =1
                         252
                         253     ;   ********* END CHIP CONFIGURATION REGISTER *********
                         254
                         255     ;   ***************** MISCELLANEOUS ******************
                         256
2019                     257             CSEG AT 2019H             ;reserved
2019 20                  258             DCB  20H
201A                     259             CSEG AT 201AH             ;jump to self opcode (27H 0FEH)
201A 27FE                260             DCB  27H, 0FEH
201C                     261             CSEG AT 201CH             ;reserved
201C FFFFFFFF            262             DCB  0FFH,0FFH,0FFH,0FFH
2030                     263             CSEG AT 2030H             ;reserved
2030 FFFFFFFFFFFFFFFF    264             DCB  0FFH,0FFH,0FFH,0FFH,0FFH,0FFH,0FFH,0FFH
2038 FFFFFFFFFFFFFFFF    265             DCB  0FFH,0FFH,0FFH,0FFH,0FFH,0FFH,0FFH,0FFH
2040 FFFFFFFFFFFFFFFF    266             DCB  0FFH,0FFH,0FFH,0FFH,0FFH,0FFH,0FFH,0FFH
2048 FFFFFFFFFFFFFFFF    267             DCB  0FFH,0FFH,0FFH,0FFH,0FFH,0FFH,0FFH,0FFH
2050 FFFFFFFFFFFFFFFF    268             DCB  0FFH,0FFH,0FFH,0FFH,0FFH,0FFH,0FFH,0FFH
2058 FFFFFFFFFFFFFFFF    269             DCB  0FFH,0FFH,0FFH,0FFH,0FFH,0FFH,0FFH,0FFH
2060 FFFFFFFFFFFFFFFF    270             DCB  0FFH,0FFH,0FFH,0FFH,0FFH,0FFH,0FFH,0FFH
2068 FFFFFFFFFFFFFFFF    271             DCB  0FFH,0FFH,0FFH,0FFH,0FFH,0FFH,0FFH,0FFH
2070 FFFFFFFFFFFFFFFF    272             DCB  0FFH,0FFH,0FFH,0FFH,0FFH,0FFH,0FFH,0FFH
2078 FFFFFFFFFFFFFFFF    273             DCB  0FFH,0FFH,0FFH,0FFH,0FFH,0FFH,0FFH,0FFH
                         274
                         275     ;   *************** END MISCELLANEOUS ***************
                         276
                         277     ;**************************** END RESERVED WORDS ****************************
                         278
                         279     ;**************************** RESET ENTRY POINT ****************************
```

```
MCS-96 MACRO ASSEMBLER    THIRTEENTH.A96                                        02/04/93 10:35:11

LOC   OBJECT         STMT    SOURCE STATEMENT
                     280
                     281   ;   *************** INITIALIZE CHIP *****************
                     282
2080                 283         CSEG AT 2080H              ;Entry point upon reset
                     284
2080 FA              285         DI                         ;disable interupts
2081 1109            286         CLRB INT_PENDING           ;clear all interrupt pending bits
                     287
2083 A1000118        288         LD   SP,#100H              ;initialize stack pointer
                     289
2087 FD              290         NOP
2088 FD              291         NOP
2089 FD              292         NOP
208A FD              293         NOP
208B FD              294         NOP
208C FD              295         NOP
                     296
208D B1A008          297         LDB  INT_MASK,#0A0H        ;interrupt mask
                     298                                    ;   bit 0, timer overflow      =0
                     299                                    ;   bit 1, A/D completion      =0
                     300                                    ;   bit 2, HSI data available  =0
                     301                                    ;   bit 3, HSO event           =0
                     302                                    ;   bit 4, HSI bit 0           =0
                     303                                    ;   bit 5, software timers     =1
                     304                                    ;   bit 6, serial I/O          =0
                     305                                    ;   bit 7, external interrupt  =1
                     306
2090 B1AA03          307         LDB  HSI_MODE,#0AAH        ;HSI mode register value
                     308                                    ;   HSI.0, each negative transition
                     309                                    ;   HSI.1, each negative transition
                     310                                    ;   HSI.2, each negative transition
                     311                                    ;   HSI.3, each negative transition
                     312
2093 B15715          313         LDB  IOC0,#57H             ;IOC0 initialization
                     314                                    ;T2 pins not used with 8098
                     315                                    ;   bit 0, enable HSI.0        =1
                     316                                    ;   bit 1, reset T2 each write =1
                     317                                    ;   bit 2, enable HSI.1        =1
                     318                                    ;   bit 3, T2 ext rst disable  =0
                     319                                    ;   bit 4, enable HSI.2        =1
                     320                                    ;   bit 5  T2 reset source     =0
                     321                                    ;   bit 6, enable HSI.3        =1
                     322                                    ;   bit 7  T2 clock source     =0
                     323
2096 B12516          324         LDB  IOC1,#25H             ;IOC1 initialization
                     325                                    ;   bit 0, select PWM          =1
                     326                                    ;   bit 1, select EXTINT       =0
                     327                                    ;   bit 2, enable timer1 int   =1
                     328                                    ;   bit 3, disable timer2 int  =0
                     329                                    ;   bit 4, HSI2 enable         =0
                     330                                    ;   bit 5, select TXD          =1
                     331                                    ;   bit 6, HSI3 enable         =0
                     332                                    ;   bit 7, HSI INT first entry =0
                     333
                     334   ;   ************** END INITIALIZE CHIP ***************
                     335
                     336   ;   *************** KEYBOARD CONSTANTS ***************
```

MCS-96 MACRO ASSEMBLER    THIRTEENTH.A96                                          02/04/93 10:35:11

```
LOC  OBJECT           STMT        SOURCE STATEMENT
                      337
2099 B1FF3B           338              LDB   KEY,#0FFH              ;initialize to no new key
209C 1136             339              CLRB  NEW_KEY_FLAG           ;reset new key flag
209E B1FF37           340              LDB   E_DATA,#0FFH           ;initialize entry data,"blank"
20A1 B10138           341              LDB   MODE_STATUS,#01H       ;initialize to MAIN MODE 1
                      342
                      343    ;        ************* END KEYBOARD CONSTANTS *************
                      344
                      345    ;        ************ MISCELLANEOUS CONSTANTS ************
                      346
20A4 B10339           347              LDB   NUM_OF_DIG,#03H        ;number of significant digits
20A7 B03936           348              LDB   ENTRY_NUM,NUM_OF_DIG   ;initialize entry position
20AA 013C             349              CLR   ENTRY_DATA             ;initialize entry data to zero
20AC 0140             350              CLR   MAIN_OUT               ;initialize display to zero
20AE 0148             351              CLR   TLSB                   ;initialize TLSB to zero
20B0 014A             352              CLR   T2SB                   ;initialize T2SB to zero
20B2 014C             353              CLR   TMSB                   ;initialize TMSB to zero
20B4 A1FF0042         354              LD    ELSB,#00FFH            ;initialize ELSB to blank
20B8 A1FF0044         355              LD    E2SB,#00FFH            ;initialize E2SB to blank
20BC A1FF0046         356              LD    EMSB,#00FFH            ;initialize EMSB to blank
20C0 0120             357              CLR   SCALEW1                ;clear integrator
20C2 018C             358              CLR   BIAS_INT               ;clear bias integrater LSB
20C4 B17F8D           359              LDB   BIAS_INTH,#7FH         ;initialize bias integrater MSB to 50%
20C7 1190             360              CLRB  BIAS_RUN_FLAG          ;reset bias flag
20C9 012E             361              CLR   SCALE_INX2             ;clear scaling index 2
20CB 116D             362              CLRB  TC_RUN_FLAG            ;clear cal 2 run flag
20CD 1191             363              CLRB  TC_CAL_FLAG            ;clear cal 2 flag
20CF 116A             364              CLRB  TEMP_RD_FLAG           ;clear temperature output flag
20D1 0194             365              CLR   CYCLE_COUNT            ;clear cycle counter
20D3 019E             366              CLR   POWER                  ;clear power level
20D5 01A0             367              CLR   POWER_INT              ;clear power integrater
20D7 019C             368              CLR   CORRECTION             ;clear temperature correction
20D9 0158             369              CLR   TIP_INTR               ;clear tip temp filter integrater
20DB 0196             370              CLR   HTR_PERCENT            ;clear heater percent duty cycle
20DD B1016C           371              LDB   POWER_FLAG,#01H        ;set heater on flag
20E0 11B3             372              CLRB  ALARM_FLAG             ;clear alarm flag (inhibit alarm)
20E2 11B1             373              CLRB  CAL_COMP_FLAG          ;clear calibration complete flag
                      374
                      375    ;        ********** END MISCELLANEOUS CONSTANTS **********
                      376
                      377    ;        ************ INITIALIZATION ROUTINES ************
                      378
20E4 EF6B0B           379              CALL  INIT_DISP_MD           ;initialize display modes
20E7 EFC30B           380              CALL  INIT_DISP_M1           ;initialize display screen 1
20EA EFE412           381              CALL  RD_NVR_BIAS            ;get PWM value from NV-RAM
20ED EF6913           382              CALL  RD_NVR_TIPN            ;get SELECTED TIP #
20F0 EF1012           383              CALL  TIPN_VALID             ;test for valid tip number
20F3 EFD313           384              CALL  RD_NVR_TEMPN           ;get SET temperature #
20F6 EF1C12           385              CALL  SETN_VALID             ;test for valid set temperature
20F9 EF6813           386              CALL  RD_NVR_TIP1            ;get TIP calibration constants
20FC EFE012           387              CALL  RD_NVR_TCK             ;get TC calibration constants
                      388    ;        CALL  TC_VALID               ;test for valid cal constants
                      389    ;        CALL  RD_NVR_TIPK            ;get TIF calibration constants
                      390    ;        CALL  TIPK_VALID             ;test for valid tip constants
20FF EF3A14           391              CALL  RD_NVR_SET             ;get set temperature
2102 EF4914           392              CALL  RD_NVR_ALARM           ;get alarm set temperature
                      393
```

MCS-96 MACRO ASSEMBLER     THIRTEENTH.A9C                                           02/04/93 10:35:11

```
LOC   OBJECT            STMT        SOURCE STATEMENT
                        394    ;           ********** END INITIALIZATION ROUTINES **********
                        395
                        396    ;*************************** CONTROL SEGMENT ********************************
                        397
2105  B11806            398                 LDB   HSO_MODE,#16H          ;set software timer 1 to interrupt
2108  45204E0A04        399                 ADD   HSO_TIME,TIMER1,#4E20H ;at a 25 Hz rate
210D  1109              400                 CLRB  INT_PENDING            ;clear pending interrupts
210F  FB                401                 EI                           ;enable interrupts
2110  27FE              402    START_LOOP:  SJMP  START_LOOP             ;loop on self
                        403
                        404    ;*********************** END CONTROL SEGMENT ********************************
                        405
                        406    ;           ********** TIMER1 RATE SERVICE SUBROUTINE **********
                        407
2112  B11806            408    T1_SERVICE:  LDB   HSO_MODE,#16H          ;set software timer 1 to interrupt
2115  45204E0A04        409                 ADD   HSO_TIME,TIMER1,#4E20H ;at a 25 Hz rate
211A  1109              410                 CLRB  INT_PENDING            ;clear pending interrupts
211C  FB                411                 EI                           ;enable interrupts
211D  297C              412                 CALL  KEYB_SERVICE           ;keyboard scan routine
211F  298A              413                 CALL  TEST_NEW_KEY           ;test for new key press
2121  EFA20E            414                 CALL  AMP_AUTO_BIAS          ;run auto bias if BIAS_RUN_FLAG
2124  EF290F            415                 CALL  SCALE_TC               ;##
2127  EF7D10            416                 CALL  TC_CAL                 ;run auto scalefactor if TC_CAL_FLAG
212A  28CD              417                 CALL  FILTER_TC              ;filter thermocouple for display
212C  EFC50F            418                 CALL  TIP_CAL                ;run auto scalefactor if TIP_RUN_FLAG
212F  2848              419                 CALL  REFRESH_DISP           ;refresh displays
2131  EF510C            420                 CALL  WRITE_STAR             ;write power indicator to screen
2134  EF6105            421                 CALL  ALARM                  ;beep alarm if TC over alarm set temp
2137  990136            422                 CMPB  NEW_KEY_FLAG,#01H      ;exit if not new key
213A  D705              423                 JNE   EXIT_T1_SERV           ;here
213C  29B3              424                 CALL  MODE_SELECT            ;change mode if selected
213E  EF2705            425                 CALL  ASSEMBLE_KEY           ;assemble key-presses
2141  F0                426    EXIT_T1_SERV: RET                         ;return
                        427
                        428
                        429    ;           ******* END TIMER1 RATE SERVICE SUBROUTINE ********
                        430
                        431    ;           ********** 60 HZ RATE SERVICE SUBROUTINE **********
                        432
2142  B10106            433    SIXTY_HERTZ: LDB   HSO_MODE,#01H          ;turn off heater
2145  4504000A04        434                 ADD   HSO_TIME,TIMER1,#0004H ;now
214A  FD                435                 NOP
214B  FD                436                 NOP
214C  B12306            437                 LDB   HSO_MODE,#23H          ;set test sync pulse
214F  4504000A04        438                 ADD   HSO_TIME,TIMER1,#0004H ;now
2154  FB                439                 EI                           ;enable interrupts
2155  2812              440                 CALL  DELAY_A_D              ;delay A/D until SCR turns off
2157  EFB110            441                 CALL  HEATER_CNTL            ;call heater controller
215A  28C5              442                 CALL  GET_A_D_5              ;get A/D channel 5 (thermocouple)
215C  28E1              443                 CALL  GET_A_D_6              ;get A/D channel 6 (2.5V reference)
215E  28EE              444                 CALL  GET_A_D_7              ;get A/D channel 7 (ambient diode)
2160  B10306            445                 LDB   HSO_MODE,#03H          ;reset test sync pulse
2163  4504000A04        446                 ADD   HSO_TIME,TIMER1,#0004H ;now
2168  F0                447                 RET
                        448
                        449    ;           ******** END 60 HZ RATE SERVICE SUBROUTINE ********
                        450
```

MCS-96 MACRO ASSEMBLER    THIRTEENTH.A9L                                           02/04/93 10:35:11

```
LOC  OBJECT          STMT         SOURCE STATEMENT
                     451    ;     ****************** A/D DELAY **********************
                     452
2169 C81E            453    DELAY_A_D:   PUSH TEMPW1              ;save TEMPW1 on stack
216B A101C01E        454                 LD   TEMPW1,#0001H       ;initialize counter 10X40usec
216F EF070E          455    D_40USEC:    CALL DELAY_40USEC        ;delay 40 usec
2172 051E            456                 DEC  TEMPW1              ;decrement counter
2174 D7F9            457                 BNE  D_40USEC            ;continue if count not zero
2176 CC1E            458                 POP  TEMPW1              ;restore TEMPB2 from stack
2178 F0              459                 RET                      ;return after counts
                     460
                     461    ;     **************** END A/D DELAY ********************
                     462
                     463    ;     **************** REFRESH DISPLAY ******************
                     464
2179 990138          465    REFRESH_DISP: CMPB MODE_STATUS,#01H   ;test for main mode
217C D716            466                 JNE  REFRESH_CAL1        ;check for cal 1 mode
217E EF570C          467    REFRESH_M1:  CALL WR_M1_L1            ;refresh main mode entry line
2181 EF630C          468                 CALL WR_M1_L2            ;refresh main mode set line
2184 EF680C          469                 CALL WR_M1_L3            ;refresh main mode output line
2187 99016C          470                 CMPB POWER_FLAG,#01H     ;is power on
218A D704            471                 JNE  POWER_OFF           ;no
218C EF0A0D          472                 CALL WR_POWER            ;refresh power level display
218F F0              473                 RET                      ;return
2190 EFC00B          474    POWER_OFF:   CALL WRITE_OFF           ;display off indicator
2193 F0              475                 RET                      ;return
2194 990638          476    REFRESH_CAL1: CMPB MODE_STATUS,#06H   ;test for cal 1 tip sensor scaling
2197 D717            477                 JNE  REFRESH_CAL2        ;cal 1 refresh not required
2199 99016B          478                 CMPB TIP_RUN_FLAG,#01H   ;test if TIP cal loop active
219C D705            479                 JNE  IS_CAL_COMP         ;is the calibration complete flag set
219E EF560C          480                 CALL WR_C1_L2            ;refresh cal 1 mode SET temperature
21A1 2006            481                 SJMP REFSH_C1_NOW        ;complete cal 1 refresh
21A3 9901B1          482    IS_CAL_COMP: CMPB CAL_COMP_FLAG,#01H  ;is the calibration complete flag set
21A6 D701            483                 JNE  REFSH_C1_NOW        ;continue refreshing cal 1
21A8 F0              484                 RET                      ;return
21A9 EF530C          485    REFSH_C1_NOW: CALL WR_C1_L3           ;refresh cal 1 mode TIP temperature
21AC EF580C          486                 CALL WR_C1_L4            ;refresh cal 1 mode TC temperature
21AF F0              487                 RET                      ;return
21B0 990738          488    REFRESH_CAL2: CMPB MODE_STATUS,#07H   ;test for CAL 2 thermocouple scaling
21B3 D714            489                 JNE  REFRESH_CAL3        ;CAL 2 refresh not required
21B5 990191          490                 CMPB TC_CAL_FLAG,#01H    ;test if TC cal loop active
21B8 D705            491                 JNE  IS_CAL_COMP2        ;is the calibration complete flag set
21BA EF520C          492                 CALL WR_C2_L3            ;refresh cal 2 run line 3
21BD 2006            493                 SJMP REFSH_C2_NOW        ;complete cal 1 refresh
21BF 9901B1          494    IS_CAL_COMP2: CMPB CAL_COMP_FLAG,#01H ;is the calibration complete flag set
21C2 D701            495                 JNE  REFSH_C2_NOW        ;continue refreshing cal 1
21C4 F0              496                 RET                      ;return
21C5 EF4F0C          497    REFSH_C2_NOW: CALL WR_C2_L4           ;refresh cal 2 mode output line
21C8 F0              498                 RET                      ;return
21C9 990838          499    REFRESH_CAL3: CMPB MODE_STATUS,#08H   ;test for cal 3 (OP amplifier bias)
21CC D70A            500                 JNE  REFRESH_M01         ;test refresh MAIN OPTION A 4) screen
21CE 9901B1          501                 CMPB CAL_COMP_FLAG,#01H  ;is the calibration complete flag set
21D1 D701            502                 JNE  REFSH_C3_NOW        ;continue refreshing CAl 3
21D3 F0              503                 RET                      ;return
21D4 EF480C          504    REFSH_C3_NOW: CALL WR_C3_L4           ;refresh cal 1 mode output line
21D7 F0              505                 RET                      ;return
21D8 991338          506    REFRESH_M01: CMPB MODE_STATUS,#13H    ;test for MAIN OPTION 4) MODE
21DB D70D            507                 JNE  REFRESH_M02         ;test refresh MAIN OPTION A 5) screen
```

MCS-96 MACRO ASSEMBLER    THIRTEENTH.A96                                              02/04/93 10:35:11

```
LOC  OBJECT       STMT       SOURCE STATEMENT

21DD EFFB0B        508              CALL  WR_M1_L1         ;refresh MAIN OPTION 1) ENTRY temp
21E0 EF040C        509              CALL  WR_M1_L2         ;refresh MAIN OPTION 1) SET temp
21E3 EF090C        510              CALL  WR_M1_L3         ;refresh MAIN OPTION 1) TIP temp
21E6 EF1E0C        511              CALL  WR_C1_L4         ;refresh MAIN OPTION 1) TC temp
21E9 F0           512              RET                     ;return
21EA 991438        513  REFRESH_M02: CMPB MODE_STATUS,#14H ;test for MAIN OPTION 2 ) TC METER
21ED D709         514              JNE   EXIT_REFRESH      ;no refresh required
21EF EF350C        515              CALL  WR_M02_L2        ;refresh MAIN OPTION 2) TC TEMP
21F2 EF3A0C        516              CALL  WR_M02_L3        ;refresh MAIN OPTION 2) SET ENTRY
21F5 EF460C        517              CALL  WR_M02_L4        ;refresh MAIN OPTION 2) ALARM SET
21F8 F0           518  EXIT_REFRESH: RET                   ;reset
                  519
                  520   ;         *********** END REFRESH DISPLAYS ***************
                  521
                  522   ;         ************* FILTER THERMOCOUPLE ***************
                  523
21F9 A0641E        524  FILTER_TC:  LD    TEMPW1,TC_OUT    ;get thermocouple out
21FC 09031E        525              SHL   TEMPW1,#3        ;scale up
21FF 641EAC        526              ADD   TC_DISP_INT,TEMPW1  ;integrate thermocouple
2202 A0ACAA        527              LD    TC_DISP,TC_DISP_INT ;output filtered thermocouple
2205 0806AA        528              SHR   TC_DISP,#6       ;scale thermocouple for display
2208 A0AC1C        529              LD    TEMPB1LONG,TC_DISP_INT ;transfer TC filter to temp storage
220B 08031C        530              SHR   TEMPB1LONG,#3    ;scale feedback
220E 681CAC        531              SUB   TC_DISP_INT,TEMPB1LONG ;subtract feedback from filter
2211 F0           532              RET                     ;return
                  533
                  534   ;         *********** END FILTER THERMOCOUPLE ***********
                  535
                  536   ;         ********** GET A/D CONVERTER CHANNEL 4 ***********
                  537
2212 C81C         538  GET_A_D_4:  PUSH  TEMPB1LONG       ;save TEMPB1LONG
2214 111C         539              CLRB  TEMPB1           ;clear A/D ready flag
2216 B10C02        540              LDB   AD_START,#0CH    ;start A/D convert for channel 4
2219 285D         541              CALL  WAIT_FOR_RDY     ;wait for A/D complete interrupt
221B A01C56        542              LD    TIP_RAW,TEMPB1LONG ;save TIP RAW data
221E CC1C         543              POP   TEMPB1LONG       ;restore TEMPB1LONG
2220 F0           544              RET                     ;TIP_FIL = 16*A/D data
                  545
                  546   ;         ******** END GET A/D CONVERTER CHANNEL 4 ********
                  547
                  548   ;         *********** GET A/D CONVERTER CHANNEL 5 ***********
                  549
                  550
2221 C81C         551  GET_A_D_5:  PUSH  TEMPB1LONG       ;save TEMPB1LONG
2223 111C         552              CLRB  TEMPB1           ;clear A/D ready flag
2225 B10D02        553              LDB   AD_START,#0DH    ;start A/D convert for channel 5
2228 284E         554              CALL  WAIT_FOR_RDY     ;wait for A/D complete interrupt
222A A01C5A        555              LD    TC_RAW,TEMPB1LONG ;save TC RAW data
222D 641C8A        556              ADD   TC_INTR,TEMPB1LONG ;integrate A/D data
2230 A08A7A        557              LD    TC_FIL,TC_INTR   ;output filtered THERMOCOUPLE
2233 A08A1C        558              LD    TEMPB1LONG,TC_INTR ;transfer TC filter to temp storage
2236 08041C        559              SHR   TEMPB1LONG,#4    ;divide by 16
2239 681C8A        560              SUB   TC_INTR,TEMPB1LONG ;subtract feedback value from filter
223C CC1C         561              POP   TEMPB1LONG       ;restore TEMPB1LONG
223E F0           562              RET                     ;TC_FIL = 16*A/D data
                  563
                  564   ;         ******** END GET A/D CONVERTER CHANNEL 5 *********
```

```
MCS-96 MACRO ASSEMBLER    THIRTEENTH.A9(                                          02/04/93 10:35:11

LOC   OBJECT              STMT     SOURCE STATEMENT
                          565
                          566    ;           ********* END GET A/D CONVERTER CHANNEL 6 *********
                          567
223F C61C                 568    GET_A_D_6:   PUSH  TEMPB1LONG          ;save TEMPB1LONG
2241 111C                 569                 CLRB  TEMPB1              ;clear A/D ready flag
2243 B10E02               570                 LDB   AD_START,#0EH       ;start A/D convert for channel 6
2246 2830                 571                 CALL  WAIT_FOR_RDY        ;wait for A/D complete interrupt
2248 A01C5C               572                 LD    VCC_RAW,TEMPB1LONG  ;output VCC/2
224B CC1C                 573                 POP   TEMPB1LONG          ;restore TEMPB1LONG
224D F0                   574                 RET
                          575
                          576    ;           *********** GET A/D CONVERTER CHANNEL 6 ***********
                          577
                          578    ;           *********** GET A/D CONVERTER CHANNEL 7 ***********
                          579
224E C61C                 580    GET_A_D_7:   PUSH  TEMPB1LONG          ;save TEMPB1LONG
2250 C820                 581                 PUSH  SCALEW1             ;save SCALEW1
2252 C822                 582                 PUSH  SCALEW2             ;save SCALEW2
2254 111C                 583                 CLRB  TEMPB1              ;clear A/D ready flag
2256 B10F02               584                 LDB   AD_START,#0FH       ;start A/D convert for channel 7
2259 2810                 585                 CALL  WAIT_FOR_RDY        ;wait for A/D complete interrupt
225B 641C5E               586                 ADD   DIODE_INTR,TEMPB1LONG ;integrate A/D data
225E A05E20               587                 LD    SCALEW1,DIODE_INTR  ;unscaled ambient diode
2261 6D8ECC20             588                 MULU  SCALEW1,#0CC8EH     ;scale diode 1 bit/deg F
2265 A02260               589                 LD    DIODE_FIL,SCALEW2   ;output scaled filtered AMBIENT DIODE
2268 A05E20               590                 LD    SCALEW1,DIODE_INTR  ;transfer TC filter to temp storage
226B 080420               591                 SHR   SCALEW1,#4          ;divide by 16
226E 68205E               592                 SUB   DIODE_INTR,SCALEW1  ;subtract feedback value from filter
2271 CC22                 593                 POP   SCALEW2             ;restore SCALEW2
2273 CC20                 594                 POP   SCALEW1             ;restore SCALEW1
2275 CC1C                 595                 POP   TEMPB1LONG          ;restore TEMPB1LONG
2277 F0                   596                 RET                       ;TC_FIL = 16*A/D data
                          597
                          598    ;           ********* END GET A/D CONVERTER CHANNEL 7 *********
                          599
                          600    ;           *************** WAIT FOR A/D READY ***************
                          601
2278 99011C                602   WAIT_FOR_RDY: CMPB TEMPB1,#01H         ;test A/D ready flag
227B D7FB                 603                 JNE   WAIT_FOR_RDY        ;wait for A/D ready interrupt
227D B0021C               604                 LDB   TEMPB1,AD_LO_BYTE   ;get A/D low byte
2280 B0031D               605                 LDB   TEMPB2,AD_HI_BYTE   ;get A/D high byte
2283 08061C               606                 SHR   TEMPB1LONG,#6       ;right justify A/D data word
2286 F0                   607                 RET
                          608
                          609    ;           ************ END WAIT FOR A/D READY ************
                          610
                          611    ;           *********** KEYBOARD SERVICE SUBROUTINE ***********
                          612
2287 1011130F0C0D120E     613    KEYX:        DCB   10H,11H,13H,0FH,0CH,0DH,12H,0EH
228F 030B0609020A0508     614                 DCB   03H,0BH,06H,09H,02H,0AH,05H,08H
2297 01000407             615                 DCB   01H,00H,04H,07H
                          616
229B B1011C                617   KEYB_SERVICE: LDB  TEMPB1,#01H         ;initialize keyboard column 1
229E B1021D               618                 LDB   TEMPB2,#02H         ;initialize keyboard row 1
22A1 A187221E             619                 LD    TEMPW1,#KEYX        ;transfer KEYX base address to TEMPW1
22A5 C701080 1C           620    NEXT_COLUMN: STB   TEMPB1,COLUMN       ;select keyboard column x
22AA B0061A               621                 LDB   TEMPB3,HSI_STATUS   ;input keyboard row buffer
```

MCS-96 MACRO ASSEMBLER    THIRTEENTH.A94                                                02/04/93 10:35:11

```
LOC  OBJECT        STMT        SOURCE STATEMENT
22AD 501A1D1B      622  NEXT_ROW:    ANDB  TEMPB4,TEMPB2,TEMPB3      ;test row for key press
22B1 D70C          623               JNE   ANOTHER_KEY               ;continue if no keypress
22B3 B21E3B        624               LDB   KEY,[TEMPW1]              ;get KEY from indexed key table
22B6 B1001C        625               LDB   TEMPB1,#00H               ;clear column, HSI2 shared with NV-RAM
22B9 C70100801C    626               STB   TEMPB1,COLUMN             ;here
22BE F0            627               RET                             ;exit if key found
22BF 071E          628  ANOTHER_KEY: INC   TEMPW1                    ;increment key table
22C1 19021D        629               SHLB  TEMPB2,#2                 ;left shift to next row
22C4 D7E7          630               JNE   NEXT_ROW                  ;continue if more rows
22C6 B1021D        631               LDB   TEMPB2,#02H               ;start another row
22C9 19011C        632               SHLB  TEMPB1,#1                 ;left shift to next column
22CC 361CD6        633               JBC   TEMPB1,6,NEXT_COLUMN      ;continue if more columns
22CF B1FF3B        634               LDB   KEY,#0FFH                 ;no key has been pressed
22D2 B1001C        635               LDB   TEMPB1,#00H               ;clear column, HSI2 shared with NV-RAM
22D5 C70100801C    636               STB   TEMPB1,COLUMN             ;here
22DA F0            637               RET                             ;return
                   638
                   639  ;        ********* END KEYBOARD SERVICE SUBROUTINE *********
                   640
                   641  ;        ***************** NEW KEY TEST ******************
                   642
22DB 1136          643  TEST_NEW_KEY: CLRB NEW_KEY_FLAG               ;clear new key flag
22DD 99FF3B        644               CMPB  KEY,#0FFH                 ;test for no key
22E0 DF0B          645               JE    NO_NEW_KEY                ;no key is not a new key
22E2 983B35        646               CMPB  KEY_PREVIOUS,KEY          ;test for new key press
22E5 DF06          647               JE    NO_NEW_KEY                ;if new key, set new key flag
22E7 B03B37        648               LDB   E_DATA,KEY                ;update entry data if new key
22EA B10136        649               LDB   NEW_KEY_FLAG,#01H         ;here
22ED B03B35        650  NO_NEW_KEY:  LDB   KEY_PREVIOUS,KEY          ;save previous key press
22F0 F0            651               RET                             ;return
                   652
                   653  ;        *************** END NEW KEY TEST ****************
                   654
                   655  ;        ************ MODE SELECT SUBROUTINE *************
                   656
22F1 990A37        657  MODE_SELECT: CMPB  E_DATA,#0AH               ;test for ENTER key
22F4 D71B          658               JNE   TEST_LEFT                 ;next key test
22F6 990138        659               CMPB  MODE_STATUS,#01H          ;test for main mode
22F9 D704          660               JNE   TEST_M01                  ;test if in read temperatures OPT MA4
22FB 2A21          661               CALL  MAIN_ENTER                ;call MAIN MODE enter routine
22FD 2216          662               SJMP  CL_AND_EXIT               ;blank key and exit
22FF 991338        663  TEST_M01:    CMPB  MODE_STATUS,#13H          ;test for MAIN OPTION 3) mode
2302 D704          664               JNE   TEST_M02                  ;test next mode
2304 2A18          665               CALL  MAIN_ENTER                ;call MAIN MODE enter routine
2306 220D          666               SJMP  CL_AND_EXIT               ;blank key and exit
2308 991438        667  TEST_M02:    CMPB  MODE_STATUS,#14H          ;test for MAIN OPTION 3) mode
230B D702          668               JNE   EXIT_X_ENTER              ;test next mode
230D 2A4B          669               CALL  ALARM_ENTER               ;call MAIN MODE enter routine
230F 2204          670  EXIT_X_ENTER: SJMP CL_AND_EXIT                ;blank key and exit
                   671
2311 990B37        672  TEST_LEFT:   CMPB  E_DATA,#0BH               ;test for LEFT ARROW key
2314 D704          673               JNE   TEST_UP                   ;test next key
2316 2A7C          674               CALL  MAIN_LEFT
2318 21FB          675               SJMP  CL_AND_EXIT
                   676
231A 990C37        677  TEST_UP:     CMPB  E_DATA,#0CH               ;test for UP ARROW key
231D D704          678               JNE   TEST_DOWN                 ;test next key
```

MCS-96 MACRO ASSEMBLER    THIRTEENTH.A9<                                        02/04/93 10:35:11 P(

```
LOC  OBJECT        STMT       SOURCE STATEMENT
231F 2A85          679                   CALL MAIN_UP
2321 21F2          680                   SJMP CL_AND_EXIT
                   681
2323 990D37        682        TEST_DOWN: CMPB E_DATA,#0DH          ;test for DOWN ARROW key
2326 D704          683                   JNE  TEST_LOCK            ;test next key
2328 2A96          684                   CALL MAIN_DOWN
232A 21E9          685                   SJMP CL_AND_EXIT
                   686
232C 990E37        687        TEST_LOCK: CMPB E_DATA,#0EH          ;test for LOCK MODE 2 key
232F D709          688                   JNE  TEST_ESCAPE          ;jump to next mode test
2331 990138        689                   CMPB MODE_STATUS,#01H     ;enter LOCK from MAIN only
2334 D702          690                   JNE  EXIT_LOCK
2336 2AAD          691                   CALL TOGGLE_LOCK          ;enter LOCK mode now
2338 21DE          692        EXIT_LOCK: SJMP CL_AND_EXIT          ;clear key and exit
                   693
233A 990F37        694        TEST_ESCAPE: CMPB E_DATA,#0FH        ;test for ESCAPE key
233D D708          695                   JNE  J_TEST_PRE_SEL       ;jump to next mode test
233F 990138        696                   CMPB MODE_STATUS,#01H     ;test if MAIN mode
2342 D705          697                   JNE  TST_CA_LOCK          ;goto, test if LOCK mode
2344 FD            698                   NOP  ;CALL MAIN_ESCAPE         ;call main mode cancel
2345 21CE          699                   SJMP CL_AND_EXIT          ;clear entry and exit
2347 20BA          700        J_TEST_PRE_SEL: SJMP TEST_PRE_SEL    ;jump to next mode test
                   701
2349 990238        702        TST_CA_LOCK: CMPB MODE_STATUS,#02H   ;test if LOCK mode
234C D705          703                   JNE  TST_CA_PRE_S         ;goto, test PRE-SELECT mode
                   704        ;CLEAR FLAGS HERE ##############################
234E EF0103        705                   CALL SET_MAIN             ;call main mode cancel
2351 21C2          706                   SJMP CL_AND_EXIT          ;clear entry and exit
                   707
2353 990338        708        TST_CA_PRE_S: CMPB MODE_STATUS,#03H  ;test if PRE-SELECT mode
2356 D705          709                   JNE  TST_CA_TIP_M         ;goto, test if TIP MEMORY mode
                   710        ;CLEAR FLAGS HERE ##############################
2358 EFF702        711                   CALL SET_MAIN             ;call main mode cancel
235B 21B8          712                   SJMP CL_AND_EXIT          ;clear entry and exit
                   713
235D 990438        714        TST_CA_TIP_M: CMPB MODE_STATUS,#04H  ;test if TIP MEMORY mode
2360 D705          715                   JNE  TST_CA_CAL_M         ;goto, test if CAL mode
                   716        ;CLEAR FLAGS HERE ##############################
2362 EFED02        717                   CALL SET_MAIN             ;call main mode cancel
2365 21AE          718                   SJMP CL_AND_EXIT          ;clear entry and exit
                   719
2367 990538        720        TST_CA_CAL_M: CMPB MODE_STATUS,#05H  ;test if in CAL mode
236A D710          721                   JNE  TEST_CAL1_CA         ;continue
236C 1191          722                   CLRB TC_CAL_FLAG          ;clear all cal flags
236E 116D          723                   CLRB TC_RUN_FLAG          ;here
2370 116B          724                   CLRB TIP_RUN_FLAG         ;here
2372 1190          725                   CLRB BIAS_RUN_FLAG        ;here
2374 EFC511        726                   CALL RD_NVR_SET
2377 EFD802        727                   CALL SET_MAIN             ;cancel cal mode
237A 2199          728                   SJMP CL_AND_EXIT          ;clear entry and exit
237C 990638        729        TEST_CAL1_CA: CMPB MODE_STATUS,#06H  ;test if cal 1 mode
237F D712          730                   JNE  TEST_CAL2_CA         ;goto - test if cal 2 mode
2381 99016B        731                   CMPB TIP_RUN_FLAG,#01H    ;test if CAL 1 running
2384 D707          732                   JNE  EXIT_CAL1            ;end CAL 1
2386 116B          733                   CLRB TIP_RUN_FLAG         ;clear run flag
2388 EF4509        734                   CALL INIT_DISP_C1A        ;restore CAL 1 main screen
238B 2188          735                   SJMP CL_AND_EXIT          ;clear entry and exit
```

MCS-96 MACRO ASSEMBLER    THIRTEENTH.A9                                              02/04/93 10:35:11 P/

```
LOC   OBJECT    STMT          SOURCE STATEMENT
238D  11B1       736  EXIT_CAL1:   CLRB  CAL_COMP_FLAG           ;end CAL 1
238F  2A6E       737               CALL  SET_CAL                 ;toggle back to CAL main screen
2391  2182       738               SJMP  CL_AND_EXIT             ;clear entry and exit
2393  990738     739  TEST_CAL2_CA: CMPB MODE_STATUS,#07H        ;test if CAL 2 mode
2396  D71E       740               JNE   TEST_CAL3_CA            ;goto - test if CAL 3 mode
2398  990160     741               CMPB  TC_RUN_FLAG,#01H        ;test if in CAL 2 running
239B  D707       742               JNE   TEST_TC_CAL             ;return to previous cal screen
239D  116D       743               CLRB  TC_RUN_FLAG             ;clear run flag
239F  EF9309     744               CALL  ERASE_RUNNING           ;clear running from screen
23A2  2171       745               SJMP  CL_AND_EXIT             ;clear entry and exit
23A4  990191     746  TEST_TC_CAL: CMPB  TC_CAL_FLAG,#01H        ;test if in CAL 2
23A7  D707       747               JNE   EXIT_CAL2               ;end CAL 2
23A9  1191       748               CLRB  TC_CAL_FLAG             ;return to CAL 2 entry screen
23AB  EF3009     749               CALL  INIT_DISP_C2A           ;restore CAL 2 main screen
23AE  2165       750               SJMP  CL_AND_EXIT             ;clear entry and exit
23B0  11B1       751  EXIT_CAL2:   CLRB  CAL_COMP_FLAG           ;end CAL 2
23B2  2A4B       752               CALL  SET_CAL                 ;toggle back to CAL main screen
23B4  215F       753               SJMP  CL_AND_EXIT             ;clear entry and exit
23B6  990838     754  TEST_CAL3_CA: CMPB MODE_STATUS,#08H        ;test if cal 3 mode
23B9  D712       755               JNE   TST_OPTM                ;next mode test
23BB  990190     756               CMPB  BIAS_RUN_FLAG,#01H      ;is bias running
23BE  D707       757               JNE   EXIT_CAL3               ;exit cal 3 mode
23C0  1190       758               CLRB  BIAS_RUN_FLAG           ;end bias
23C2  EF2709     759               CALL  INIT_DISP_C3A           ;restore cal 3 main screen
23C5  214E       760               SJMP  CL_AND_EXIT             ;clear entry and exit
23C7  11B1       761  EXIT_CAL3:   CLRB  CAL_COMP_FLAG           ;end cal 3
23C9  2A34       762               CALL  SET_CAL                 ;toggle back to CAL main screen
23CB  2148       763               SJMP  CL_AND_EXIT             ;clear entry and exit
23CD  990938     764  TST_OPTM:    CMPB  MODE_STATUS,#09H        ;test if in MAIN OPTION
23D0  D704       765               JNE   TST_OPTL                ;continue
23D2  2A7E       766               CALL  SET_MAIN                ;restore MAIN mode
23D4  213F       767               SJMP  CL_AND_EXIT             ;clear entry and exit
                   768
23D6  991038     769  TST_OPTL:    CMPB  MODE_STATUS,#10H        ;test if in LOCK OPTION
23D9  D704       770               JNE   TST_OPTP                ;continue
23DB  2A08       771               CALL  TOGGLE_LOCK             ;restore LOCK mode
23DD  2136       772               SJMP  CL_AND_EXIT             ;clear entry and exit
                   773
23DF  991138     774  TST_OPTP:    CMPB  MODE_STATUS,#11H        ;test if in PRE-SELECT TEMP OPTION
23E2  D704       775               JNE   TST_TMA                 ;continue
23E4  2A06       776               CALL  TOGGLE_PRE_S            ;restore TEMP SELECT mode
23E6  212D       777               SJMP  CL_AND_EXIT             ;clear entry and exit
                   778
23E8  991238     779  TST_TMA:     CMPB  MODE_STATUS,#12H        ;test if in TIP SELECT OPTION
23EB  D704       780               JNE   TST_M01                 ;continue to test for modes
23ED  2A04       781               CALL  TOGGLE_TM               ;restore TIP SELECT mode
23EF  2124       782               SJMP  CL_AND_EXIT             ;clear entry and exit
                   783
23F1  991338     784  TST_M01:     CMPB  MODE_STATUS,#13H        ;test if in READ TEMPERATURES MODE
23F4  D704       785               JNE   TST_M02                 ;test for MAIN OPTION 2) mode
23F6  2A1D       786               CALL  TOGGLE_OPTM             ;restore MAIN OPTION mode
23F8  211B       787               SJMP  CL_AND_EXIT             ;clear entry and exit
                   788
23FA  991438     789  TST_M02:     CMPB  MODE_STATUS,#14H        ;test if in TEMPERATURE METER+ALARM
23FD  D704       790               JNE   TEST_PRE_SEL            ;test for PRE-SELECT TEMP mode
23FF  2A14       791               CALL  TOGGLE_OPTM             ;restore MAIN OPTION mode
2401  2112       792               SJMP  CL_AND_EXIT             ;clear entry and exit
```

MCS-96 MACRO ASSEMBLER    THIRTEENTH.A9.                                                    02/04/93 10:35:11

| LOC | OBJECT | STMT | SOURCE STATEMENT | | |
|---|---|---|---|---|---|
| | | 793 | | | |
| 2403 | 991037 | 794 | TEST_PRE_SEL: | CMPB E_DATA,#10H | ;test for PRE_SELECT MODE_3 key |
| 2406 | D709 | 795 | | JNE TEST_TIP_MEM | ;jump to next test mode |
| 2408 | 990138 | 796 | | CMPB MODE_STATUS,#01H | ;test if in MAIN mode |
| 240B | D702 | 797 | | JNE NOT_IN_MAIN1 | ;do not enter TIP MEM if not in MAIN |
| 240D | 29DD | 798 | | CALL TOGGLE_PRE_S | ;toggle PRE-SELECT mode |
| 240F | 2104 | 799 | NOT_IN_MAIN1: | SJMP CL_AND_EXIT | ;blank key and exit |
| | | 800 | | | |
| 2411 | 991137 | 801 | TEST_TIP_MEM: | CMPB E_DATA,#11H | ;test for PRE_SELECT MODE_3 key |
| 2414 | D709 | 802 | | JNE TEST_CAL | ;jump to next test |
| 2416 | 990138 | 803 | | CMPB MODE_STATUS,#01H | ;test if in MAIN mode |
| 2419 | D702 | 804 | | JNE NOT_IN_MAIN2 | ;do not enter TIP MEM if not in MAIN |
| 241B | 29D6 | 805 | | CALL TOGGLE_TM | ;toggle TIP MEMORY mode |
| 241D | 20F6 | 806 | NOT_IN_MAIN2: | SJMP CL_AND_EXIT | ;blank key and exit |
| | | 807 | | | |
| 241F | 991237 | 808 | TEST_CAL: | CMPB E_DATA,#12H | ;test for CALIBRATE key |
| 2422 | D755 | 809 | | JNE TEST_CAL_SE1 | ;continue to cal select test |
| 2424 | 990638 | 810 | | CMPB MODE_STATUS,#06H | ;test if cal 1 mode |
| 2427 | D70C | 811 | | JNE TEST_CAL_2 | ;continue key test if not cal 1 |
| 2429 | 9901B1 | 812 | | CMPB CAL_COMP_FLAG,#01H | ;is calibration complete flag set |
| 242C | D702 | 813 | | JNE FIRST_C1 | ;continue to first CAL 1 press |
| 242E | 20E5 | 814 | | SJMP CL_AND_EXIT | ;clear entry and exit |
| 2430 | EF9F0C | 815 | FIRST_C1: | CALL FIRST_CAL_1 | ;first CAL 1 mode button press |
| 2433 | 20E0 | 816 | | SJMP CL_AND_EXIT | ;clear entry and exit |
| 2435 | 990738 | 817 | TEST_CAL_2: | CMPB MODE_STATUS,#07H | ;test if cal 2 mode |
| 2438 | D719 | 818 | | JNE TEST_CAL_3 | ;continue key test if not cal 2 |
| 243A | 9901B1 | 819 | | CMPB CAL_COMP_FLAG,#01H | ;is calibration complete flag set |
| 243D | D702 | 820 | | JNE FIRST_C2 | ;continue to first CAL 1 press |
| 243F | 20D4 | 821 | | SJMP CL_AND_EXIT | ;clear entry and exit |
| 2441 | 990091 | 822 | FIRST_C2: | CMPB TC_CAL_FLAG,#00H | ;if first cal 2 reset index |
| 2444 | D705 | 823 | | JNE CAL2_PRESS | ;continue cal 2 |
| 2446 | EF3D0D | 824 | | CALL FIRST_CAL_2 | ;first CAL 2 mode button press |
| 2449 | 2003 | 825 | | SJMP MORE_CAL_2 | ;continue CAL 2 service |
| 244B | EF520D | 826 | CAL2_PRESS: | CALL CAL2_PRESSED | ;cal buttoned pressed while in cal 2 |
| 244E | B10191 | 827 | MORE_CAL_2: | LDB TC_CAL_FLAG,#01H | ;set CAL flag here |
| 2451 | 20C2 | 828 | | SJMP CL_AND_EXIT | ;clear entry and exit |
| 2453 | 990838 | 829 | TEST_CAL_3: | CMPB MODE_STATUS,#08H | ;test if cal 3 mode |
| 2456 | D71D | 830 | | JNE CALL_TOGGLE | ;exit CAL if not CAL 3 |
| 2458 | 9901B1 | 831 | | CMPB CAL_COMP_FLAG,#01H | ;is calibration complete flag set |
| 245B | D702 | 832 | | JNE TEST_BIAS_F | ;continue to first CAL 1 press |
| 245D | 20B6 | 833 | | SJMP CL_AND_EXIT | ;clear entry and exit |
| 245F | 990190 | 834 | TEST_BIAS_F: | CMPB BIAS_RUN_FLAG,#01H | ;test if bias flag is set |
| 2462 | D704 | 835 | | JNE SET_BIAS_FLAG | ;if reset then set |
| 2464 | 1190 | 836 | | CLRB BIAS_RUN_FLAG | ;if set then clear here |
| 2466 | 20AD | 837 | | SJMP CL_AND_EXIT | ;clear entry and exit |
| 2468 | B10190 | 838 | SET_BIAS_FLAG: | LDB BIAS_RUN_FLAG,#01H | ;set bias flag here |
| 246B | 1124 | 839 | | CLRB SCALEW3 | ;clear OP ampl bias integrator LSB |
| 246D | B17F24 | 840 | | LDB SCALEW3,#7FH | ;initialize OP amp bias integrator MSB |
| 2470 | EF800B | 841 | | CALL INIT_DISP_C3B | ;initialize cal 3 bias on screen |
| 2473 | 20A0 | 842 | | SJMP CL_AND_EXIT | ;clear entry and exit |
| 2475 | 2983 | 843 | CALL_TOGGLE: | CALL TOGGLE_CAL | ;toggle cal mode |
| 2477 | 209C | 844 | | SJMP CL_AND_EXIT | ;clear entry and exit |
| 2479 | 990538 | 845 | TEST_CAL_SE1: | CMPB MODE_STATUS,#05H | ;test if in cal mode |
| 247C | D727 | 846 | | JNE TEST_OPT | ;go to next key test |
| 247E | 990137 | 847 | | CMPB E_DATA,#01H | ;test if cal 1 selected |
| 2481 | D708 | 848 | | JNE TEST_CAL_SE2 | ;test next cal mode |
| 2483 | B10638 | 849 | | LDB MODE_STATUS,#06H | ;set mode 6 |

MCS-96 MACRO ASSEMBLER         THIRTEENTH.A9(                                                    02/04/93 10:35:11 P

```
LOC  OBJECT       STMT        SOURCE STATEMENT
2486 EF4708        850                   CALL  INIT_DISP_C1A         ;initialize cal 1 display
2489 208A          851                   SJMP  CL_AND_EXIT           ;clear entry and exit
248B 990237        852   TEST_CAL_SE2:   CMPB  E_DATA,#02H           ;test if cal 2 selected
248E D708          853                   JNE   TEST_CAL_SE3          ;test next cal mode
2490 B10738        854                   LDB   MODE_STATUS,#07H      ;set mode 6
2493 EF480B        855                   CALL  INIT_DISP_C2A         ;initialize cal 1 display
2496 207D          856                   SJMP  CL_AND_EXIT           ;clear entry and exit
2498 990337        857   TEST_CAL_SE3:   CMPB  E_DATA,#03H           ;test if cal 3 selected
249B D708          858                   JNE   TEST_OPT              ;go to next key test
249D B10838        859                   LDB   MODE_STATUS,#08H      ;set mode 6
24A0 EF4908        860                   CALL  INIT_DISP_C3A         ;initialize cal 1 display
24A3 2070          861                   SJMP  CL_AND_EXIT           ;clear entry and exit
                   862
24A5 991337        863   TEST_OPT:       CMPB  E_DATA,#13H           ;test for OPT key
24A8 D737          864                   JNE   TEST_OPT_M01          ;go to next mode test
24AA 990138        865                   CMPB  MODE_STATUS,#01H      ;is OPTION entered from MAIN mode
24AD D717          866                   JNE   NEXT_OPTION1          ;test next mode
24AF 2964          867                   CALL  TOGGLE_OPTM           ;toggle MAIN OPTION
24B1 99006C        868                   CMPB  POWER_FLAG,#00H       ;is heater off
24B4 D708          869                   JNE   POWER_ON              ;no - heater on
24B6 EFA408        870                   CALL  WRITE_M03_OFF         ;display 1)HEATER_OFF *
24B9 EFAD08        871                   CALL  WRITE_M03_ON          ;display 2)HEATER_ON
24BC 2057          872                   SJMP  CL_AND_EXIT           ;clear key and exit
24BE EFB008        873   POWER_ON:       CALL  WRITE_M04_OFF         ;display 1)HEATER_OFF
24C1 EFB708        874                   CALL  WRITE_M04_ON          ;display 2)HEATER_ON *
24C4 204F          875                   SJMP  CL_AND_EXIT           ;clear key and exit
24C6 990238        876   NEXT_OPTION1:   CMPB  MODE_STATUS,#02H      ;is OPTION entered from LOCK mode
24C9 D704          877                   JNE   NEXT_OPTION2          ;test next mode
24CB 2962          878                   CALL  TOGGLE_OPTL           ;toggle LOCK OPTION
24CD 2046          879                   SJMP  CL_AND_EXIT           ;clear key and exit
24CF 990338        880   NEXT_OPTION2:   CMPB  MODE_STATUS,#03H      ;is OPTION entered from PRE-SELECT
24D2 D704          881                   JNE   NEXT_OPTION3          ;test next mode
24D4 2960          882                   CALL  TOGGLE_OPTP           ;toggle PRE_SELECT option
24D6 203D          883                   SJMP  CL_AND_EXIT           ;clear key and exit
24D8 990438        884   NEXT_OPTION3:   CMPB  MODE_STATUS,#04H      ;is OPTION entered from TIP MEMORY
24DB D73B          885                   JNE   EXIT_MODE             ;exit if no mode found
24DD 295E          886                   CALL  TOGGLE_TMA            ;toggle TIP SELECT A
24DF 2034          887                   SJMP  CL_AND_EXIT           ;clear key and exit
                   888
24E1 990938        889   TEST_OPT_M01:   CMPB  MODE_STATUS,#09H      ;test if in MAIN OPTION mode
24E4 D732          890                   JNE   EXIT_MODE             ;no modes selected
24E6 990137        891                   CMPB  E_DATA,#01H           ;test if DISPLAY TEMPS selected
24E9 D704          892                   JNE   TEST_OPT_M02          ;test next mode
24EB 2957          893                   CALL  TOGGLE_M01            ;toggle mode 3 screen DISPLAY TEMPS
24ED 2026          894                   SJMP  CL_AND_EXIT           ;blank key and exit
24EF 990237        895   TEST_OPT_M02:   CMPB  E_DATA,#02H           ;test if TC TEMP+ALARM selected
24F2 D704          896                   JNE   TEST_OPT_M03          ;test next option
24F4 2955          897                   CALL  TOGGLE_M02            ;toggle mode 4 screen TC TEMP+ALARM
24F6 201D          898                   SJMP  CL_AND_EXIT           ;blank key and exit
24F8 990337        899   TEST_OPT_M03:   CMPB  E_DATA,#03H           ;test if HEATER OFF selected
24FB D70A          900                   JNE   TEST_OPT_M04          ;test next option
24FD 116C          901                   CLRB  POWER_FLAG            ;turn off power
24FF EF5B08        902                   CALL  WRITE_M03_OFF         ;display HEATER OFF *
2502 EF6208        903                   CALL  WRITE_M03_ON          ;display HEATER ON
2505 200E          904                   SJMP  CL_AND_EXIT           ;blank key and exit
2507 990437        905   TEST_OPT_M04:   CMPB  E_DATA,#04H           ;test if HEATER ON selected
250A D709          906                   JNE   CL_AND_EXIT           ;blank key and exit
```

MCS-96 MACRO ASSEMBLER    THIRTEENTH.A9                                              02/04/93 10:35:11

```
LOC  OBJECT        STMT        SOURCE STATEMENT
250C B1016C        907                      LDB    POWER_FLAG,#01H        ;turn power on
250F EF5F08        908                      CALL   WRITE_M04_OFF          ;display HEATER OFF
2512 EF6609        909                      CALL   WRITE_M04_ON           ;display HEATER ON *
2515 B1FF37        910         CL_AND_EXIT: LDB    E_DATA,#0FFH           ;blank key and exit
2518 F0            911         EXIT_MODE:   RET                           ;return
                   912
251A C800          913         L_LIMIT:     DCW    00C8H                  ;low temperature limit 400 deg F
251C 2003          914         H_LIMIT:     DCW    0320H                  ;high temperature limit 800 deg F
                   915
251E 98393A        916         MAIN_ENTER:  CMPB   ENTRY_NUM,NUM_OF_DIG   ;test if display is blank
2521 DF32          917                      JE     EXIT_M_ENTER           ;do not enter blanks
2523 C842          918                      PUSH   ELSB                   ;push LSB onto stack
2525 C844          919                      PUSH   E2SB                   ;push 2SB onto stack
2527 C846          920                      PUSH   EMSB                   ;push MSB onto stack
2529 EF2C0A        921                      CALL   DECIMAL_HEX            ;convert entry digits to hex
252C CC3C          922                      POP    ENTRY_DATA             ;pop ENTRY from stack
252E A11A251E      923                      LD     TEMPW1,#L_LIMIT        ;get low limit offset
2532 8A1E3C        924                      CMP    ENTRY_DATA,[TEMPW1]    ;test for less than 200 degrees
2535 DE1E          925                      JLT    EXIT_M_ENTER           ;do not enter less than 200 degress
2537 A11C251E      926                      LD     TEMPW1,#H_LIMIT        ;get high limit offset
253B 8A1E3C        927                      CMP    ENTRY_DATA,[TEMPW1]    ;test for more than 800 degrees
253E D215          928                      JGT    EXIT_M_ENTER           ;do not enter more than 800 degrees
2540 B0393A        929                      LDB    ENTRY_NUM,NUM_OF_DIG   ;reset entry position
2543 A1FF0042      930                      LD     ELSB,#00FFH            ;blank entry LSB
2547 A1FF0044      931                      LD     E2SB,#00FFH            ;blank entry 2SB
254B A1FF0046      932                      LD     EMSB,#00FFH            ;blank entry MSB
254F A03C3E        933                      LD     MAIN_SET,ENTRY_DATA    ;put entry in set
2552 EF4611        934                      CALL   WR_NVR_SET             ;update NV-RAM
2555 F0            935         EXIT_M_ENTER: RET                          ;return
                   936
2556 0000          937         ALARML_LIMIT: DCW   0000H                  ;low temperature limit 0 deg F
2558 9403          938         ALARMH_LIMIT: DCW   0394H                  ;high temperature limit 900 deg F
                   939
255A 98393A        940         ALARM_ENTER: CMPB   ENTRY_NUM,NUM_OF_DIG   ;test if display is blank
255D DF34          941                      JE     EXIT_A_ENTER           ;do not enter blanks
255F C842          942                      PUSH   ELSB                   ;push LSB onto stack
2561 C844          943                      PUSH   E2SB                   ;push 2SB onto stack
2563 C846          944                      PUSH   EMSB                   ;push MSB onto stack
2565 EFF009        945                      CALL   DECIMAL_HEX            ;convert entry digits to hex
2568 CC3C          946                      POP    ENTRY_DATA             ;pop ENTRY from stack
256A A156251E      947                      LD     TEMPW1,#ALARML_LIMIT   ;get low limit offset
256E 8A1E3C        948                      CMP    ENTRY_DATA,[TEMPW1]    ;test for less than 0 degrees
2571 DE20          949                      JLT    EXIT_A_ENTER           ;do not enter less than 0 degress
2573 A158251E      950                      LD     TEMPW1,#ALARMH_LIMIT   ;get high limit offset
2577 8A1E3C        951                      CMP    ENTRY_DATA,[TEMPW1]    ;test for more than 900 degrees
257A D217          952                      JGT    EXIT_A_ENTER           ;do not enter more than 900 degress
257C B0393A        953                      LDB    ENTRY_NUM,NUM_OF_DIG   ;reset entry position
257F A1FF0042      954                      LD     ELSB,#00FFH            ;blank entry LSB
2583 A1FF0044      955                      LD     E2SB,#00FFH            ;blank entry 2SB
2587 A1FF0046      956                      LD     EMSB,#00FFH            ;blank entry MSB
258B A03CAE        957                      LD     ALARM_SET,ENTRY_DATA   ;put entry in set
258E 11B3          958                      CLRB   ALARM_FLAG             ;reset alarm flag
2590 EF1A11        959                      CALL   WR_NVR_ALARM           ;update NV-RAM
2593 F0            960         EXIT_A_ENTER: RET                          ;return
                   961
2594 A04442        962         MAIN_LEFT:   LD     ELSB,E2SB              ;shift right
2597 A04644        963                      LD     E2SB,EMSB              ;shift right
```

MCS-96 MACRO ASSEMBLER    THIRTEENTH.A9                                              02/04/93 10:35:11 A

```
LOC  OBJECT          STMT      SOURCE STATEMENT
259A A1FF0046         964                    LD   EMSB,#0FFH             ;put blank in MSB
259E 98393A           965                    CMPB ENTRY_NUM,NUM_OF_DIG   ;stop when entry num = num dig
25A1 DF02             966                    JE   EXIT_M_LEFT            ;here
25A3 173A             967                    INCB ENTRY_NUM              ;back out entry counter
25A5 F0               968      EXIT_M_LEFT:  RET                         ;return
                      969
25A6 990138           970      MAIN_UP:      CMPB MODE_STATUS,#01H       ;test for main mode
25A9 D716             971                    JNE  EXIT_M_UP              ;do not increment if not main mode
25AB A11A251E         972                    LD   TEMPW1,#L_LIMIT        ;get low limit
25AF 8A1E3E           973                    CMP  MAIN_SET,[TEMPW1]      ;test if set is less than low limit
25B2 DE0D             974                    JLT  EXIT_M_UP              ;do not incr if less than low limit
25B4 A11C251E         975                    LD   TEMPW1,#H_LIMIT        ;get high limit offset
25B8 8A1E3E           976                    CMP  MAIN_SET,[TEMPW1]      ;test high limit
25BB D604             977                    JGE  EXIT_M_UP              ;exit if SET data at limit
25BD 073E             978                    INC  MAIN_SET               ;increment SET data
25BF 1135             979                    CLRB KEY_PREVIOUS           ;force reiteration
25C1 F0               980      EXIT_M_UP:    RET                         ;return
                      981
25C2 990138           982      MAIN_DOWN:    CMPB MODE_STATUS,#01H       ;test if main mode
25C5 D70D             983                    JNE  EXIT_M_DOWN            ;do not increment if not main mode
25C7 A11A251E         984                    LD   TEMPW1,#L_LIMIT        ;get low limit offset
25CB 8A1E3E           985                    CMP  MAIN_SET,[TEMPW1]      ;test low limit
25CE DA04             986                    JLE  EXIT_M_DOWN            ;exit if set data at limit
25D0 053E             987                    DEC  MAIN_SET               ;decrement set data
25D2 1135             988                    CLRB KEY_PREVIOUS           ;force reiteration
25D4 F0               989      EXIT_M_DOWN:  RET                         ;return
                      990
25D5 A1FF0042         991      MAIN_ESCAPE:  LD   ELSB,#0OFFH            ;blank entry LSB
25D9 A1FF0044         992                    LD   E2SB,#0OFFH            ;blank entry 2SB
25DD A1FF0046         993                    LD   EMSB,#0OFFH            ;blank entry MSB
25E1 B0393A           994                    LDB  ENTRY_NUM,NUM_OF_DIG   ;reset entry counter
25E4 F0               995                    RET                         ;return
                      996
25E5 B10238           997      TOGGLE_LOCK:  LDB  MODE_STATUS,#02H       ;enter LOCK MODE_2
25E8 EFC906           998                    CALL INIT_DISP_L1           ;initialize LOCK MODE screen
25EB F0               999      NO_LOCK:      RET                         ;clear key and exit
                     1000
25EC B10338          1001      TOGGLE_PRE_S: LDB  MODE_STATUS,#03H       ;enter PRE-SELECT MODE_3
25EF EFC906          1002                    CALL INIT_DISP_P1           ;initialize PRE-SELECT MODE screen
25F2 F0              1003      NO_PRE_SEL:   RET                         ;clear and exit
                    1004
                    1005
25F3 B10438         1006      TOGGLE_TM:    LDB  MODE_STATUS,#04H       ;enter TIP MEMORY MODE_4
25F6 EFC906         1007                    CALL INIT_DISP_TM           ;initialize TIP MEMORY MODE screen
25F9 F0             1008      NO_TIP_MEM:   RET
                   1009
25FA 990138        1010      TOGGLE_CAL:   CMPB MODE_STATUS,#01H       ;only enter CAL mode from MAIN mode
25FD D715          1011                    JNE  NO_CAL                 ;do not set CAL mode
25FF B10538        1012      SET_CAL:      LDB  MODE_STATUS,#05H       ;enter CALIBRATE MODE_5
2602 EFC406        1013                    CALL INIT_DISP_CO           ;initialize CALIBRATE MODE screen
2605 A1FF0042      1014                    LD   ELSB,#0OFFH            ;blank entry LSB
2609 A1FF0044      1015                    LD   E2SB,#0OFFH            ;blank entry 2SB
260D A1FF0046      1016                    LD   EMSB,#0OFFH            ;blank entry MSB
2611 B1013A        1017                    LDB  ENTRY_NUM,#01H         ;one entry digit
2614 F0            1018      NO_CAL:       RET                         ;clear key and exit
                  1019
2615 B10938        1020      TOGGLE_OPTM:  LDB  MODE_STATUS,#09H       ;enter MAIN option mode
```

MCS-96 MACRO ASSEMBLER    THIRTEENTH.A9,                                02/04/93 10:35:11 P

```
LOC  OBJECT          STMT        SOURCE STATEMENT
2618 EFE606          1021                CALL  INIT_DISP_M0           ;initialize optional mode screen
261B 99006C          1022                CMPB  POWER_FLAG,#00H         ;is heater off
261E D708            1023                JNE   POWER_ON2               ;no - heater on
2620 EF3A07          1024                CALL  WRITE_M03_OFF           ;display 1)HEATER_OFF *
2623 EF4107          1025                CALL  WRITE_M03_ON            ;display 2)HEATER_ON
2626 2006            1026                SJMP  EXIT_OPTM               ;clear key and exit
2628 EF4607          1027   POWER_ON2:   CALL  WRITE_M04_OFF           ;display 1)HEATER_OFF
262B EF4D07          1028                CALL  WRITE_M04_ON            ;display 2)HEATER_ON *
262E F0              1029   EXIT_OPTM:   RET                           ;return
                     1030
262F B11038          1031   TOGGLE_OPTL: LDB   MODE_STATUS,#10H        ;enter LOCK option mode
2632 EFE106          1032                CALL  INIT_DISP_02            ;initialize optional mode screen
2635 F0              1033                RET                           ;return
                     1034
2636 B11138          1035   TOGGLE_OPTP: LDB   MODE_STATUS,#11H        ;enter PRE-SELECT TEMP option mode
2639 EFE106          1036                CALL  INIT_DISP_03            ;initialize optional mode screen
263C F0              1037                RET                           ;return
                     1038
263D B11238          1039   TOGGLE_TMA:  LDB   MODE_STATUS,#12H        ;enter TIP MEMORY A
2640 EFE106          1040                CALL  INIT_DISP_TMA           ;initialize screen  TIP MEMORY
2643 F0              1041                RET                           ;return
                     1042
2644 B11338          1043   TOGGLE_M01:  LDB   MODE_STATUS,#13H        ;set mode 13 display temperatures
2647 EFBE06          1044                CALL  INIT_DISP_M01           ;initialize MAIN OPTION 1) screen
264A F0              1045                RET                           ;return
                     1046
264B B11438          1047   TOGGLE_M02:  LDB   MODE_STATUS,#14H        ;set mode 14 temperature meter
264E EFBE06          1048                CALL  INIT_DISP_M02           ;initialize MAIN OPTION 2) screen
2651 F0              1049                RET                           ;return
                     1050
2652 B10138          1051   SET_MAIN:    LDB   MODE_STATUS,#01H        ;enter MAIN MODE
2655 EF5506          1052                CALL  INIT_DISP_M1            ;initialize MAIN MODE screen
2658 A1FF0042        1053                LD    ELSB,#00FFH             ;blank entry LSB
265C A1FF0044        1054                LD    E2SB,#00FFH             ;blank entry 2SB
2660 A1FF0046        1055                LD    EMSB,#00FFH             ;blank entry MSB
2664 B0393A          1056                LDB   ENTRY_NUM,NUM_OF_DIG    ;reset entry digit
2667 F0              1057                RET
                     1058
                     1059   ;         *********** END MODE SELECT SUBROUTINE ************
                     1060
                     1061   ;         *************** ASSEMBLE KEY ENTRY ****************
                     1062
2668 99013A          1063   ASSEMBLE_KEY: CMPB ENTRY_NUM,#01H          ;test if entry complete
266B DE15            1064                JLT   NO_ASSEMBLE             ;entry complete
266D 99FF37          1065                CMPB  E_DATA,#0FFH            ;test if E_DATA blank
2670 DF10            1066                JE    NO_ASSEMBLE             ;exit if blank
2672 991337          1067                CMPB  E_DATA,#13H             ;test if E_DATA is OPT key
2675 DF0B            1068                JE    NO_ASSEMBLE             ;exit if blank
2677 B04446          1069                LDB   EMSB,E2SB               ;shift entry to left
267A A04244          1070                LD    E2SB,ELSB               ;shift entry to left
267D B03742          1071                LDB   ELSBL,E_DATA            ;put key entry in entry LSB
2680 153A            1072                DECB  ENTRY_NUM               ;decrement digit counter
2682 F0              1073   NO_ASSEMBLE: RET                           ;return
                     1074
                     1075   ;         ************ END ASSEMBLE KEY ENTRY **************
                     1076
                     1077   ;         *************** HEX TO ASCII TABLE ***************
```

MCS-96 MACRO ASSEMBLER    THIRTEENTH.A9t                                           02/04/93 10:35:11  A

```
LOC  OBJECT              STMT       SOURCE STATEMENT
                         1078
2683 3031323334353637    1079  HEX_ASCII:   DCB  '01234567'
268B 3839454C55444C58    1080               DCB  '89ELUDLX'
2693 5054434F20          1081               DCB  'PTCO '
                         1082
                         1083  ;            ************** END HEX TO ASCII TABLE **************
                         1084
                         1085  ;            ************** TC TEMPERATURE ALARM ****************
                         1086
2698 991438              1087  ALARM:       CMPB MODE_STATUS,#14H    ;is the alarm mode set
269B D714                1088               JNE  EXIT_ALARM          ;exit if not alarm mode
269D 89A5A4              1089               CMP  TC_OUT,ALARM_SET    ;has alarm temperature been reached
26A0 DE0C                1090               JLT  SET_ALARM_FL        ;set alarm if below set temperature
26A2 9901B3              1091               CMPB ALARM_FLAG,#01H     ;is the alarm set
26A5 D70A                1092               JNE  EXIT_ALARM          ;exit
26A7 EFC110              1093               CALL BEEP                ;beep alarm
26AA 11B3                1094               CLRB ALARM_FLAG          ;turn off flag after beeping
26AC 2003                1095               SJMP EXIT_ALARM          ;exit
26AE B101B3              1096  SET_ALARM_FL: LDB ALARM_FLAG,#01H     ;set alarm flag
26B1 F0                  1097  EXIT_ALARM:  RET                      ;return
                         1098
                         1099  ;            ************ END TC TEMPERATURE ALARM **************
                         1100
                         1101  ;            ****************** DISPLAY DATA *********************
                         1102
26B2 454E545259202020    1103  DISP_M1:     DCB  'ENTRY   '
26BA 2020202020DF4620    1104               DCB  '     ',0DFH,'F '
26C2 5345542054454D50    1105               DCB  'SET TEMP'
26CA 2020202020DF4620    1106               DCB  '     ',0DFH,'F '
26D2 5449502054454D50    1107               DCB  'TIP TEMP'
26DA 2020202020DF4620    1108               DCB  '     ',0DFH,'F '
26E2 504F574552202020    1109               DCB  'POWER   '
26EA 2020202020202020    1110               DCB  '        '
                         1111
26F2 202020204C4F434B    1112  DISP_L1:     DCB  '    LOCK'
26FA 4D4F444520202020    1113               DCB  'MODE    '
2702 2020202020202020    1114               DCB  '        '
270A 2020202020202020    1115               DCB  '        '
2712 454E54455220434F    1116               DCB  'ENTER CO'
271A 4445202020202020    1117               DCB  'DE      '
2722 2020202020202020    1118               DCB  '        '
272A 2020202020202020    1119               DCB  '        '
                         1120
2732 3129343030202020    1121  DISP_P1:     DCB  '1)400   '
273A 2020322935303020    1122               DCB  ' 2)500  '
2742 3329363530202020    1123               DCB  '3)650   '
274A 2020342938303020    1124               DCB  ' 4)800  '
2752 53454C2054454D50    1125               DCB  'SEL TEMP'
275A 204F522020202020    1126               DCB  ' OR     '
2762 5052455353204F50    1127               DCB  'PRESS OP'
276A 5420544F20434847    1128               DCB  'T TO CHG'
                         1129
2772 4850                1130  HPX:         DCB  'HP'       ;tip styles
2774 4354                1131  CTX:         DCB  'CT'
2776 4C55                1132  LUX:         DCB  'LU'
2778 4C54                1133  LTX:         DCB  'LT'
                         1134
```

```
MCS-96 MACRO ASSEMBLER    THIRTEENTH.A96                              02/04/93 10:35:11

LOC   OBJECT              STMT      SOURCE STATEMENT
277A  53454C4543542031    1135  DISP_TM:   DCB  'SELECT 1'    ;mode 4
2782  2948503337343120    1136             DCB  ')HP3741 '
278A  544950204F522032    1137             DCB  'TIP OR 2'
2792  2948504130322020    1138             DCB  ')HPA02  '
279A  4F505420544F2033    1139             DCB  'OPT TO 3'
27A2  2943543437352020    1140             DCB  ')CT475  '
27AA  4544495420202034    1141             DCB  'EDIT   4'
27B2  2948503434343120    1142             DCB  ')HP4441 '
                          1143
27BA  53454C4543542031    1144  DISP_TMA:  DCB  'SELECT 1'    ;tip memory mode 12
27C2  2948503337343120    1145             DCB  ')HP3741 '
27CA  54495020544F2032    1146             DCB  'TIP TO 2'
27D2  2948504130322020    1147             DCB  ')HPA02  '
27DA  4544495420202033    1148             DCB  'EDIT   3'
27E2  2943543437352020    1149             DCB  ')CT475  '
27EA  2020202020202034    1150             DCB  '       4'
27F2  2948503434343120    1151             DCB  ')HP4441 '
                          1152
27FA  53454C4543542020    1153  DISP_TMB:  DCB  'SELECT  '    ;tip memory mode 15
2802  31203D2048502020    1154             DCB  '1 = HP  '
280A  5449502020202020    1155             DCB  'TIP     '
2812  32203D2043542020    1156             DCB  '2 = CT  '
281A  535459594C452020    1157             DCB  'STYLE   '
2822  33203D204C552020    1158             DCB  '3 = LU  '
282A  2020202020202020    1159             DCB  '        '
2832  34203D204C542020    1160             DCB  '4 = LT  '
                          1161
283A  454E544552205449    1162  DISP_TMC:  DCB  'ENTER TI'    ;tip memory option 16
2842  50204E554D424552    1163             DCB  'P NUMBER'
284A  2020202020202020    1164             DCB  '        '
2852  3229435420202020    1165             DCB  '2)CT    '
285A  2020202020202020    1166             DCB  '        '
2862  2020202020202020    1167             DCB  '        '
286A  2020202020202020    1168             DCB  '        '
2872  2020202020202020    1169             DCB  '        '
                          1170
287A  43414C4942524154    1171  DISP_CO:   DCB  'CALIBRAT'
2882  4520202020202020    1172             DCB  'E       '
288A  53454C454354204F    1173             DCB  'SELECT O'
2892  5054494F4E202020    1174             DCB  'PTION   '
289A  3129544950205445    1175             DCB  '1)TIP TE'
28A2  4D50203229544320    1176             DCB  'MP 2)TC '
28AA  54454D5020333941    1177             DCB  'TEMP 3)A'
28B2  4D504C204249.4153   1178             DCB  'MPL BIAS'
                          1179
28BA  43414C2054495020    1180  DISP_C1A:  DCB  'CAL TIP '
28C2  53454E534F522020    1181             DCB  'SENSOR  '
28CA  5052455353204341    1182             DCB  'PRESS CA'
28D2  4C20544F2052554E    1183             DCB  'L TO RUN'
28DA  5449502054454D50    1184             DCB  'TIP TEMP'
28E2  2020202020DF4620    1185             DCB  '   ',0DFH,'F '
28EA  5443202054454D50    1186             DCB  'TC TEMP'
28F2  2020202020DF4620    1187             DCB  '   ',0DFH,'F '
                          1188
28FA  52554E4E494E4720    1189  DISP_C1B:  DCB  'RUNNING '
2902  5449502043414C20    1190             DCB  'TIP CAL '
290A  5345542054454D50    1191             DCB  'SET TEMP'
```

MCS-96 MACRO ASSEMBLER    THIRTEENTH.A96                                    02/04/93 10:35:11 P

```
LOC  OBJECT              STMT      SOURCE STATEMENT
2912 2020202020DF4620    1192              DCB  '    ',0DFH,'F '
291A 5449502054454D50    1193              DCB  'TIP TEMP'
2922 2020202020DF4620    1194              DCB  '    ',0DFH,'F '
292A 5443202054454D50    1195              DCB  'TC  TEMP'
2932 2020202020DF4620    1196              DCB  '    ',0DFH,'F '
                         1197
293A 43414C4942524154    1198  DISP_C2A:   DCB  'CALIBRAT'
2942 4520544320202020    1199              DCB  'E TC    '
294A 5052455353204341    1200              DCB  'PRESS CA'
2952 4C20544F2052554E    1201              DCB  'L TO RUN'
295A 2020202020202020    1202              DCB  '        '
2962 2020202020202020    1203              DCB  '        '
296A 5443202054454D50    1204              DCB  'TC  TEMP'
2972 2020202020DF4620    1205              DCB  '    ',0DFH,'F '
                         1206
297A 43414C4942524154    1207  DISP_C2B:   DCB  'CALIBRAT'
2982 4520544320202020    1208              DCB  'E TC    '
298A 5052455353204341    1209              DCB  'PRESS CA'
2992 4C20544F2052554E    1210              DCB  'L TO RUN'
299A 5345542054454D50    1211              DCB  'SET TEMP'
29A2 2020202020DF4620    1212              DCB  '    ',0DFH,'F '
29AA 5443202054454D50    1213              DCB  'TC  TEMP'
29B2 2020202020DF4620    1214              DCB  '    ',0DFH,'F '
                         1215
29BA 5443204F502D414D    1216  DISP_C3A:   DCB  'TC OP-AM'
29C2 504C204249415320    1217              DCB  'PL BIAS '
29CA 494E5354414C4C20    1218              DCB  'INSTALL '
29D2 4A554D5045522020    1219              DCB  'JUMPER  '
29DA 5052455353204341    1220              DCB  'PRESS CA'
29E2 4C20544F2052554E    1221              DCB  'L TO RUN'
29EA 4F46465345542020    1222              DCB  'OFFSET  '
29F2 2020202042495453    1223              DCB  '    BITS'
                         1224
29FA 5443204F502D414D    1225  DISP_C3B:   DCB  'TC OP-AM'
2A02 504C204249415320    1226              DCB  'PL BIAS '
2A0A 42494153204341AC    1227              DCB  'BIAS CAL'
2A12 2052554E4E494E47    1228              DCB  ' RUNNING'
2A1A 5052455353204553    1229              DCB  'PRESS ES'
2A22 4320544F20535450    1230              DCB  'C TO STP'
2A2A 4F46465345542020    1231              DCB  'OFFSET  '
2A32 2020202042495453    1232              DCB  '    BITS'
                         1233
2A3A 4155544F4D415449    1234  DISP_CCM:   DCB  'AUTOMATI'
2A42 4320202020202020    1235              DCB  'C       '
2A4A 43414C4942524154    1236              DCB  'CALIBRAT'
2A52 494F4E2020202020    1237              DCB  'ION     '
2A5A 434F4D504C455445    1238              DCB  'COMPLETE'
2A62 2020202020202020    1239              DCB  '        '
2A6A 45534320544F2043    1240              DCB  'ESC TO C'
2A72 4F4E54494E554520    1241              DCB  'ONTINUE '
                         1242
2A7A 3129444953504C41    1243  DISP_MO:    DCB  '1)DISPLA'   ;MAIN MODE OPTIONS
2A82 5920544554505320    1244              DCB  'Y TEMPS '
2A8A 3229544320544544    1245              DCB  '2)TC TEM'
2A92 502B414C41524D20    1246              DCB  'P+ALARM '
2A9A 3329484541544552    1247              DCB  '3)HEATER'
2AA2 204F464620202020    1248              DCB  ' OFF    '
```

MCS-96 MACRO ASSEMBLER    THIRTEENTH.A9.                                              02/04/93 10:35:11

```
LOC   OBJECT             STMT       SOURCE STATEMENT
2AAA  3429484541544552   1249                  DCB    '4)HEATER'
2AB2  204F4E2020202020   1250                  DCB    ' ON    '
                         1251
2ABA  4C4F434B204F5054   1252  DISP_02:         DCB    'LOCK OPT'    ;LOCK MODE OPTIONS
2AC2  494F4E5320202020   1253                  DCB    'IONS    '
2ACA  2020202020202020   1254                  DCB    '        '
2AD2  2020202020202020   1255                  DCB    '        '
2ADA  2020202020202020   1256                  DCB    '        '
2AE2  2020202020202020   1257                  DCB    '        '
2AEA  2020202020202020   1258                  DCB    '        '
2AF2  2020202020202020   1259                  DCB    '        '
                         1260
2AFA  54454D50204F5054   1261  DISP_03:         DCB    'TEMP OPT'    ;PRE-SELECT TEMP OPTIONS
2B02  494F4E5320202020   1262                  DCB    'IONS    '
2B0A  3129454449542054   1263                  DCB    '1)EDIT T'
2B12  454D505320202020   1264                  DCB    'EMPS    '
2B1A  2020202020202020   1265                  DCB    '        '
2B22  2020202020202020   1266                  DCB    '        '
2B2A  2020202020202020   1267                  DCB    '        '
2B32  2020202020202020   1268                  DCB    '        '
                         1269
2B3A  454E545259202020   1270  DISP_M01:        DCB    'ENTRY   '    ;display temperatures MAIN, SET, and TC
2B42  2020202020DF4620   1271                  DCB    '     ',0DFH,'F '
2B4A  5345542054454D50   1272                  DCB    'SET TEMP'
2B52  2020202020DF4620   1273                  DCB    '     ',0DFH,'F '
2B5A  5449502054454D50   1274                  DCB    'TIP TEMP'
2B62  2020202020DF4620   1275                  DCB    '     ',0DFH,'F '
2B6A  5443202054454D50   1276                  DCB    'TC  TEMP'
2B72  2020202020DF4620   1277                  DCB    '     ',0DFH,'F '
                         1278
2B7A  544845524D4F434F   1279  DISP_M02:        DCB    'THERMOCO'    ;display temperature of THERMOCOUPLE
2B82  5550404520202020   1280                  DCB    'UPLE    '
2B8A  5443202054454D5020 1281                  DCB    'TC TEMP '
2B92  202020202020DF46   1282                  DCB    '      ',0DFH,'F'
2B9A  53455420414C4152   1283                  DCB    'SET ALAR'
2BA2  4D202020202020DF46 1284                  DCB    'M     ',0DFH,'F'
2BAA  414C41524D205445   1285                  DCB    'ALARM TE'
2BB2  4D202020202020DF46 1286                  DCB    'MP    ',0DFH,'F'
                         1287
2BBA  202020205254554E   1288  RUNNING:         DCB    '    RUNN'
2BC2  494E472020202020   1289                  DCB    'ING     '
                         1290
2BCA  5052455353204341   1291  PRESS_CAL:       DCB    'PRESS CA'
2BD2  4C20544F2052554E   1292                  DCB    'L TO RUN'
                         1293
2BDA  414C41524D205345   1294  SET_ALARM:       DCB    'ALARM SE'
2BE2  5420202020202020   1295                  DCB    'T       '
                         1296
2BEA  414C41524D204F46   1297  CLEAR_ALARM:     DCB    'ALARM OF'
2BF2  4620202020202020   1298                  DCB    'F       '
                         1299
2BFA  484541544552204F   1300  OFF:             DCB    'HEATER O'
2C02  4646202020202020   1301                  DCB    'FF      '
                         1302
2C0A  3329484541544552   1303  M03_OFF:         DCB    '3)HEATER'
2C12  204F46462020 2020  1304                  DCB    ' OFF *  '
                         1305
```

```
MCS-96 MACRO ASSEMBLER    THIRTEENTH.A9                                        02/04/93 10:35:11 F

LOC   OBJECT              STMT      SOURCE STATEMENT
2C1A  3429484541544552    1306  M03_ON:     DCB   '4)HEATER'
2C22  204F4E2020202020    1307              DCB   ' ON    '
                          1308
2C2A  3329484541544552    1309  M04_OFF:    DCB   '3)HEATER'
2C32  204F464620202020    1310              DCB   ' OFF   '
                          1311
2C3A  3429484541544552    1312  M04_ON:     DCB   '4)HEATER'
2C42  204F4E20202A2020    1313              DCB   ' ON *  '
                          1314
2C4A  2A                  1315  STAR:       DCB   '*'
                          1316
2C4B  20                  1317  BLANK:      DCB   ' '
                          1318
                          1319  ;         *************** END DISPLAY DATA ******************
                          1320
                          1321  ;         ******* INITIALIZE DISPLAY MODE SUBROUTINE ********
                          1322
2C4C  01                  1323  CLEAR:      DCB   01H              ;clear display
2C4D  02                  1324  HOME:       DCB   02H              ;home cursor
2C4E  06                  1325  ENTRY_MODE: DCB   06H              ;set entry mode
2C4F  0C                  1326  DISP_ON:    DCB   0CH              ;turn display on
2C50  10                  1327  DISP_SHFT:  DCB   10H              ;set cursor shift mode
2C51  3C                  1328  FUNCTION:   DCB   3CH              ;set function
                          1329
2C52  A14C2C1E            1330  INIT_DISP_MD: LD  TEMPW1,#CLEAR    ;get clear
2C56  B21E1C              1331              LDB   TEMPB1,[TEMPW1]  ;now
2C59  C70102801C          1332              STB   TEMPB1,DISPLAY_MODE ;clear display
2C5E  EF2503              1333              CALL  DELAY_2MSEC      ;display execution time
2C61  A14D2C1E            1334              LD    TEMPW1,#HOME     ;get home
2C65  B21E1C              1335              LDB   TEMPB1,[TEMPW1]  ;now
2C68  C70102801C          1336              STB   TEMPB1,DISPLAY_MODE ;return cursor to home
2C6D  EF1603              1337              CALL  DELAY_2MSEC      ;display execution time
2C70  A14E2C1E            1338              LD    TEMPW1,#ENTRY_MODE ;get entry mode
2C74  B21E1C              1339              LDB   TEMPB1,[TEMPW1]  ;now
2C77  C70102801C          1340              STB   TEMPB1,DISPLAY_MODE ;entry mode
2C7C  EFFA02              1341              CALL  DELAY_40USEC     ;display execution time
2C7F  A14F2C1E            1342              LD    TEMPW1,#DISP_ON  ;get display on
2C83  B21E1C              1343              LDB   TEMPB1,[TEMPW1]  ;now
2C86  C70102801C          1344              STB   TEMPB1,DISPLAY_MODE ;turn on display
2C8B  EFE802              1345              CALL  DELAY_40USEC     ;display execution time
2C8E  A1502C1E            1346              LD    TEMPW1,#DISP_SHFT ;get display shift mode
2C92  B21E1C              1347              LDB   TEMPB1,[TEMPW1]  ;now
2C95  C70102801C          1348              STB   TEMPB1,DISPLAY_MODE ;cursor shift mode
2C9A  EFDC02              1349              CALL  DELAY_40USEC     ;display execution time
2C9D  A1512C1E            1350              LD    TEMPW1,#FUNCTION ;get function
2CA1  B21E1C              1351              LDB   TEMPB1,[TEMPW1]  ;now
2CA4  C70102801C          1352              STB   TEMPB1,DISPLAY_MODE ;set display function
2CA9  EFCD02              1353              CALL  DELAY_40USEC     ;display execution time
2CAC  F0                  1354              RET                    ;return from subroutine
                          1355
                          1356  ;         ***** END INITIALIZE DISPLAY MODE SUBROUTINE ******
                          1357
                          1358  ;         ******* INITIALIZE DISPLAY DATA SUBROUTINE ********
                          1359
                          1360
2CAD  A1B2261E            1361  INIT_DISP_M1: LD  TEMPW1,#DISP_M1  ;display MODE 1 screen
2CB1  28F7                1362              CALL  INIT_DISP_DX     ;call screen initialization
```

MCS-96 MACRO ASSEMBLER    THIRTEENTH.A9(                                    02/04/93 10:35:11

```
LOC   OBJECT        STMT     SOURCE STATEMENT
2CB3  F0            1363              RET                              ;return
                    1364
2CB4  A1F2261E      1365     INIT_DISP_L1: LD  TEMPW1,#DISP_L1          ;display LOCK 1 screen
2CB8  28F0          1366              CALL INIT_DISP_DX                 ;call screen initialization
2CBA  F0            1367              RET                               ;return
                    1368
2CBB  A132271E      1369     INIT_DISP_P1: LD  TEMPW1,#DISP_P1          ;display PRE-SELECT 1 screen
2CBF  28E9          1370              CALL INIT_DISP_DX                 ;call screen initialization
2CC1  F0            1371              RET                               ;return
                    1372
2CC2  A17A271E      1373     INIT_DISP_TM: LD  TEMPW1,#DISP_TM          ;display TIP-MEMORY screen
2CC6  28E2          1374              CALL INIT_DISP_DX                 ;call screen initialization
2CC8  F0            1375              RET                               ;return
                    1376
2CC9  A17A281E      1377     INIT_DISP_C0: LD  TEMPW1,#DISP_C0          ;display CALIBRATE 1 screen
2CCD  28DB          1378              CALL INIT_DISP_DX                 ;call screen initialization
2CCF  F0            1379              RET                               ;return
                    1380
2CD0  A1BA281E      1381     INIT_DISP_C1A: LD TEMPW1,#DISP_C1A         ;display CALIBRATE 1A screen
2CD4  28D4          1382              CALL INIT_DISP_DX                 ;call screen initialization
2CD6  F0            1383              RET                               ;return
                    1384
2CD7  A1FA281E      1385     INIT_DISP_C1B: LD TEMPW1,#DISP_C1B         ;display CALIBRATE 1B screen
2CDB  28CD          1386              CALL INIT_DISP_DX                 ;call screen initialization
2CDD  F0            1387              RET                               ;return
                    1388
2CDE  A13A291E      1389     INIT_DISP_C2A: LD TEMPW1,#DISP_C2A         ;display CALIBRATE 2A screen
2CE2  28C6          1390              CALL INIT_DISP_DX                 ;call screen initialization
2CE4  F0            1391              RET                               ;return
                    1392
2CE5  A17A291E      1393     INIT_DISP_C2B: LD TEMPW1,#DISP_C2B         ;display CALIBRATE 2B screen
2CE9  28BF          1394              CALL INIT_DISP_DX                 ;call screen initialization
2CEB  F0            1395              RET                               ;return
                    1396
2CEC  A1BA291E      1397     INIT_DISP_C3A: LD TEMPW1,#DISP_C3A         ;display CALIBRATE 3A screen
2CF0  28B8          1398              CALL INIT_DISP_DX                 ;call screen initialization
2CF2  F0            1399              RET                               ;return
                    1400
2CF3  A1FA291E      1401     INIT_DISP_C3B: LD TEMPW1,#DISP_C3B         ;display CALIBRATE 3B screen
2CF7  28B1          1402              CALL INIT_DISP_DX                 ;call screen initialization
2CF9  F0            1403              RET                               ;return
                    1404
2CFA  A13A2A1E      1405     INIT_DISP_CCM: LD TEMPW1,#DISP_CCM         ;display calibration complete message
2CFE  28AA          1406              CALL INIT_DISP_DX                 ;call screen initialization
2D00  F0            1407              RET                               ;return
                    1408
2D01  A17A2A1E      1409     INIT_DISP_M0: LD  TEMPW1,#DISP_M0          ;display MAIN OPTION screen
2D05  28A3          1410              CALL INIT_DISP_DX                 ;call screen initialization
2D07  F0            1411              RET                               ;return
                    1412
2D08  A13A2B1E      1413     INIT_DISP_M01: LD TEMPW1,#DISP_M01         ;display MAIN OPTION 1 screen
2D0C  289C          1414              CALL INIT_DISP_DX                 ;call screen initialization
2D0E  F0            1415              RET                               ;return
                    1416
2D0F  A17A2B1E      1417     INIT_DISP_M02: LD TEMPW1,#DISP_M02         ;display MAIN OPTION 2 screen
2D13  2895          1418              CALL INIT_DISP_DX                 ;call screen initialization
2D15  F0            1419              RET                               ;return
```

```
MCS-96 MACRO ASSEMBLER    THIRTEENTH.A9.                                           02/04/93 10:35:11

LOC   OBJECT          STMT        SOURCE STATEMENT
                      1420
2D16  A1BA2A1E        1421    INIT_DISP_02:  LD   TEMPW1,#DISP_02       ;display LOCK OPTION screen
2D1A  288E            1422                   CALL INIT_DISP_DX          ;call screen initialization
2D1C  F0              1423                   RET                        ;return
                      1424
2D1D  A1FA2A1E        1425    INIT_DISP_03:  LD   TEMPW1,#DISP_03       ;display PRE-SELECT TEMP OPTION screen
2D21  2887            1426                   CALL INIT_DISP_DX          ;call screen initialization
2D23  F0              1427                   RET                        ;return
                      1428
2D24  A1BA271E        1429    INIT_DISP_TMA: LD   TEMPW1,#DISP_TMA      ;display TIP MEMORY OPTION screen
2D28  2880            1430                   CALL INIT_DISP_DX          ;call screen initialization
2D2A  F0              1431                   RET                        ;return
                      1432
2D2B  A1BA2B1E        1433    WRITE_RUNNING: LD   TEMPW1,#RUNNING       ;display cal running message
2D2F  B1C01C          1434                   LDB  TEMPB1,#0C0H          ;display address for line 2
2D32  288B            1435                   CALL INIT_DISP             ;output line 2 to display
2D34  F0              1436                   RET
                      1437
2D35  A1CA2B1E        1438    ERASE_RUNNING: LD   TEMPW1,#PRESS_CAL     ;display cal running message
2D39  B1C01C          1439                   LDB  TEMPB1,#0C0H          ;display address for line 2
2D3C  2881            1440                   CALL INIT_DISP             ;output line 2 to display
2D3E  F0              1441                   RET
                      1442
2D3F  A1DA2B1E        1443    WRITE_ALARM:   LD   TEMPW1,#SET_ALARM     ;display cal running message
2D43  B1C01C          1444                   LDB  TEMPB1,#0C0H          ;display address for line 2
2D46  2877            1445                   CALL INIT_DISP             ;output line 2 to display
2D48  F0              1446                   RET
                      1447
2D49  A1EA2B1E        1448    ERASE_ALARM:   LD   TEMPW1,#CLEAR_ALARM   ;display cal running message
2D4D  B1C01C          1449                   LDB  TEMPB1,#0C0H          ;display address for line 2
2D50  286D            1450                   CALL INIT_DISP             ;output line 2 to display
2D52  F0              1451                   RET
                      1452
2D53  A1FA2B1E        1453    WRITE_OFF:     LD   TEMPW1,#OFF           ;display power off message
2D57  B1D01C          1454                   LDB  TEMPB1,#0D0H          ;display address for line 4
2D5A  2863            1455                   CALL INIT_DISP             ;output line 4 to display
2D5C  F0              1456                   RET
                      1457
2D5D  A10A2C1E        1458    WRITE_M03_OFF: LD   TEMPW1,#M03_OFF       ;display MAIN OPTION 1)HEATER OFF *
2D61  B1901C          1459                   LDB  TEMPB1,#090H          ;display address for line 2
2D64  2859            1460                   CALL INIT_DISP             ;output line 2 to display
2D66  F0              1461                   RET
                      1462
2D67  A11A2C1E        1463    WRITE_M03_ON:  LD   TEMPW1,#M03_ON        ;display MAIN OPTION 1)HEATER ON
2D6B  B1D01C          1464                   LDB  TEMPB1,#0D0H          ;display address for line 2
2D6E  284F            1465                   CALL INIT_DISP             ;output line 2 to display
2D70  F0              1466                   RET
                      1467
                      1468
2D71  A12A2C1E        1469    WRITE_M04_OFF: LD   TEMPW1,#M04_OFF       ;display MAIN OPTION 1)HEATER OFF
2D75  B1901C          1470                   LDB  TEMPB1,#090H          ;display address for line 2
2D78  2845            1471                   CALL INIT_DISP             ;output line 2 to display
2D7A  F0              1472                   RET
                      1473
2D7B  A13A2C1E        1474    WRITE_M04_ON:  LD   TEMPW1,#M04_ON        ;display MAIN OPTION 1)HEATER ON *
2D7F  B1D01C          1475                   LDB  TEMPB1,#0D0H          ;display address for line 2
2D82  283B            1476                   CALL INIT_DISP             ;output line 2 to display
```

```
MCS-96 MACRO ASSEMBLER    THIRTEENTH.A9                                          02/04/93 10:35:11

LOC   OBJECT          STMT        SOURCE STATEMENT
2D84  F0              1477                    RET
                      1478
2D85  A18F001C        1479   WRITE_STAR:  LD   TEMPB1,#8FH           ;display address for * row 1, col 16
2D89  9901B2          1480                CMPB STAR_FLAG,#01H        ;is power indicator flag set
2D8C  D706            1481                JNE  ER_STAR               ;erase power indicator MAIN mode
2D8E  A14A2C1E        1482                LD   TEMPW1,#STAR          ;display star (* power indicator)
2D92  2004            1483                SJMP WR_CHR_NOW            ;service display
2D94  A14B2C1E        1484   ER_STAR:     LD   TEMPW1,#BLANK         ;erase star
2D98  C70102801C      1485   WR_CHR_NOW:  STB  TEMPB1,DISPLAY_MODE   ;address of beginning of line 1
2D9D  29DA            1486                CALL DELAY_40USEC          ;display execution time
2D9F  B21E1D          1487                LDB  TEMPB2,[TEMPW1]       ;output indexed table to display
2DA2  C70103801D      1488                STB  TEMPB2,DISPLAY_DATA   ;now
2DA7  29D0            1489                CALL DELAY_40USEC          ;display execution time
2DA9  F0              1490                RET                        ;return
                      1491
2DAA  B1801C          1492   INIT_DISP_DX: LDB TEMPB1,#80H           ;display address for line 1
2DAD  2810            1493                CALL INIT_DISP             ;output line 1 to display
2DAF  B1C01C          1494                LDB  TEMPB1,#0C0H          ;display address for line 2
2DB2  280B            1495                CALL INIT_DISP             ;output line 2 to display
2DB4  B1901C          1496                LDB  TEMPB1,#90H           ;display address for line 3
2DB7  2806            1497                CALL INIT_DISP             ;output line 3 to display
2DB9  B1D01C          1498                LDB  TEMPB1,#0D0H          ;display address for line 4
2DBC  2801            1499                CALL INIT_DISP             ;output line 4 to display
2DBE  F0              1500                RET
                      1501
2DBF  C70102801C      1502   INIT_DISP:   STB  TEMPB1,DISPLAY_MODE   ;address of beginning of line 1
2DC4  29B3            1503                CALL DELAY_40USEC          ;display execution time
2DC6  B11034          1504                LDB  INDEXB1,#10H          ;initialize counter
2DC9  B21F1D          1505   ANOTHER_CHR: LDB  TEMPB2,[TEMPW1]+      ;output indexed table to display
2DCC  C70103801D      1506                STB  TEMPB2,DISPLAY_DATA   ;now
2DD1  29A6            1507                CALL DELAY_40USEC          ;display execution time
2DD3  1534            1508                DECB INDEXB1               ;decrement counter
2DD5  D7F2            1509                JNE  ANOTHER_CHR           ;more characters in table
2DD7  F0              1510                RET                        ;return
                      1511
                      1512   ;             ***** END INITIALIZE DISPLAY DATA SUBROUTINE ******
                      1513
                      1514   ;             ************** WRITE DATA TO DISPLAY **************
                      1515
2DD8  B18A1C          1516   WR_M1_L1:    LDB  TEMPB1,#08AH          ;character address
2DDB  A04248          1517                LD   TLSB,ELSB             ;initial temp LSB
2DDE  A0444A          1518                LD   T2SB,E2SB             ;initial temp 2SB
2DE1  A0464C          1519                LD   TMSB,EMSB             ;initial temp MSB
2DE4  2860            1520                CALL WR_MX_LX              ;output character to display
2DE6  F0              1521                RET
                      1522
2DE7  28ED            1523   WR_M1_L2:    CALL FORMAT_M1_L2          ;bin to dec and remove leading zeros
2DE9  B1CA1C          1524                LDB  TEMPB1,#0CAH          ;character address
2DEC  2858            1525                CALL WR_MX_LX              ;output character to display
2DEE  F0              1526                RET
                      1527
2DEF  28EB            1528   WR_M1_L3:    CALL FORMAT_M1_L3          ;bin to dec and remove leading zeros
2DF1  B19A1C          1529                LDB  TEMPB1,#09AH          ;character address
2DF4  2850            1530                CALL WR_MX_LX              ;output character to display
2DF6  F0              1531                RET
                      1532
2DF7  28E9            1533   WR_C1_L2:    CALL FORMAT_C1_L2          ;bin to dec and remove leading zeros
```

MCS-96 MACRO ASSEMBLER    THIRTEENTH.A9                                    02/04/93 10:35:11

```
LOC  OBJECT           STMT       SOURCE STATEMENT
2DF9 B1CA1C           1534              LDB  TEMPB1,#0CAH         ;character address
2DFC 2848             1535              CALL WR_MX_LX             ;output character to display
2DFE F0               1536              RET
                      1537
2DFF 28E7             1538  WR_C1_L3:   CALL FORMAT_C1_L3         ;bin to dec and remove leading zeros
2E01 B19A1C           1539              LDB  TEMPB1,#09AH         ;character address
2E04 2840             1540              CALL WR_MX_LX             ;output character to display
2E06 F0               1541              RET
                      1542
2E07 28E5             1543  WR_C1_L4:   CALL FORMAT_C1_L4         ;bin to dec and remove leading zeros
2E09 B1DA1C           1544              LDB  TEMPB1,#0DAH         ;character address
2E0C 2838             1545              CALL WR_MX_LX             ;output character to display
2E0E F0               1546              RET
                      1547
2E0F 28E3             1548  WR_C2_L3:   CALL FORMAT_C2_L3         ;bin to dec and remove leading zeros
2E11 B19A1C           1549              LDB  TEMPB1,#09AH         ;character address
2E14 2830             1550              CALL WR_MX_LX             ;output character to display
2E16 F0               1551              RET
                      1552
2E17 28E1             1553  WR_C2_L4:   CALL FORMAT_C2_L4         ;bin to dec and remove leading zeros
2E19 B1DA1C           1554              LDB  TEMPB1,#0DAH         ;character address
2E1C 2828             1555              CALL WR_MX_LX             ;output character to display
2E1E F0               1556              RET
                      1557
2E1F 28DF             1558  WR_C3_L4:   CALL FORMAT_C3_L4         ;bin to dec and remove leading zeros
2E21 B1D81C           1559              LDB  TEMPB1,#0D8H         ;character address
2E24 2820             1560              CALL WR_MX_LX             ;output character to display
2E26 F0               1561              RET
                      1562
2E27 28E0             1563  WR_M02_L2:  CALL FORMAT_M02_L2        ;bin to dec and remove leading zeros
2E29 B1CB1C           1564              LDB  TEMPB1,#0CBH         ;character address
2E2C 2818             1565              CALL WR_MX_LX             ;output character to display
2E2E F0               1566              RET
                      1567
2E2F B19B1C           1568  WR_M02_L3:  LDB  TEMPB1,#09BH         ;character address
2E32 A04248           1569              LD   TLSB,ELSB            ;initial temp LSB
2E35 A0444A           1570              LD   T2SB,E2SB            ;initial temp 2SB
2E38 A0464C           1571              LD   TMSB,EMSB            ;initial temp MSB
2E3B 2809             1572              CALL WR_MX_LX             ;output character to display
2E3D F0               1573              RET
                      1574
2E3E 28CF             1575  WR_M02_L4:  CALL FORMAT_M02_L4        ;bin to dec and remove leading zeros
2E40 B1DB1C           1576              LDB  TEMPB1,#0DBH         ;character address
2E43 2801             1577              CALL WR_MX_LX             ;output character to display
2E45 F0               1578              RET
                      1579
2E46 89FF004C         1580  WR_MX_LX:   CMP  TMSB,#00FFH          ;is EMSB blank
2E4A D718             1581              JNE  BLANKS_OK            ;no more leading blanks
2E4C A114004C         1582              LD   TMSB,#0014H          ;put blank character in EMSB
2E50 89FF004A         1583              CMP  T2SB,#00FFH          ;is E2SB blank
2E54 D70E             1584              JNE  BLANKS_OK            ;no more leading blanks
2E56 A114004A         1585              LD   T2SB,#0014H          ;put blank character in E2SB
2E5A 89FF0048         1586              CMP  TLSB,#00FFH          ;is ELSB blank
2E5E D704             1587              JNE  BLANKS_OK            ;no more leading blanks
2E60 A1140048         1588              LD   TLSB,#14H            ;put blank character in ELSB
2E64 C701028D1C       1589  BLANKS_OK:  STB  TEMPB1,DISPLAY_MODE  ;send character address to display
2E69 290E             1590              CALL DELAY_40USEC         ;display execution time
```

```
MCS-96 MACRO ASSEMBLER    THIRTEENTH.A9                                          02/04/93 10:35:11

LOC   OBJECT           STMT      SOURCE STATEMENT
2E6D  4583326401E      1591           ADD   TEMPW1,TMSB,#HEX_ASCII  ;compute index
2E70  B21E1C           1592           LDB   TEMPB1,[TEMPW1]         ;output indexed character
2E73  C70103801C       1593           STB   TEMPB1,DISPLAY_DATA     ;now
2E78  28FF             1594           CALL  DELAY_40USEC            ;display execution time
2E7A  4583264A1E       1595           ADD   TEMPW1,T2SB,#HEX_ASCII  ;compute index
2E7F  B21E1C           1596           LDB   TEMPB1,[TEMPW1]         ;output indexed character
2E82  C70103801C       1597           STB   TEMPB1,DISPLAY_DATA     ;now
2E87  28F0             1598           CALL  DELAY_40USEC            ;display execution time
2E89  4583264B1E       1599           ADD   TEMPW1,TLSB,#HEX_ASCII  ;compute index
2E8E  B21E1C           1600           LDB   TEMPB1,[TEMPW1]         ;output indexed character
2E91  C70103801C       1601           STB   TEMPB1,DISPLAY_DATA     ;now
2E96  28E1             1602           CALL  DELAY_40USEC            ;display execution time
2E98  F0               1603           RET                           ;return
                       1604
2E99  B09E34           1605   WR_POWER:  LDB  INDEXB1,POWERL        ;enter power level to dash counter
2E9C  B10A1D           1606           LDB   TEMPB2,#0AH             ;put 10 in blank counter
2E9F  78341D           1607           SUBB  TEMPB2,INDEXB1          ;compute number of blanks
2EA2  B1D61C           1608           LDB   TEMPB1,#0D6H            ;get line 4 address
2EA5  C70102801C       1609           STB   TEMPB1,DISPLAY_MODE     ;send line 4 address to display
2EAA  28CD             1610           CALL  DELAY_40USEC            ;display execution time
2EAC  990034           1611           CMPB  INDEXB1,#00H            ;are there any dashes
2EAF  DA0E             1612           JLE   NO_DASHES               ;goto blanks if no dashes
2EB1  B12D1C           1613           LDB   TEMPB1,#2DH             ;put a dash in temp store
2EB4  C70103801C       1614   ANOTHER_DASH: STB TEMPB1,DISPLAY_DATA ;output a dash to the display
2EB9  28BE             1615           CALL  DELAY_40USEC            ;display execution time
2EBB  1534             1616           DECB  INDEXB1                 ;decrement dash counter
2EBD  D2F5             1617           JGT   ANOTHER_DASH            ;output another dash
2EBF  B1201C           1618   NO_DASHES: LDB  TEMPB1,#20H           ;put blank in buffer
2EC2  B01D34           1619           LDB   INDEXB1,TEMPB2          ;put number of blanks in counter
2EC5  990034           1620           CMPB  INDEXB1,#00H            ;are there any blanks
2EC8  DA0B             1621           JLE   NO_BLANKS               ;exit if no blanks
2ECA  C70103801C       1622   ANOTHER_BLNK: STB TEMPB1,DISPLAY_DATA ;output a blank to the display
2ECF  28A8             1623           CALL  DELAY_40USEC            ;display execution time
2ED1  1534             1624           DECB  INDEXB1                 ;decrement dash counter
2ED3  D2F5             1625           JGT   ANOTHER_BLNK            ;output another blank
2ED5  F0               1626   NO_BLANKS: RET                        ;return
                       1627
                       1628   ;          *********** END WRITE DATA TO DISPLAY ************
                       1629
                       1630   ;          *********** FORMAT DATA FOR DISPLAY ************
                       1631
2ED6  A03E54           1632   FORMAT_M1_L2: LD DIVIDEND,MAIN_SET    ;put SET data in dividend
2ED9  283A             1633           CALL  FORMAT_MX_LX            ;convert to dec & remove leading zeros
2EDB  F0               1634           RET
                       1635
2EDC  A04054           1636   FORMAT_M1_L3: LD DIVIDEND,MAIN_OUT    ;put OUT data in dividend
2EDF  2834             1637           CALL  FORMAT_MX_LX            ;convert to dec & remove leading zeros
2EE1  F0               1638           RET
                       1639
2EE2  A03E54           1640   FORMAT_C1_L2: LD DIVIDEND,MAIN_SET    ;put data in dividend
2EE5  282E             1641           CALL  FORMAT_MX_LX            ;convert to dec & remove leading zeros
2EE7  F0               1642           RET
                       1643
2EE8  A04054           1644   FORMAT_C1_L3: LD DIVIDEND,MAIN_OUT    ;put data in dividend
2EEB  2828             1645           CALL  FORMAT_MX_LX            ;convert to dec & remove leading zeros
2EED  F0               1646           RET
                       1647
```

MCS-96 MACRO ASSEMBLER    THIRTEENTH.A9                                              02/04/93 10:35:11

```
LOC  OBJECT        STMT        SOURCE STATEMENT
2EEE A0AA54        1648    FORMAT_C1_L4:  LD    DIVIDEND,TC_DISP      ;put data in dividend
2EF1 2622          1649                   CALL  FORMAT_MX_LX          ;convert to dec & remove leading zeros
2EF3 F0            1650                   RET
                   1651
2EF4 A06854        1652    FORMAT_C2_L3:  LD    DIVIDEND,CAL_SET      ;put data in dividend
2EF7 281C          1653                   CALL  FORMAT_MX_LX          ;convert to dec & remove leading zeros
2EF9 F0            1654                   RET
                   1655
2EFA A0AA54        1656    FORMAT_C2_L4:  LD    DIVIDEND,TC_DISP      ;put data in dividend
2EFD 2816          1657                   CALL  FORMAT_MX_LX          ;convert to dec & remove leading zeros
2EFF F0            1658                   RET
                   1659
2F00 A07A54        1660    FORMAT_C3_L4:  LD    DIVIDEND,TC_FIL       ;put data in dividend
2F03 080454        1661                   SHR   DIVIDEND,#4           ;divide by 16
2F06 280D          1662    FORMAT_C3_OK:  CALL  FORMAT_MX_LX          ;convert to dec & remove leading zeros
                   1663    ;              CMP   TLSB,#00FFH           ;if LSB is blank
                   1664    ;              JNE   EXIT_FMT_C3           ;exit if LSB not blank
                   1665    ;              CLR   TLSB                  ;set LSB to zero
2F08 F0            1666    EXIT_FMT_C3:   RET
                   1667
2F09 A06454        1668    FORMAT_M02_L2: LD    DIVIDEND,TC_OUT       ;put data in dividend
2F0C 2807          1669                   CALL  FORMAT_MX_LX          ;convert to dec & remove leading zeros
2F0E F0            1670                   RET
                   1671
2F0F A0AE54        1672    FORMAT_M02_L4: LD    DIVIDEND,ALARM_SET    ;put data in dividend
2F12 2801          1673                   CALL  FORMAT_MX_LX          ;convert to dec & remove leading zeros
2F14 F0            1674                   RET
                   1675
2F15 2815          1676    FORMAT_MX_LX:  CALL  HEX_TO_DEC            ;convert hex to decimal digits
2F17 8900004C      1677                   CMP   TMSB,#0000H           ;test MSB for leading zero
2F1B D70E          1678                   JNE   EXIT_FORMAT           ;not zero
2F1D A114004C      1679                   LD    TMSB,#0014H           ;blank MSB leading zero here
2F21 8900004A      1680                   CMP   T2SB,#0000H           ;test 2SB for leading zero
2F25 D704          1681                   JNE   EXIT_FORMAT           ;not zero
2F27 A114004A      1682                   LD    T2SB,#0014H           ;blank 2SB leading zero here
                   1683    ;              CMP   TLSB,#0000H           ;test LSB for leading zero
                   1684    ;              JNE   EXIT_FORMAT           ;not zero
                   1685    ;              LD    TLSB,#0014H           ;blank LSB zero here
2F2B F0            1686    EXIT_FORMAT:   RET                         ;return
                   1687
                   1688    ;          *********** END FORMAT DATA FOR DISPLAY ***********
                   1689
                   1690    ;          *********** HEX TO DECIMAL CONVERTION ***********
                   1691
2F2C 89000054      1692    HEX_TO_DEC:    CMP   DIVIDEND,#0000H       ;is dividend => 0
2F30 D604          1693                   JGE   TEST_999              ;go to => 999 test
2F32 A1000054      1694                   LD    DIVIDEND,#0000H       ;limit dividend to 0
2F36 89E70354      1695    TEST_999:      CMP   DIVIDEND,#03E7H       ;is dividend <= 999
2F3A DA04          1696                   JLE   DIVIDEND_OK           ;0 < dividend < 999
2F3C A1E70354      1697                   LD    DIVIDEND,#03E7H       ;limit dividend to 999
2F40 FE9D6454      1698    DIVIDEND_OK:   DIVB  DIVIDEND,#64H         ;divide by 100
2F44 AC544C        1699                   LDBZE TMSB,QUOTIENT         ;put the number of 100's in TEMP MSB
2F47 AC551C        1700                   LDBZE TEMPB1,REMAINDER      ;save remainder
2F4A AC1C54        1701                   LDBZE DIVIDEND,TEMPB1       ;put the remainder in the dividend
2F4D FE9D0A54      1702                   DIVB  DIVIDEND,#0AH         ;divide by 10
2F51 AC544A        1703                   LDBZE T2SB,QUOTIENT         ;put the number of 10's in TEMP 2SB
2F54 AC5548        1704                   LDBZE TLSB,REMAINDER        ;put the remainder in the TEMP LSB
```

MCS-96 MACRO ASSEMBLER    THIRTEENTH.A9                                              02/04/93 10:35:11

```
LOC  OBJECT        STMT         SOURCE STATEMENT
2F57 F0            1705                      RET                    ;return
                   1706
                   1707    ;         ********** END HEX TO DECIMAL CONVERTION **********
                   1708
                   1709    ;         ************ DECIMAL TO HEX CONVERTION ************
                   1710
2F58 CC7C          1711    DECIMAL_HEX:  POP   RETN_ADDRESS         ;pop return address from stack
2F5A CC4C          1712                   POP   TMSB                ;pop LSB from stack
2F5C CC4A          1713                   POP   T2SB                ;pop 2SB from stack
2F5E CC48          1714                   POP   TLSB                ;pop MSB from stack
2F60 FE5D6440C52   1715                   MULB  HX64,TMSBL,#64H     ;convert hundreds
2F65 FE5D0A4A50    1716                   MULB  HX0A,T2SBL,#0AH     ;convert tens
2F6A A05292        1717                   LD    HEX_DATA,HX64       ;add hundreds to ENTRY_DATA
2F6D 645092        1718                   ADD   HEX_DATA,HX0A       ;add tens to ENTRY_DATA
2F70 644892        1719                   ADD   HEX_DATA,TLSB       ;add units to ENTRY_DATA
2F73 C892          1720                   PUSH  HEX_DATA            ;push HEX_DATA onto stack
2F75 C87C          1721                   PUSH  RETN_ADDRESS        ;push return address back on stack
2F77 F0            1722                   RET                       ;return
                   1723
                   1724    ;         ********* END DECIMAL TO HEX CONVERTION ***********
                   1725
                   1726    ;         ***************** 5 USEC DELAY ******************
                   1727
2F78 F0            1728    DELAY_5USEC:  RET                   *   ;use minimum delay
                   1729
                   1730    ;         *************** END 5 USEC DELAY ****************
                   1731
                   1732    ;         *********** 40 uSEC DELAY SUBROUTINE ************
                   1733                                              ;total count = (3+33+5+4)usec
2F79 C81E          1734    DELAY_40USEC: PUSH  TEMPW1          ;save TEMPB1 on stack
2F7B A10C001E      1735                   LD    TEMPW1,#000CH  ;initialize counter - 1usec
2F7F 051E          1736    D_3USEC_MORE : DEC   TEMPW1         ;decrement counter  - 1usec
2F81 D7FC          1737                   BNE   D_3USEC_MORE   ;continue if count not zero - 2,1usec
2F83 CC1E          1738                   POP   TEMPW1         ;restore TEMPB1 from stack  3usec
2F85 F0            1739                   RET                  ;return after 12 counts - 4usec
                   1740
                   1741    ;         *********** END 40uSEC DELAY SUBROUTINE ***********
                   1742
                   1743    ;         ************ 2MSEC DELAY SUBROUTINE **************
                   1744
2F86 C81E          1745    DELAY_2MSEC:  PUSH  TEMPW1          ;save TEMPB2 on stack
2F88 A132001E      1746                   LD    TEMPW1,#0032H  ;initialize counter 50X40usec
2F8C 2FEB          1747    D_40USEC_MORE: CALL  DELAY_40USEC   ;delay 40 usec
2F8E 051E          1748                   DEC   TEMPW1         ;decrement counter
2F90 D2FA          1749                   JGT   D_40USEC_MORE  ;continue if count not zero
2F92 CC1E          1750                   POP   TEMPW1         ;restore TEMPB2 from stack
2F94 F0            1751                   RET                  ;return after  counts
                   1752
                   1753    ;         *********** END 2MSEC DELAY SUBROUTINE ***********
                   1754
                   1755    ;         ************ 10MSEC DELAY SUBROUTINE *************
                   1756
2F95 C81E          1757    DELAY_10MSEC: PUSH  TEMPW1          ;save TEMPB2 on stack
2F97 A1FA001E      1758                   LD    TEMPW1,#0FAH   ;initialize counter 250X40usec
2F9B 2FDC          1759    D_40USEC_M:   CALL  DELAY_40USEC    ;delay 40 usec
2F9D 051E          1760                   DEC   TEMPW1         ;decrement counter
2F9F D2FA          1761                   JGT   D_40USEC_M     ;continue if count not zero
```

MCS-96 MACRO ASSEMBLER        THIRTEENTH.A9,                                    02/04/93 10:35:11

```
LOC  OBJECT            STMT        SOURCE STATEMENT
2FA1 CC1E              1762                 POP    TEMPW1              ;restore TEMPB2 from stack
2FA3 F0                1763                 RET                        ;return after counts
                       1764
                       1765    ;        ********** END 10MSEC DELAY SUBROUTINE **********
                       1766
                       1767    ;        ************ 30SEC DELAY SUBROUTINE **************
                       1768
2FA4 C81E              1769    DELAY_30SEC:  PUSH  TEMPW1              ;save TEMPB2 on stack
2FA6 A1B80B1E          1770                  LD    TEMPW1,#0BB8H       ;initialize counter 3000*10msec
2FAA 2FE9              1771    D_10MSEC_M:   CALL  DELAY_10MSEC        ;delay 10 msec
2FAC 051E              1772                  DEC   TEMPW1              ;decrement counter
2FAE D2FA              1773                  JGT   D_10MSEC_M          ;continue if count not zero
2FB0 CC1E              1774                  POP   TEMPW1              ;restore TEMPB2 from stack
2FB2 F0                1775                  RET                       ;return after counts
                       1776
                       1777    ;        ********** END 30SEC DELAY SUBROUTINE **********
                       1778
                       1779    ;        ********** VARIABLE DELAY SUBROUTINE **********
                       1780
2FB3 C81E              1781    VAR_DELAY:    PUSH  TEMPW1              ;save TEMPW1 on stack
2FB5 A10A001E          1782    ANOTHER_100MS: LD   TEMPW1,#000AH       ;initialize counter 10*10msec
2FB9 2FDA              1783    D_10MSEC_MORE: CALL DELAY_10MSEC        ;delay 10 msec
2FBB 051E              1784                  DEC   TEMPW1              ;decrement 10 msec counter
2FBD D2FA              1785                  JGT   D_10MSEC_MORE       ;continue if count not zero
2FBF 15B0              1786                  DECB  DELAY               ;decrement 100 msec counter
2FC1 D2F2              1787                  JGT   ANOTHER_100MS       ;continue if count not zero
2FC3 CC1E              1788                  POP   TEMPW1              ;restore TEMPB2 from stack
2FC5 F0                1789                  RET                       ;return after counts
                       1790
                       1791    ;        ********** END VARIABLE DELAY SUBROUTINE **********
                       1792
                       1793    ;        ********** THERMOCOUPLE AMPLIFIER BIAS **********
                       1794
2FC6 990190            1795    AMP_AUTO_BIAS: CMPB BIAS_RUN_FLAG,#01H  ;is the BIAS flag set
2FC9 D730              1796                  JNE   EXIT_BIAS           ;no
2FCB 4964005A8E        1797                  SUB   BIASW1,TC_RAW,#0064H ;bias at 0 volts in = 100 bits
2FD0 09028E            1798                  SHL   BIASW1,#2           ;multiply error by K = 2
2FD3 648E8C            1799                  ADD   BIAS_INT,BIASW1     ;integrate bias error
2FD6 B08D17            1800                  LDB   PWM_CONTROL,BIAS_INTH ;transfer INTH to PWM_CONTROL
2FD9 A07A8E            1801                  LD    BIASW1,TC_FIL       ;get TC*16 value
2FDC 08068E            1802                  SHR   BIASW1,#6           ;divide by 16 and round by 4
2FDF 09028E            1803                  SHL   BIASW1,#2           ;round error
2FE2 8964008E          1804                  CMP   BIASW1,#64H         ;test for bias = 100 - 103 bits
2FE6 D713              1805                  JNE   EXIT_BIAS           ;bias not complete
2FE8 1190              1806                  CLRB  BIAS_RUN_FLAG       ;bias complete - reset bias flag
2FEA EFBE05            1807                  CALL  WR_NVR_BIAS         ;update NV-RAM
2FED B101B1            1808                  LDB   CAL_COMP_FLAG,#01H  ;set calibration complete flag
2FF0 EF7807            1809                  CALL  BEEP                ;beep
2FF3 EF7507            1810                  CALL  BEEP                ;beep
2FF6 2B02              1811                  CALL  INIT_DISP_CCM       ;display calibration complete message
2FF8 EF7007            1812                  CALL  BEEP
2FFB F0                1813    EXIT_BIAS:    RET                       ;return
                       1814
                       1815    ;        ********* END THERMOCOUPLE AMPLIFIER BIAS *********
                       1816
                       1817    ;        *************** SENSOR  SCALING ****************
                       1818
```

MCS-96 MACRO ASSEMBLER    THIRTEENTH.A9                                                02/04/93 10:35:11

| LOC OBJECT | STMT | SOURCE STATEMENT | | | |
|---|---|---|---|---|---|
| 2FFC B004 | 1819 | TST_TEMP_0: | DCW | 04B0H | ;TC test temp 0 - 75*16 degrees F |
| 2FFE 4006 | 1820 | TST_TEMP_1: | DCW | 0640H | ;TC test temp 1 - 100*16 degrees F |
| 3000 C012 | 1821 | TST_TEMP_2: | DCW | 12C0H | ;TC test temp 2 - 300*16 degrees F |
| 3002 401F | 1822 | TST_TEMP_3: | DCW | 1F40H | ;TC test temp 3 - 500*16 degrees F |
| 3004 C02B | 1823 | TST_TEMP_4: | DCW | 2BC0H | ;TC test temp 4 - 700*16 degrees F |
| 3006 4038 | 1824 | TST_TEMP_5: | DCW | 3840H | ;TC test temp 5 - 900*16 degrees F |
| 3008 B004 | 1825 | AMBIENT_75: | DCW | 04B0H | ;ambient = 75*16 degrees F |
| 300A 0521 | 1826 | TC_SQR_COEF: | DCW | 2105H | ;thermocouple squared coefficient |
| 300C 800C | 1827 | TIP_TEMP_0: | DCW | 0C80H | ;TIP test temp 0 - 200*16 degrees F |
| 300E 0019 | 1828 | TIP_TEMP_1: | DCW | 1900H | ;TIP test temp 1 - 400*16 degrees F |
| 3010 8025 | 1829 | TIP_TEMP_2: | DCW | 2580H | ;TIP test temp 2 - 600*16 degrees F |
| 3012 0032 | 1830 | TIP_TEMP_3: | DCW | 3200H | ;TIP test temp 3 - 800*16 degrees F |
| 3014 0080 | 1831 | TIP_SQR_COEF: | DCW | 8000H | ;TIP squared coefficient |
|  | 1832 |  |  |  |  |
| 3016 A10C302A | 1833 | SCALE_TIP: | LD | SCALE_INX,#TIP_TEMP_0 | ;get test temperature base address |
| 301A A180002C | 1834 |  | LD | SCALE_INX1,#TIP_K1 | ;get scaling constant KX index |
| 301E A1083020 | 1835 |  | LD | SCALEW1,#AMBIENT_75 | ;get ambient offset |
| 3022 A22024 | 1836 |  | LD | SCALEW3,[SCALEW1] | ;ambient temperature offset |
| 3025 A1143020 | 1837 |  | LD | SCALEW1,#TIP_SQR_COEF | ;get tip squared coefficient offset |
| 3029 A22028 | 1838 |  | LD | SCALEW5,[SCALEW1] | ;get squared scaling coefficient |
| 302C A05620 | 1839 |  | LD | SCALEW1,TIP_RAW | ;get unfiltered TIP |
| 302F 090420 | 1840 |  | SHL | SCALEW1,#4 | ;multiply by 16 |
| 3032 2855 | 1841 |  | CALL | SCALE_TX | ;call scaling routine |
| 3034 A02262 | 1842 |  | LD | TIP_OUT,SCALEW2 | ;TIP_OUT scaling complete |
| 3037 A022A4 | 1843 |  | LD | TIPF_OUT,SCALEW2 | ;put tip out in tip filter |
| 303A 090222 | 1844 |  | SHL | SCALEW2,#2 | ;multiply by 4 |
| 303D 642258 | 1845 |  | ADD | TIP_INTR,SCALEW2 | ;integrate output; |
| 3040 A05840 | 1846 |  | LD | MAIN_OUT,TIP_INTR | ;ready to scale |
| 3043 080440 | 1847 |  | SHR | MAIN_OUT,#4 | ;divide to complete scaling |
| 3046 A0589A | 1848 |  | LD | TIP_TEMP,TIP_INTR | ;put output in feedback register |
| 3049 08029A | 1849 |  | SHR | TIP_TEMP,#2 | ;divide feedback |
| 304C 689A58 | 1850 |  | SUB | TIP_INTR,TIP_TEMP | ;close filter loop |
| 304F F0 | 1851 |  | RET |  | ;return |
|  | 1852 |  |  |  |  |
| 3050 A1FE2F2A | 1853 | SCALE_TC: | LD | SCALE_INX,#TST_TEMP_1 | ;get test temperature base address |
| 3054 A170002C | 1854 |  | LD | SCALE_INX1,#TC_K1 | ;get scaling constant KX index |
| 3058 A1083020 | 1855 |  | LD | SCALEW1,#AMBIENT_75 | ;get ambient offset |
| 305C A22024 | 1856 |  | LD | SCALEW3,[SCALEW1] | ;16*75 deg F ambient temp |
| 305F A10A3020 | 1857 |  | LD | SCALEW1,#TC_SQR_COEF | ;get tip squared coefficient offset |
| 3063 A22028 | 1858 |  | LD | SCALEW5,[SCALEW1] | ;get squared scaling coefficient |
| 3066 A07A20 | 1859 |  | LD | SCALEW1,TC_FIL | ;get filtered thermocouple, TC*16 |
| 3069 646E20 | 1860 |  | ADD | SCALEW1,TC_BIAS | ;add bias to thermocouple |
| 306C 686020 | 1861 | SUBT_DIODE: | SUB | SCALEW1,DIODE_FIL | ;subtract ambient diode here |
| 306F 2818 | 1862 |  | CALL | SCALE_TX | ;call scaling routine |
| 3071 A02264 | 1863 |  | LD | TC_OUT,SCALEW2 | ;TC_OUT scaling complete |
| 3074 89000064 | 1864 |  | CMP | TC_OUT,#0000H | ;is TC_OUT => 0 |
| 3078 D604 | 1865 |  | JGE | TEST_TC_999 | ;go to => 999 test |
| 307A A1000064 | 1866 |  | LD | TC_OUT,#0000H | ;limit dividend to 0 |
| 307E 89E70364 | 1867 | TEST_TC_999: | CMP | TC_OUT,#03E7H | ;is dividend <= 999 |
| 3082 DA04 | 1868 |  | JLE | TC_OUT_OK | ;0 < dividend < 999 |
| 3084 A1E70364 | 1869 |  | LD | TC_OUT,#03E7H | ;limit dividend to 999 |
| 3088 F0 | 1870 | TC_OUT_OK: | RET |  | ;return |
|  | 1871 |  |  |  |  |
| 3089 B1044E | 1872 | SCALE_TX: | LDB | CAL_INDEX,#04H | ;initialize curve fitting counter |
| 308C 2819 | 1873 |  | CALL | SCALE_TC_K1 | ;scale thermocouple with k1 |
| 308E 8A2A22 | 1874 | SCALE_AGAIN: | CMP | SCALEW2,[SCALE_INX] | ;is temp1*16 greater than test temp*16 |
| 3091 DE06 | 1875 |  | JLT | END_SCALE | ;end if TC_T1 is less than test temp |

MCS-96 MACRO ASSEMBLER    THIRTEENTH.A9.                                    02/04/93 10:35:11

```
LOC  OBJECT        STMT       SOURCE STATEMENT
3093 2831          1876             CALL  SCALE_TC_KX              ;scale thermocouple with kx
3095 15AE          1877             DECB  CAL_INDEX                ;decrement curve fitting counter
3097 D7F5          1878             JNE   SCALE_AGAIN              ;continue if less than 4 fits
3099 0A0422        1879  END_SCALE: SHRA  SCALEW2,#4               ;divide by 16
309C 89E70322      1880             CMP   SCALEW2,#03E7H           ;test for over 999
30A0 DA04          1881             JLE   OUTPUT_CAL               ;output if not over limit
30A2 A1E70322      1882             LD    SCALEW2,#03E7H           ;limit output to 999
30A6 F0            1883  OUTPUT_CAL: RET                           ;return
                   1884
30A7 090120        1885  SCALE_TC_K1: SHL SCALEW1,#1               ;to scale multiply 16*TX_FIL by 2
30AA FE6E2D20      1886             MUL   SCALEW1,[SCALE_INX1]+    ;multiply by K1/4
30AE 090122        1887             SHL   SCALEW2,#1               ;multiply by 2
30B1 642422        1888  ADD_AMBIENT: ADD SCALEW2,SCALEW3          ;add ambient of 75*16 deg F
30B4 A02224        1889             LD    SCALEW3,SCALEW2          ;get ready to square T1
30B7 FE6C2224      1890             MUL   SCALEW3,SCALEW2          ;square T1
30BB A02624        1891             LD    SCALEW3,SCALEW4          ;move T1_FIL^2/10000H to long word
30BE FE6C2824      1892             MUL   SCALEW3,SCALEW5          ;multiply T1_FIL^2 by coefficient
30C2 642622        1893             ADD   SCALEW2,SCALEW4          ;add squared term from T1
30C5 F0            1894             RET                            ;return
                   1895
30C6 4A2B2224      1896  SCALE_TC_KX: SUB SCALEW3,SCALEW2,[SCALE_INX1]+ ;SCALEW3=(16*T1-16*TESTTEMPX)
30CA FE6E2D24      1897             MUL   SCALEW3,[SCALE_INX1]+    ;multiply by KX
30CE 642622        1898             ADD   SCALEW2,SCALEW4          ;add slope correction
30D1 F0            1899             RET
                   1900
                   1901  ;           ************** END SENSOR SCALING ****************
                   1902
                   1903  ;           ********** TIP TEMPERATURE AUTO SCALING ***********
                   1904
30D2               1905  FIRST_CAL_1:
30D2 012E          1906        CLR   SCALE_INX2                    ;clear indexer
3094 A1E00032      1907              LD    SCALE_INX4,#TIP_K1      ;initialize scale factor base address
30D8 A1DC3030      1908              LD    SCALE_INX3,#TIP_TEMP_0  ;initialize test temp base address
30DC 642E30        1909              ADD   SCALE_INX3,SCALE_INX2   ;compute address
30DF A2303E        1910              LD    MAIN_SET,[SCALE_INX3]   ;get test temp
30E2 08043E        1911              SHR   MAIN_SET,#4             ;divide by 16
30E5 A1DC05A6      1912              LD    SET_DELAY,#05DCH        ;allow 60 sec to reach SET temperature
30E9 A17701A8      1913              LD    TIP_CAL_NULL,#0177H     ;initialize null counter to 16.7 sec
30ED B1016B        1914              LDB   TIP_RUN_FLAG,#01H       ;set cal 1 run flag
30F0 EFE4FB        1915              CALL  INIT_DISP_C1B           ;initialize cal mode 1 active screen
30F3 F0            1916              RET
                   1917
30F4 99016B        1918  TIP_CAL:    CMPB  TIP_RUN_FLAG,#01H       ;test if run flag set
30F7 D70B          1919              JNE   EX_CAL1_NOW             ;exit if CAL 1 RUN flag not set
30F9 483E4066      1920              SUB   ERROR,MAIN_OUT,MAIN_SET ;is temperature control re-established
30FD 89010066      1921              CMP   ERROR,#0001H            ;is null < 1
3101 DA03          1922              JLE   TEST_NULLT              ;yes go to test for > -1
3103 F0            1923              RET                           ;exit if not in control
3104 207F          1924  EX_CAL1_NOW: SJMP EX_CAL1
3106 89FFFF66      1925  TEST_NULLT: CMP   ERROR,#0FFFFH           ;is null > -1
310A D601          1926              JGE   DELAY_CAL               ;continue CAL if in control
310C F0            1927              RET                           ;exit if not in control
310D 05A6          1928  DELAY_CAL:  DEC   SET_DELAY               ;decrement delay counter
310F DA01          1929              JLE   MORE_CAL                ;delay complete
3111 F0            1930              RET                           ;return
3112 01A6          1931  MORE_CAL:   CLR   SET_DELAY               ;clear delay counter
3114 483E6466      1932              SUB   ERROR,TC_OUT,MAIN_SET   ;compute error
```

MCS-96 MACRO ASSEMBLER    THIRTEENTH.A9                                              02/04/93 10:35:11

```
LOC  OBJECT      STMT        SOURCE STATEMENT
3118 89010066    1933                    CMP   ERROR,#0001H         ;is null < 1
311C DA02        1934                    JLE   TEST_NULL            ;yes go to test for > -1
311E 2006        1935                    SJMP  NO_NULL              ;no null detected
3120 89FFFF66    1936        TEST_NULL:  CMP   ERROR,#0FFFFH        ;is null > -1
3124 D623        1937                    JGE   DEC_NULL_CNT         ;increment null counter
3126 890A0066    1938        NO_NULL:    CMP   ERROR,#000AH         ;test if error > 10
312A DE04        1939                    JLT   NEXT_LIMIT           ;jump to next limit
312C A10A0066    1940                    LD    ERROR,#000AH         ;limit to 10 here
3130 89F6FF66    1941        NEXT_LIMIT: CMP   ERROR,#0FFF6H        ;test if error < 10
3134 D604        1942                    JGE   LIMITS_OK            ;limit OK no correction needed
3136 A1F6FF66    1943                    LD    ERROR,#0FFF6H        ;limit to -10 here
313A FD          1944        LIMITS_OK:  NOP
313B A1800032    1945                    LD    SCALE_INX4,#TIP_K1   ;initialize scale factor base address
313F 642E32      1946                    ADD   SCALE_INX4,SCALE_INX2 ;compute address
3142 663266      1947                    ADD   ERROR,[SCALE_INX4]   ;compute new scale factor
3145 C23266      1948                    ST    ERROR,[SCALE_INX4]   ;update bias or scale factor
3148 F0          1949                    RET                        ;return for next cycle
3149 05A8        1950        DEC_NULL_CNT: DEC TIP_CAL_NULL         ;decrement null count by 1
314B DE01        1951                    JLT   NEXT_SF1             ;go to next word
314D F0          1952                    RET                        ;return for next cycle
314E A17701A8    1953        NEXT_SF1:   LD    TIP_CAL_NULL,#0177H  ;initialize null counter
3152 A1DC05A6    1954                    LD    SET_DELAY,#05DCH     ;initialize 60 sec counter
3156 072E        1955                    INC   SCALE_INX2           ;increment to next word
3158 072E        1956                    INC   SCALE_INX2           ;one more
315A 8908002E    1957                    CMP   SCALE_INX2,#0008H    ;test if cal 1 complete
315E D611        1958                    JGE   END_CAL1_RUN         ;end cal 1
3160 A10C3030    1959                    LD    SCALE_INX3,#TIP_TEMP_0 ;initialize test temp base address
3164 642E30      1960                    ADD   SCALE_INX3,SCALE_INX2 ;compute address
3167 A2303E      1961                    LD    MAIN_SET,[SCALE_INX3] ;get test temp
316A 08043E      1962                    SHR   MAIN_SET,#4          ;divide by 16
316D EFFB05      1963                    CALL  BEEP
3170 F0          1964                    RET                        ;exit
3171 116B        1965        END_CAL1_RUN: CLRB TIP_RUN_FLAG        ;clear TIP cal run flag
3173 EF84FB      1966                    CALL  INIT_DISP_CCM        ;display calibration complete message
3176 B101B1      1967                    LDB   CAL_COMP_FLAG,#01H   ;set calibration complete flag
3179 EF8F04      1968                    CALL  WR_NVR_TIP1          ;update NV-RAM
317C EFEC05      1969                    CALL  BEEP
317F EFE905      1970                    CALL  BEEP
3182 EFE605      1971                    CALL  BEEP
3185 F0          1972        EX_CAL1:    RET                        ;return
                 1973
                 1974        ;           ******** END TIP TEMPERATURE AUTO SCALING *********
                 1975
                 1976        ;           *********** THERMOCOUPLE AUTO SCALING ************
                 1977
3186 012E        1978        FIRST_CAL_2: CLR  SCALE_INX2           ;clear indexer
3188 A16E0032    1979                    LD    SCALE_INX4,#TC_BIAS  ;initialize scale factor base address
318C A1FC2F30    1980                    LD    SCALE_INX3,#TST_TEMP_0 ;initialize test temp base address
3190 642E30      1981                    ADD   SCALE_INX3,SCALE_INX2 ;compute address
3193 A23068      1982                    LD    CAL_SET,[SCALE_INX3] ;get test temp
3196 080468      1983                    SHR   CAL_SET,#4           ;divide by 16
3199 B10191      1984                    LDB   TC_CAL_FLAG,#01H     ;set cal 2 flag
319C EF46FB      1985                    CALL  INIT_DISP_C2B        ;initialize cal mode 2 active screen
319F F0          1986                    RET
                 1987
31A0 B1016D      1988        CAL2_PRESSED: LDB TC_RUN_FLAG,#01H     ;set cal 2 run flag
31A3 EF85FB      1989                    CALL  WRITE_RUNNING        ;send running message to display
```

MCS-96 MACRO ASSEMBLER    THIRTEENTH.A9.                                    02/04/93 10:35:11

```
LOC   OBJECT         STMT        SOURCE STATEMENT
31A6  F0             1990                RET
                     1991
31A7  990191         1992   TC_CAL:      CMPB  TC_CAL_FLAG,#01H     ;cal TC if TC cal flag set
31AA  D75C           1993                JNE   EX_CAL2_RUN          ;exit if TC CAL flag not set
31AC  99016D         1994                CMPB  TC_RUN_FLAG,#01H     ;test if run flag set
31AF  D757           1995                JNE   EX_CAL2_RUN          ;exit if run flag no set
31B1  A1FC2F30       1996                LD    SCALE_INX3,#TST_TEMP_0 ;initialize test temp base address
31B5  642E30         1997                ADD   SCALE_INX3,SCALE_INX2 ;compute address
31B8  A23024         1998                LD    SCALEW3,[SCALE_INX3] ;get test temp
31BB  080424         1999                SHR   SCALEW3,#4           ;divide by 16
31BE  48642466       2000                SUB   ERROR,SCALEW3,TC_OUT ;compute error
31C2  DF11           2001                JE    NEXT_SF2             ;goto next scale factor
31C4  090466         2002                SHL   ERROR,#4             ;multiply error by 16
31C7  A16E0032       2003                LD    SCALE_INX4,#TC_BIAS  ;initialize scale factor base address
31CB  642E32         2004                ADD   SCALE_INX4,SCALE_INX2 ;compute address
31CE  663266         2005                ADD   ERROR,[SCALE_INX4]   ;compute new scale factor
31D1  C23266         2006                ST    ERROR,[SCALE_INX4]   ;update bias or scale factor
31D4  F0             2007                RET                        ;return for next cycle
31D5  072E           2008   NEXT_SF2:    INC   SCALE_INX2           ;increment to next word
31D7  072E           2009                INC   SCALE_INX2           ;one more
31D9  A1FC2F30       2010                LD    SCALE_INX3,#TST_TEMP_0 ;initialize test temp base address
31DD  642E30         2011                ADD   SCALE_INX3,SCALE_INX2 ;compute address
31E0  A23068         2012                LD    CAL_SET,[SCALE_INX3] ;get test temp
31E3  080468         2013                SHR   CAL_SET,#4           ;divide by 16
31E6  EF4CFB         2014                CALL  ERASE_RUNNING        ;cancel running message on display
31E9  890C002E       2015                CMP   SCALE_INX2,#000CH    ;test if cal 2 complete
31ED  D713           2016                JNE   BEEP_AND_EX          ;more runs if cal 2 not complete
31EF  1191           2017                CLRB  TC_CAL_FLAG          ;terminate cal 2 auto mode
31F1  116C           2018                CLRB  POWER_FLAG           ;turn off heater
31F3  EF7505         2019                CALL  BEEP                 ;beep
31F6  EF7205         2020                CALL  BEEP                 ;beep
31F9  EFFEFA         2021                CALL  INIT_DISP_CCM        ;display calibration complete message
31FC  B101F1         2022                LDB   CAL_COMP_FLAG,#01H   ;set calibration complete flag
31FF  EF8403         2023                CALL  WR_NVR_TCK           ;update NV-RAM
3202  EF6605         2024   BEEP_AND_EX: CALL  BEEP                 ;beep
3205  B1016C         2025                LDB   POWER_FLAG,#01H      ;turn on heater
3208  116D           2026   EX_CAL2_RUN: CLRB  TC_RUN_FLAG          ;cal 2 run complete
320A  F0             2027                RET                        ;return
                     2028
                     2029   ;       ********** END THERMOCOUPLE AUTO SCALING **********
                     2030
                     2031   ;       ****************** HEATER CONTROL ******************
                     2032
320B  C81E           2033   HEATER_CNTL: PUSH  TEMPW1               ;save TEMPW1
320D  C81C           2034                PUSH  TEMPB1LONG           ;save TEMPB1LONG
320F  89000094       2035                CMP   CYCLE_COUNT,#0000H   ;test for beginning of cycle
3213  D75A           2036                JNE   HTR_CONTROL          ;exit if not first cycle
3215  48A43E1E       2037                SUB   TEMPW1,MAIN_SET,TIPF_OUT ;compute temperature error
3219  A09C1C         2038                LD    TEMPB1LONG,CORRECTION ;get ready to scale correction
321C  0A021C         2039                SHRA  TEMPB1LONG,#2        ;divide correction by 2
321F  641C1E         2040                ADD   TEMPW1,TEMPB1LONG    ;add correction to error
3222  8900001E       2041                CMP   TEMPW1,#0000H        ;is error positive
3226  D602           2042                JGE   POSITIVE             ;yes
3228  011E           2043                CLR   TEMPW1               ;set error to zero
322A  8928001E       2044   POSITIVE:    CMP   TEMPW1,#0028H        ;is error <= 40
322E  DA04           2045                JLE   LESS_THAN_40         ;yes
3230  A128001E       2046                LD    TEMPW1,#0028H        ;set error to 40
```

MCS-96 MACRO ASSEMBLER      THIRTEENTH.A9                                           02/04/93 10:35:11

```
LOC    OBJECT        STMT         SOURCE STATEMENT
3234   A01E96        2047  LESS_THAN_40:  LD    HTR_PERCENT,TEMPW1          ;put TEMPW1 in HTR_PERCENT
3237   A0969E        2048                 LD    POWER,HTR_PERCENT           ;HTR_PERCENT
323A   09029E        2049                 SHL   POWER,#02H                  ;scale up
323D   649EA0        2050                 ADD   POWER_INT,POWER             ;integrate power
3240   A0A09E        2051                 LD    POWER,POWER_INT             ;get ready to scale feedback
3243   A0A01C        2052                 LD    TEMPB1LONG,POWER_INT        ;prepare feedback
3246   08011C        2053                 SHR   TEMPB1LONG,#1               ;scale feedback
3249   681CA0        2054                 SUB   POWER_INT,TEMPB1LONG        ;close filter loop
324C   8904009E      2055                 CMP   POWER,#0004H                ;is duty cycle = 0
3250   DA1A          2056                 JLE   SCALE_POWER                 ;continue to heater control
3252   8930009E      2057                 CMP   POWER,#0030H                ;is duty cycle => 48/320
3256   D606          2058                 JGE   OVER_48                     ;go to next range
3258   A120009E      2059                 LD    POWER,#0020H                ;output 10% from 0-15%
325C   200E          2060                 SJMP  SCALE_POWER                 ;continue to scale power
325E   6510009E      2061  OVER_48:       ADD   POWER,#0010H                ;add 16 to power level
3262   8940019E      2062                 CMP   POWER,#0140H                ;limit power to 320
3266   DA04          2063                 JLE   SCALE_POWER                 ;continue if (= 320
3268   A140019E      2064                 LD    POWER,#0140H                ;limit to 320 here
326C   08059E        2065  SCALE_POWER:   SHR   POWER,#5                    ;scale down
326F   2805          2066  HTR_CONTROL:   CALL  HEATER_COUNT                ;call heater control
3271   CC1C          2067                 POP   TEMPB1LONG                  ;restore TEMPB1LONG
3273   CC1E          2068                 POP   TEMPW1                      ;restore TEMPW1
3275   F0            2069                 RET                               ;return
                     2070
3276   C81E          2071  HEATER_COUNT:  PUSH  TEMPW1                      ;save TEMPW1
3278   992794        2072                 CMPB  CYCLE_COUNT,#0027H          ;test for end of duty cycle
327B   D70A          2073                 JNE   CONT_COUNT                  ;not end of duty cycle
327D   99016A        2074                 CMPB  TEMP_RD_FLAG,#01H           ;has the temperature been outputted
3280   DF05          2075                 JE    CONT_COUNT                  ;yes
3282   EF8DEF        2076                 CALL  GET_A_D_4                   ;get A/D channel 4 (temp bridge)
3285   2D8F          2077                 CALL  SCALE_TIP                   ;scale tip sensor
3287   889694        2078  CONT_COUNT:    CMP   CYCLE_COUNT,HTR_PERCENT     ;test if on cycle => heater percent
328A   D61A          2079                 JGE   ERASE_STR                   ;do not turn heater on now
328C   99016C        2080                 CMPB  POWER_FLAG,#01H             ;is heater enabled
328F   D71B          2081                 JNE   ALL_OFF                     ;no heater
3291   B12106        2082                 LDB   HSO_MODE,#21H               ;turn on heater
3294   4504000A04    2083                 ADD   HSO_TIME,TIMER1,#0004H      ;now
3299   2CFA          2084                 CALL  DELAY_10MSEC                ;complete first half cycle
329B   89000094      2085                 CMP   CYCLE_COUNT,#0000H          ;test for start of duty cycle
329F   D70D          2086                 JNE   OFF_CYCLE                   ;not start of duty cycle
32A1   B101B2        2087                 LDB   STAR_FLAG,#01H              ;set power indicator flag
32A4   2008          2088                 SJMP  OFF_CYCLE                   ;continue to turn off heater
32A6   89100094      2089  ERASE_STR:     CMP   CYCLE_COUNT,#0010H          ;is count long enough to display star
32AA   DE02          2090                 JLT   OFF_CYCLE                   ;don't turn off star yet
32AC   11B2          2091  ALL_OFF:       CLRB  STAR_FLAG                   ;clear power indicator flag
32AE   B10106        2092  OFF_CYCLE:     LDB   HSO_MODE,#01H               ;turn off heater
32B1   4504000A04    2093                 ADD   HSO_TIME,TIMER1,#0004H      ;now
32B6   450200961E    2094                 ADD   TEMPW1,HTR_PERCENT,#0002H   ;add 2 cycle to heater duty cycle
32BB   88941E        2095                 CMP   TEMPW1,CYCLE_COUNT          ;test if past last on cycle
32BE   D72C          2096                 JNE   NO_TEMP_OUT                 ;do not output tip temperature
32C0   EF4FEF        2097                 CALL  GET_A_D_4                   ;get A/D channel 4 (temp bridge)
32C3   2D51          2098                 CALL  SCALE_TIP                   ;scale tip sensor
32C5   B1016A        2099                 LDB   TEMP_RD_FLAG,#01H           ;set temperature outputted flag
32C8   89A0096       2100                 CMP   HTR_PERCENT,#000AH          ;test if heater is loaded
32CC   D21E          2101                 JGT   NO_TEMP_OUT                 ;do not change temperature correction
32CE   88403E        2102                 CMP   MAIN_SET,MAIN_OUT           ;test for temperature error
32D1   DF19          2103                 JE    NO_TEMP_OUT                 ;clear flag and exit if temperature OK
```

MCS-96 MACRO ASSEMBLER    THIRTEENTH.A9                                              02/04/93 10:35:11

```
LOC  OBJECT        STMT        SOURCE STATEMENT
32D3 88403E        2104              CMP   MAIN_SET,MAIN_OUT      ;compute correction
32D6 DE0E          2105              JLT   ERROR_HIGH             ;compensate for high temperature
32D8 079C          2106              INC   CORRECTION             ;compensate for low temperature
32DA 8928009C      2107              CMP   CORRECTION,#0028H      ;limit temp correction to 40 degrees
32DE DA0C          2108              JLE   NO_TEMP_OUT            ;limit OK
32E0 A128009C      2109              LD    CORRECTION,#0028H      ;limit here
32E4 2006          2110              SJMP  NO_TEMP_OUT            ;continue
32E6 059C          2111  ERROR_HIGH: DEC   CORRECTION             ;compensate for high temperature
32E8 D602          2112              JGE   NO_TEMP_OUT            ;correction is positive
32EA 019C          2113              CLR   CORRECTION             ;limit correction to zero
32EC 0794          2114  NO_TEMP_OUT: INC  CYCLE_COUNT            ;increment cycle counter
32EE 89000094      2115              CMP   CYCLE_COUNT,#0000H     ;is counter negative
32F2 D602          2116              JGE   TEST_40                ;test for overflow
32F4 0194          2117              CLR   CYCLE_COUNT            ;zero counter if negative
32F6 89270094      2118  TEST_40:    CMP   CYCLE_COUNT,#0027H     ;cycle complete if 40 cycles
32FA DA04          2119              JLE   NOT_COMPLETE           ;cycle not complete
32FC 0194          2120              CLR   CYCLE_COUNT            ;reset counter
32FE 116A          2121              CLRB  TEMP_RD_FLAG           ;clear temperature read flag
3300 CC1E          2122  NOT_COMPLETE: POP TEMPW1                 ;restore TEMPW1
3302 F0            2123              RET                          ;return
                   2124
                   2125
                   2126  ;           ************** END HEATER CONTROL ****************
                   2127
                   2128  ;           *********** TEST FOR VALID TIP NUMBER ***********
                   2129
3303 9904A2        2130  TIPN_VALID: CMPB  TIP_SELECT,#04H        ;test TIP_SELECT upper limit
3306 D206          2131              JGT   INITTN                 ;initialize
3308 9901A2        2132              CMPB  TIP_SELECT,#01H        ;test TIP_SELECT lower limit
330B DE01          2133              JLT   INITTN                 ;initialize
330D F0            2134              RET                          ;return
330E 2801          2135  INITTN:     CALL  INIT_TIP_NUM           ;initialize
3310 F0            2136              RET                          ;return
                   2137
3311 B101A2        2138  INIT_TIP_NUM: LDB TIP_SELECT,#01H        ;initialize to TIP 1
3314 F0            2139              RET
                   2140
                   2141  ;           ********* END TEST FOR VALID TIP NUMBER *********
                   2142
                   2143  ;           ****** TEST FOR VALID TEMPERATURE SET NUMBER ******
                   2144
3315 9904A3        2145  SETN_VALID: CMPB  TEMP_SELECT,#04H       ;test TIP_SELECT upper limit
3318 D206          2146              JGT   INITTT                 ;initialize
331A 9901A3        2147              CMPB  TEMP_SELECT,#01H       ;test TIP_SELECT lower limit
331D DE01          2148              JLT   INITTT                 ;initialize
331F F0            2149              RET                          ;return
3320 2801          2150  INITTT:     CALL  INIT_TEMP              ;initialize
3322 F0            2151              RET                          ;return
                   2152
3323 B101A3        2153  INIT_TEMP:  LDB   TEMP_SELECT,#01H       ;initialize select to temperature 1
3326 F0            2154              RET
                   2155
                   2156  ;           **** END TEST FOR VALID TEMPERATURE SET NUMBER ****
                   2157
                   2158  ;           *********** TEST FOR TIP SCALEING VALID ***********
                   2159
3327 89006080      2160  TIPK_VALID: CMP   TIP_K1,#6000H          ;test TIP K1 upper limit
```

```
MCS-96 MACRO ASSEMBLER    THIRTEENTH.A9                                          02/04/93 10:35:11

LOC   OBJECT         STMT      SOURCE STATEMENT
332B  D237           2161           JGT   INITT              ;initialize
332D  89003080       2162           CMP   TIP_K1,#3000H      ;test TIP K1 lower limit
3331  DE31           2163           JLT   INITT              ;initialize
3333  89000082       2164           CMP   TIP_K2,#0000H      ;test TIP K2 upper limit
3337  D22B           2165           JGT   INITT              ;initialize
3339  8900F082       2166           CMP   TIP_K2,#0F000H     ;test TIP K2 lower limit
333D  DE25           2167           JLT   INITT              ;initialize
333F  89000084       2168           CMP   TIP_K3,#0000H      ;test TIP K3 upper limit
3343  D21F           2169           JGT   INITT              ;initialize
3345  8900F084       2170           CMP   TIP_K3,#0F000H     ;test TIP K3 lower limit
3349  DE19           2171           JLT   INITT              ;initialize
334B  89000086       2172           CMP   TIP_K4,#0000H      ;test TIP K4 upper limit
334F  D213           2173           JGT   INITT              ;initialize
3351  8900F086       2174           CMP   TIP_K4,#0F000H     ;test TIP K4 lower limit
3355  DE0D           2175           JLT   INITT              ;initialize
3357  89000088       2176           CMP   TIP_K5,#0000H      ;test TIP K5 upper limit
335B  D207           2177           JGT   INITT              ;initialize
335D  8900F088       2178           CMP   TIP_K5,#0F000H     ;test TIP K5 lower limit
3361  DE01           2179           JLT   INITT              ;initialize
3363  F0             2180           RET                      ;return
3364  2801           2181   INITT:  CALL  INIT_TIP           ;initialize
3366  F0             2182           RET                      ;return
                     2183
3367  A1304C80       2184   INIT_TIP: LD  TIP_K1,#4C30H      ;initialize K1
336B  0182           2185           CLR   TIP_K2             ;initialize K2
336D  0184           2186           CLR   TIP_K3             ;initialize K3
336F  0186           2187           CLR   TIP_K4             ;initialize K4
3371  0188           2188           CLR   TIP_K5             ;initialize K5
3373  F0             2189           RET
                     2190
                     2191   ;         ********* END TEST FOR TIP SCALING VALID *********
                     2192
                     2193   ;         *********** TEST FOR TC SCALING VALID ***********
                     2194
3374  8900206E       2195   TC_VALID: CMP  TC_BIAS,#2000H    ;test TC bias upper limit
3378  D243           2196           JGT   INIT               ;initialize
337A  8900106E       2197           CMP   TC_BIAS,#1000H     ;test TC bias lower limit
337E  DE3D           2198           JLT   INIT               ;initialize
3380  89005070       2199           CMP   TC_K1,#5000H       ;test TC K1 upper limit
3384  D237           2200           JGT   INIT               ;initialize
3386  89003070       2201           CMP   TC_K1,#3000H       ;test TC K1 lower limit
338A  DE31           2202           JLT   INIT               ;initialize
338C  89000072       2203           CMP   TC_K2,#0000H       ;test TC K2 upper limit
3390  D22B           2204           JGT   INIT               ;initialize
3392  8900F072       2205           CMP   TC_K2,#0F000H      ;test TC K2 lower limit
3396  DE25           2206           JLT   INIT               ;initialize
3398  89000074       2207           CMP   TC_K3,#0000H       ;test TC K3 upper limit
339C  D21F           2208           JGT   INIT               ;initialize
339E  8900F074       2209           CMP   TC_K3,#0F000H      ;test TC K3 lower limit
33A2  DE19           2210           JLT   INIT               ;initialize
33A4  89000076       2211           CMP   TC_K4,#0000H       ;test TC K4 upper limit
33A8  D213           2212           JGT   INIT               ;initialize
33AA  8900F076       2213           CMP   TC_K4,#0F000H      ;test TC K4 lower limit
33AE  DE0D           2214           JLT   INIT               ;initialize
33B0  89000078       2215           CMP   TC_K5,#0000H       ;test TC K5 upper limit
33B4  D207           2216           JGT   INIT               ;initialize
33B6  8900F078       2217           CMP   TC_K5,#0F000H      ;test TC K5 lower limit
```

MCS-96 MACRO ASSEMBLER    THIRTEENTH.A9                                                  02/04/93 10:35:11 F

```
LOC  OBJECT           STMT       SOURCE STATEMENT
33BA DE01             2218             JLT  INIT                    ;initialize
33BC F0               2219             RET                          ;return
33BD 2801             2220   INIT:     CALL INIT_TC                 ;initialize
33BF F0               2221             RET                          ;return
                      2222
33C0 A10D166E         2223   INIT_TC:  LD   TC_BIAS,#160DH          ;initialize bias
33C4 A19E3670         2224             LD   TC_K1,#369EH            ;initialize K1
33C8 0172             2225             CLR  TC_K2                   ;initialize K2
33CA 0174             2226             CLR  TC_K3                   ;initialize K3
33CC 0176             2227             CLR  TC_K4                   ;initialize K4
33CE 0178             2228             CLR  TC_K5                   ;initialize K5
33D0 F0               2229             RET
                      2230
                      2231   ;         ********* END TEST FOR TC SCALEING VALID **********
                      2232
                      2233   ;         ************** NON VOLATILE MEMORY ******************
                      2234
                      2235
33D1 FA               2236   RD_NVR_BIAS: DI                        ;disable interrupts
33D2 B1001D           2237             LDB  TEMPB2,#00H             ;OP amp bias integrater address
33D5 2989             2238             CALL RD_NVR_X                ;call read non-volatile ram
33D7 B01C8D           2239             LDB  BIAS_INTH,TEMPB1        ;transfer data to PWM value
33DA B06D17           2240             LDB  PWM_CONTROL,BIAS_INTH   ;transfer INTH to PWM_CONTROL
33DD FB               2241             EI                           ;enable interrupts
33DE F0               2242             RET                          ;return
                      2243
33DF FA               2244   RD_NVR_TCK: DI                         ;disable interrupts
33E0 B1011D           2245             LDB  TEMPB2,#01H             ;TC bias low byte address
33E3 297B             2246             CALL RD_NVR_X                ;call read non-volatile ram
33E5 B01C6E           2247             LDB  TC_BIASL,TEMPB1         ;put data in tc bias low byte
33E8 171D             2248             INCB TEMPB2                  ;increment address
33EA 2974             2249             CALL RD_NVR_X                ;call read non-volatile ram
33EC B01C6F           2250             LDB  TC_BIASH,TEMPB1         ;put data in tc bias high byte
33EF 171D             2251             INCB TEMPB2                  ;increment address
33F1 296D             2252             CALL RD_NVR_X                ;call read non-volatile ram
33F3 B01C70           2253             LDB  TC_K1L,TEMPB1           ;put data in tc k1 low byte
33F6 171D             2254             INCB TEMPB2                  ;increment address
33F8 2966             2255             CALL RD_NVR_X                ;call read non-volatile ram
33FA B01C71           2256             LDB  TC_K1H,TEMPB1           ;put data in tc k1 high byte
33FD 171D             2257             INCB TEMPB2                  ;increment address
33FF 295F             2258             CALL RD_NVR_X                ;call read non-volatile ram
3401 B01C72           2259             LDB  TC_K2L,TEMPB1           ;put data in tc k2 low byte
3404 171D             2260             INCB TEMPB2                  ;increment address
3406 2958             2261             CALL RD_NVR_X                ;call read non-volatile ram
3408 B01C73           2262             LDB  TC_K2H,TEMPB1           ;put data in tc k2 high byte
340B 171D             2263             INCB TEMPB2                  ;increment address
340D 2951             2264             CALL RD_NVR_X                ;call read non-volatile ram
340F B01C74           2265             LDB  TC_K3L,TEMPB1           ;put data in tc k3 low byte
3412 171D             2266             INCB TEMPB2                  ;increment address
3414 294A             2267             CALL RD_NVR_X                ;call read non-volatile ram
3416 B01C75           2268             LDB  TC_K3H,TEMPB1           ;put data in tc k3 high byte
3419 171D             2269             INCB TEMPB2                  ;increment address
341B 2943             2270             CALL RD_NVR_X                ;call read non-volatile ram
341D B01C76           2271             LDB  TC_K4L,TEMPB1           ;put data in tc k4 low byte
3420 171D             2272             INCB TEMPB2                  ;increment address
3422 293C             2273             CALL RD_NVR_X                ;call read non-volatile ram
3424 B01C77           2274             LDB  TC_K4H,TEMPB1           ;put data in tc k4 high byte
```

MCS-96 MACRO ASSEMBLER    THIRTEENTH.A9                                                02/04/93 10:35:11 P

```
LOC  OBJECT       STMT        SOURCE STATEMENT
3427 171D         2275                  INCB TEMPB2             ;increment address
3429 2935         2276                  CALL RD_NVR_X           ;call read non-volatile ram
342B B01C76       2277                  LDB  TC_K5L,TEMPB1      ;put data in tc k5 low byte
342E 171D         2278                  INCB TEMPB2             ;increment address
3430 292E         2279                  CALL RD_NVR_X           ;call read non-volatile ram
3432 B01C79       2280                  LDB  TC_K5H,TEMPB1      ;put data in tc k5 high byte
3435 FB           2281                  EI                      ;enable interrupts
3436 F0           2282                  RET                     ;return
                  2283
3437 2820         2284    RD_NVR_TIP:   CALL RD_NVR_TIPN        ;get selected tip number
3439 9901A2       2285                  CMPB TIP_SELECT,#01H    ;is tip number 1 selected
343C D703         2286                  JNE  TESTR_TIP2         ;jump to next test
343E 2824         2287                  CALL RD_NVR_TIP1        ;get tip 1 constants
3440 F0           2288                  RET                     ;return
3441 9902A2       2289    TESTR_TIP2:   CMPB TIP_SELECT,#02H    ;is tip number 2 selected
3444 D703         2290                  JNE  TESTR_TIP3         ;jump to next test
3446 2824         2291                  CALL RD_NVR_TIP2        ;get tip 2 constants
3448 F0           2292                  RET                     ;return
3449 9903A2       2293    TESTR_TIP3:   CMPB TIP_SELECT,#03H    ;is tip number 3 selected
344C D703         2294                  JNE  TESTR_TIP4         ;jump to next test
344E 2824         2295                  CALL RD_NVR_TIP3        ;get tip 3 constants
3450 F0           2296                  RET                     ;return
3451 9904A2       2297    TESTR_TIP4:   CMPB TIP_SELECT,#04H    ;is tip number 4 selected
3454 D702         2298                  JNE  EXIT_TIPRK         ;jump to next test
3456 2824         2299                  CALL RD_NVR_TIP4        ;get tip 4 constants
3458 F0           2300    EXIT_TIPRK:   RET                      ;return
                  2301
3459 FA           2302    RD_NVR_TIPN:  DI                      ;disable interrupts
345A B13D1D       2303                  LDB  TEMPB2,#3DH        ;TIP # SELECTED address
345D 2901         2304                  CALL RD_NVR_X           ;call read non-volatile ram
345F B01CA2       2305                  LDB  TIP_SELECT,TEMPB1  ;put data in TIP SELECT
3462 FB           2306                  EI                      ;enable interrupts
3463 F0           2307                  RET                     ;return
                  2308
3464 FA           2309    RD_NVR_TIP1:  DI                      ;disable interrupts
3465 B10D1D       2310                  LDB  TEMPB2,#0DH        ;TIP 1 constants address
3468 281A         2311                  CALL RD_NVR_TIPX        ;call read non-volatile ram
346A FB           2312                  EI                      ;enable interrupts
346B F0           2313                  RET                     ;return
                  2314
346C FA           2315    RD_NVR_TIP2:  DI                      ;disable interrupts
346D B1171D       2316                  LDB  TEMPB2,#17H        ;TIP 2 constants address
3470 2812         2317                  CALL RD_NVR_TIPX          ;call read non-volatile ram
3472 FB           2318                  EI                      ;enable interrupts
3473 F0           2319                  RET                     ;return
                  2320
3474 FA           2321    RD_NVR_TIP3:  DI                      ;disable interrupts
3475 B1211D       2322                  LDB  TEMPB2,#21H        ;TIP 3 constants address
3478 280A         2323                  CALL RD_NVR_TIPX          ;call read non-volatile ram
347A FB           2324                  EI                      ;enable interrupts
347B F0           2325                  RET                     ;return
                  2326
347C FA           2327    RD_NVR_TIP4:  DI                      ;disable interrupts
347D B12B1D       2328                  LDB  TEMPB2,#2BH        ;TIP 4 constants address
3480 2802         2329                  CALL RD_NVR_TIPX        ;call read non-volatile ram
3482 FB           2330                  EI                      ;enable interrupts
3483 F0           2331                  RET                     ;return
```

MCS-96 MACRO ASSEMBLER    THIRTEENTH.A9                                                      02/04/93 10:35:11 F

```
LOC  OBJECT        STMT        SOURCE STATEMENT
                   2332
3484 28DA          2333  RD_NVR_TIPX:  CALL RD_NVR_X           ;call read non-volatile ram
3486 B01C80        2334         LDB  TIP_K1L,TEMPB1            ;put data in TIP k1 low byte
3489 171D          2335         INCB TEMPB2                    ;increment address
348B 28D3          2336         CALL RD_NVR_X                  ;call read non-volatile ram
348D B01C81        2337         LDB  TIP_K1H,TEMPB1            ;put data in TIP k1 high byte
3490 171D          2338         INCB TEMPB2                    ;increment address
3492 28CC          2339         CALL RD_NVR_X                  ;call read non-volatile ram
3494 B01C82        2340         LDB  TIP_K2L,TEMPB1            ;put data in TIP k2 low byte
3497 171D          2341         INCB TEMPB2                    ;increment address
3499 28C5          2342         CALL RD_NVR_X                  ;call read non-volatile ram
349B B01C83        2343         LDB  TIP_K2H,TEMPB1            ;put data in TIP k2 high byte
349E 171D          2344         INCB TEMPB2                    ;increment address
34A0 28BE          2345         CALL RD_NVR_X                  ;call read non-volatile ram
34A2 B01C84        2346         LDB  TIP_K3L,TEMPB1            ;put data in TIP k3 low byte
34A5 171D          2347         INCB TEMPB2                    ;increment address
34A7 28B7          2348         CALL RD_NVR_X                  ;call read non-volatile ram
34A9 B01C85        2349         LDB  TIP_K3H,TEMPB1            ;put data in TIP k3 high byte
34AC 171D          2350         INCB TEMPB2                    ;increment address
34AE 28B0          2351         CALL RD_NVR_X                  ;call read non-volatile ram
34B0 B01C86        2352         LDB  TIP_K4L,TEMPB1            ;put data in TIP k4 low byte
34B3 171D          2353         INCB TEMPB2                    ;increment address
34B5 28A9          2354         CALL RD_NVR_X                  ;call read non-volatile ram
34B7 B01C87        2355         LDB  TIP_K4H,TEMPB1            ;put data in TIP k4 high byte
34BA 171D          2356         INCB TEMPB2                    ;increment address
34BC 28A2          2357         CALL RD_NVR_X                  ;call read non-volatile ram
34BE B01C88        2358         LDB  TIP_K5L,TEMPB1            ;put data in TIP k5 low byte
34C1 171D          2359         INCB TEMPB2                    ;increment address
34C3 289B          2360         CALL RD_NVR_X                  ;call read non-volatile ram
34C5 B01C89        2361         LDB  TIP_K5H,TEMPB1            ;put data in TIP k5 high byte
34C8 F0            2362         RET                            ;return
                   2363
34C9 FA            2364  RD_NVR_TEMPN: DI                      ;disable interrupts
34CA B13E1D        2365         LDB  TEMPB2,#3EH               ;TEMPERATURE # SELECTED address
34CD 2891          2366         CALL RD_NVR_X                  ;call read non-volatile ram
34CF B01CA3        2367         LDB  TEMP_SELECT,TEMPB1        ;update TEMP_SELECT
34D2 FB            2368         EI                             ;enable interrupts
34D3 F0            2369         RET                            ;return
                   2370
34D4 2F61          2371  RD_NVR_TEMP:  CALL RD_NVR_TIP         ;get selected temperature
34D6 9901A3        2372         CMPB TEMP_SELECT,#01H          ;is temperature 1 selected
34D9 D703          2373         JNE  TESTS_TEMP2               ;jump to next test
34DB 2819          2374         CALL RD_NVR_TEMP1              ;get temp 1 constants
34DD F0            2375         RET                            ;return
34DE 9902A2        2376  TESTS_TEMP2:  CMPB TIP_SELECT,#02H    ;is temperature 2 selected
34E1 D703          2377         JNE  TESTS_TEMP3               ;jump to next test
34E3 2823          2378         CALL RD_NVR_TEMP2              ;get temp 2
34E5 F0            2379         RET                            ;return
34E6 9903A2        2380  TESTS_TEMP3:  CMPB TIP_SELECT,#03H    ;is temperature 3 selected
34E9 D703          2381         JNE  TESTS_TEMP4               ;jump to next test
34EB 282D          2382         CALL RD_NVR_TEMP3              ;get temp 3
34ED F0            2383         RET                            ;return
34EE 9904A2        2384  TESTS_TEMP4:  CMPB TIP_SELECT,#04H    ;is temperature 4 selected
34F1 D702          2385         JNE  EXIT_TEMP                 ;jump exit
34F3 2837          2386         CALL RD_NVR_TEMP4              ;get temp 4
34F5 F0            2387  EXIT_TEMP:    RET                     ;return
                   2388
```

MCS-96 MACRO ASSEMBLER     THIRTEENTH.A9                                              02/04/93 10:35:11

```
LOC  OBJECT       STMT       SOURCE STATEMENT
34F6 FA            2389  RD_NVR_TEMP1: DI                        ;disable interrupts
34F7 B1351D        2390              LDB  TEMPB2,#35H            ;preset temperature no. 1 address
34FA 2864          2391              CALL RD_NVR_X               ;call read non-volatile RAM
34FC B01C3E        2392              LDB  MAIN_SETL,TEMPB1       ;put temperature 1 low in MAIN_SETL
34FF 171D          2393              INCB TEMPB2                 ;increment address
3501 285D          2394              CALL RD_NVR_X               ;call read non_volatile RAM
3503 B01C3F        2395              LDB  MAIN_SETH,TEMPB1       ;put temperature 1 high in MAIN_SETH
3506 FB            2396              EI                          ;enable interrupts
3507 F0            2397              RET                         ;return
                   2398
3508 FA            2399  RD_NVR_TEMP2: DI                        ;disable interrupts
3509 B1371D        2400              LDB  TEMPB2,#37H            ;preset temperature no. 2 address
350C 2852          2401              CALL RD_NVR_X               ;call read non-volatile RAM
350E B01C3E        2402              LDB  MAIN_SETL,TEMPB1       ;put temperature 2 low in MAIN_SETL
3511 171D          2403              INCB TEMPB2                 ;increment address
3513 284B          2404              CALL RD_NVR_X               ;call read non_volatile RAM
3515 B01C3F        2405              LDB  MAIN_SETH,TEMPB1       ;put temperature 2 high in MAIN_SETH
3518 FB            2406              EI                          ;enable interrupts
3519 F0            2407              RET                         ;return
                   2408
351A FA            2409  RD_NVR_TEMP3: DI                        ;disable interrupts
351B B1391D        2410              LDB  TEMPB2,#39H            ;preset temperature no. 3 address
351E 2840          2411              CALL RD_NVR_X               ;call read non-volatile RAM
3520 B01C3E        2412              LDB  MAIN_SETL,TEMPB1       ;put temperature 3 low in MAIN_SETL
3523 171D          2413              INCB TEMPB2                 ;increment address
3525 2839          2414              CALL RD_NVR_X               ;call read non_volatile RAM
3527 B01C3F        2415              LDB  MAIN_SETH,TEMPB1       ;put temperature 3 high in MAIN_SETH
352A FB            2416              EI                          ;enable interrupts
352B F0            2417              RET                         ;return
                   2418
352C FA            2419  RD_NVR_TEMP4: DI                        ;disable interrupts
352D B13B1D        2420              LDB  TEMPB2,#3BH            ;preset temperature no. 4 address
3530 282E          2421              CALL RD_NVR_X               ;call read non-volatile ram
3532 B01C3E        2422              LDB  MAIN_SETL,TEMPB1       ;put temperature 4 low in MAIN_SETL
                                     INCB TEMPB2                 ;increment address
3535 2829          2423              CALL RD_NVR_X               ;call read non_volatile RAM
3537 B01C3F        2424              LDB  MAIN_SETH,TEMPB1       ;put temperature 4 high in MAIN_SETH
353A FB            2425              EI                          ;enable interrupts
353B F0            2426              RET                         ;return
                   2427
353C FA            2428  RD_NVR_SET: DI                          ;disable interrupts
353D B13F1D        2429              LDB  TEMPB2,#3FH            ;set temp low address
3540 281E          2430              CALL RD_NVR_X               ;call read non-volatile ram
3542 B01C3E        2431              LDB  MAIN_SETL,TEMPB1       ;transfer data set temp register
3545 171D          2432              INCB TEMPB2                 ;set temp high address
3547 2817          2433              CALL RD_NVR_X               ;call read non-volatile ram
3549 B01C3F        2434              LDB  MAIN_SETH,TEMPB1       ;transfer data set temp register
354C FB            2435              EI                          ;enable interrupts
354D F0            2436              RET                         ;return
                   2437
354E F2            2438  RD_NVR_ALARM: PUSHF                     ;disable interrupts
354F B1411D        2439              LDB  TEMPB2,#41H            ;set temp low address
3552 280C          2440              CALL RD_NVR_X               ;call read non-volatile ram
3554 B01CAE        2441              LDB  ALARM_SETL,TEMPB1      ;transfer data set temp register
3557 171D          2442              INCB TEMPB2                 ;set temp high address
3559 2805          2443              CALL RD_NVR_X               ;call read non-volatile ram
355B B01CAF        2444              LDB  ALARM_SETH,TEMPB1      ;transfer data set temp register
```

MCS-96 MACRO ASSEMBLER      THIRTEENTH.A9                                            02/04/93 10:35:11

| LOC | OBJECT | STMT | SOURCE STATEMENT | | |
|---|---|---|---|---|---|
| 355E | F3 | 2445 | | POPF | ;enable interrupts |
| 355F | F0 | 2446 | | RET | ;return |
| | | 2447 | | | |
| 3560 | 29AF | 2448 | RD_NVR_X: | CALL START | ;send start condition to NV-RAM |
| 3562 | B1A01A | 2449 | | LDB TEMPB3,#0A0H | ;put slave address into shift register |
| 3565 | 29B8 | 2450 | | CALL SHIFT_WR | ;send data and clock to NV-RAM |
| 3567 | B01D1A | 2451 | | LDB TEMPB3,TEMPB2 | ;put data address into shift register |
| 356A | 29B3 | 2452 | | CALL SHIFT_WR | ;send data and clock to NV-RAM |
| 356C | 29A3 | 2453 | | CALL START | |
| 356E | B1A11A | 2454 | | LDB TEMPB3,#0A1H | ;put slave address into shift register |
| 3571 | 297C | 2455 | | CALL SHIFT_WR | ;send data and clock to NV-RAM |
| 3573 | 294A | 2456 | | CALL SHIFT_RD | ;read data |
| 3575 | 2963 | 2457 | | CALL STOP | ;send stop condition to NV-RAM |
| 3577 | B12516 | 2458 | | LDB IOC1,#25H | ;restore IOC1 |
| 357A | F0 | 2459 | | RET | ;return |
| | | 2460 | | | |
| 357B | FA | 2461 | WR_NVR_BIAS: | DI | ;disable interrupts |
| 357C | B08D1C | 2462 | | LDB TEMPB1,BIAS_INTH | ;put BIAS_INTH in data register |
| 357F | B1001D | 2463 | | LDB TEMPB2,#00H | ;OP amp bias integrater address |
| 3582 | 2951 | 2464 | | CALL WR_NVR_X | ;call write non-volatile ram |
| 3584 | FB | 2465 | | EI | ;enable interrupts |
| 3585 | F0 | 2466 | | RET | ;return |
| | | 2467 | | | |
| 3586 | FA | 2468 | WR_NVR_TCK: | DI | ;disable interrupts |
| 3587 | B06E1C | 2469 | | LDB TEMPB1,TC_BIASL | ;put TC bias low byte into register |
| 358A | B1011D | 2470 | | LDB TEMPB2,#01H | ;TC bias low byte address |
| 358D | 2946 | 2471 | | CALL WR_NVR_X | ;call write non-volatile ram |
| 358F | B06F1C | 2472 | | LDB TEMPB1,TC_BIASH | ;put TC bias high byte into register |
| 3592 | 171D | 2473 | | INCB TEMPB2 | ;increment address |
| 3594 | 293F | 2474 | | CALL WR_NVR_X | ;call write non-volatile ram |
| 3596 | B07C1C | 2475 | | LDB TEMPB1,TC_K1L | ;put TC K1 low byte into register |
| 3599 | 171D | 2476 | | INCB TEMPB2 | ;increment address |
| 359B | 2938 | 2477 | | CALL WR_NVR_X | ;call write non-volatile ram |
| 359D | B0711C | 2478 | | LDB TEMPB1,TC_K1H | ;put TC K1 high byte into register |
| 35A0 | 171D | 2479 | | INCB TEMPB2 | ;increment address |
| 35A2 | 2931 | 2480 | | CALL WR_NVR_X | ;call write non-volatile ram |
| 35A4 | B0721C | 2481 | | LDB TEMPB1,TC_K2L | ;put TC K2 low byte into register |
| 35A7 | 171D | 2482 | | INCB TEMPB2 | ;increment address |
| 35A9 | 292A | 2483 | | CALL WR_NVR_X | ;call write non-volatile ram |
| 35AB | B0731C | 2484 | | LDB TEMPB1,TC_K2H | ;put TC K2 high byte into register |
| 35AE | 171D | 2485 | | INCB TEMPB2 | ;increment address |
| 35B0 | 2923 | 2486 | | CALL WR_NVR_X | ;call write non-volatile ram |
| 35B2 | B0741C | 2487 | | LDB TEMPB1,TC_K3L | ;put TC K3 low byte into register |
| 35B5 | 171D | 2488 | | INCB TEMPB2 | ;increment address |
| 35B7 | 291C | 2489 | | CALL WR_NVR_X | ;call write non-volatile ram |
| 35B9 | B0751C | 2490 | | LDB TEMPB1,TC_K3H | ;put TC K3 high byte into register |
| 35BC | 171D | 2491 | | INCB TEMPB2 | ;increment address |
| 35BE | 2915 | 2492 | | CALL WR_NVR_X | ;call write non-volatile ram |
| 35C0 | B0761C | 2493 | | LDB TEMPB1,TC_K4L | ;put TC K4 low byte into register |
| 35C3 | 171D | 2494 | | INCB TEMPB2 | ;increment address |
| 35C5 | 290E | 2495 | | CALL WR_NVR_X | ;call write non-volatile ram |
| 35C7 | B0771C | 2496 | | LDB TEMPB1,TC_K4H | ;put TC K4 high byte into register |
| 35CA | 171D | 2497 | | INCB TEMPB2 | ;increment address |
| 35CC | 2907 | 2498 | | CALL WR_NVR_X | ;call write non-volatile ram |
| 35CE | B07B1C | 2499 | | LDB TEMPB1,TC_K5L | ;put TC K5 low byte into register |
| 35D1 | 171D | 2500 | | INCB TEMPB2 | ;increment address |
| 35D3 | 2900 | 2501 | | CALL WR_NVR_X | ;call write non-volatile ram |

MCS-96 MACRO ASSEMBLER    THIRTEENTH.A9.                                    02/04/93 10:35:11 P

```
LOC  OBJECT        STMT       SOURCE STATEMENT
35D5 B0791C        2502                   LDB   TEMPB1,TC_K5H       ;put TC K5 high byte into register
35D8 171D          2503                   INCB  TEMPB2              ;increment address
35DA 28F9          2504                   CALL  WR_NVR_X            ;call write non-volatile ram
35DC FB            2505                   EI                        ;enable interrupts
35DD F0            2506                   RET                       ;return
                   2507
35DE 2E57          2508    WR_NVR_TIPK:   CALL  RD_NVR_TIP          ;get selected tip number
35E0 9901A2        2509                   CMPB  TIP_SELECT,#01H     ;is tip number 1 selected
35E3 D703          2510                   JNE   TESTW_TIP2          ;jump to next test
35E5 2824          2511                   CALL  WR_NVR_TIP1         ;save tip 1 constants
35E7 F0            2512                   RET                       ;return
35E8 9902A2        2513    TESTW_TIP2:    CMPB  TIP_SELECT,#02H     ;is tip number 2 selected
35EB D703          2514                   JNE   TESTW_TIP3          ;jump to next test
35ED 2824          2515                   CALL  WR_NVR_TIP2         ;save tip 2 constants
35EF F0            2516                   RET                       ;return
35F0 9903A2        2517    TESTW_TIP3:    CMPB  TIP_SELECT,#03H     ;is tip number 3 selected
35F3 D703          2518                   JNE   TESTW_TIP4          ;jump to next test
35F5 2824          2519                   CALL  WR_NVR_TIP3         ;save tip 3 constants
35F7 F0            2520                   RET                       ;return
35F8 9904A2        2521    TESTW_TIP4:    CMPB  TIP_SELECT,#04H     ;is tip number 4 selected
35FB D702          2522                   JNE   EXIT_TIPWK          ;no tips selected
35FD 2824          2523                   CALL  WR_NVR_TIP4         ;save tip 4 constants
35FF F0            2524    EXIT_TIPWK:    RET                       ;return
                   2525
3600 FA            2526    WR_NVR_TIP:    DI                        ;disable interrupts
3601 B0A21C        2527                   LDB   TEMPB1,TIP_SELECT   ;get selected tip number
3604 B13D1D        2528                   LDB   TEMPB2,#3DH         ;get selected tip number address
3607 28CC          2529                   CALL  WR_NVR_X            ;call non volatile RAM
3609 FB            2530                   EI                        ;enable interrupts
360A F0            2531                   RET                       ;return
                   2532
360B FA            2533    WR_NVR_TIP1:   DI                        ;disable interrupts
360C B10D1D        2534                   LDB   TEMPB2,#0DH         ;get TIP 1 constants address
360F 281A          2535                   CALL  WR_NVR_TIPX         ;call write non-volatile RAM
3611 FB            2536                   EI                        ;enable interrupts
3612 F0            2537                   RET                       ;return
                   2538
3613 FA            2539    WR_NVR_TIP2:   DI                        ;disable interrupts
3614 B1171D        2540                   LDB   TEMPB2,#17H         ;TIP 2 constants address
3617 28BC          2541                   CALL  WR_NVR_X            ;call write non-volatile RAM
3619 FB            2542                   EI                        ;enable interrupts
361A F0            2543                   RET                       ;return
                   2544
361B FA            2545    WR_NVR_TIP3:   DI                        ;disable interrupts
361C B1211D        2546                   LDB   TEMPB2,#21H         ;TIP 3 constants address
361F 28B4          2547                   CALL  WR_NVR_X            ;call write non-volatile RAM
3621 FB            2548                   EI                        ;enable interrupts
3622 F0            2549                   RET                       ;return
                   2550
3623 FA            2551    WR_NVR_TIP4:   DI                        ;disable interrupts
3624 B12B1D        2552                   LDB   TEMPB2,#2BH         ;TIP 4 constants address
3627 28AC          2553                   CALL  WR_NVR_X            ;call write non-volatile ram
3629 FB            2554                   EI                        ;enable interrupts
362A F0            2555                   RET                       ;return
                   2556
362B B0801C        2557    WR_NVR_TIPX:   LDB   TEMPB1,TIP_K1L      ;put TC K1 low byte into register
362E 28A5          2558                   CALL  WR_NVR_X            ;call write non-volatile ram
```

MCS-96 MACRO ASSEMBLER          THIRTEENTH.A9                                                    02/04/93 10:35:11

```
LOC   OBJECT       STMT         SOURCE STATEMENT
3630  B0811C       2559              LDB   TEMPB1,TIP_K1H        ;put TC K1 high byte into register
3633  171D         2560              INCB  TEMPB2                ;increment address
3635  289E         2561              CALL  WR_NVR_X              ;call write non-volatile ram
3637  B0821C       2562              LDB   TEMPB1,TIP_K2L        ;put TC K2 low byte into register
363A  171D         2563              INCB  TEMPB2                ;increment address
363C  2897         2564              CALL  WR_NVR_X              ;call write non-volatile ram
363E  B0831C       2565              LDB   TEMPB1,TIP_K2H        ;put TC K2 high byte into register
3641  171D         2566              INCB  TEMPB2                ;increment address
3643  2890         2567              CALL  WR_NVR_X              ;call write non-volatile ram
3645  B0841C       2568              LDB   TEMPB1,TIP_K3L        ;put TC K3 low byte into register
3648  171D         2569              INCB  TEMPB2                ;increment address
364A  2889         2570              CALL  WR_NVR_X              ;call write non-volatile ram
364C  B0851C       2571              LDB   TEMPB1,TIP_K3H        ;put TC K3 high byte into register
364F  171D         2572              INCB  TEMPB2                ;increment address
3651  2882         2573              CALL  WR_NVR_X              ;call write non-volatile ram
3653  B0861C       2574              LDB   TEMPB1,TIP_K4L        ;put TC K4 low byte into register
3656  171D         2575              INCB  TEMPB2                ;increment address
3658  287B         2576              CALL  WR_NVR_X              ;call write non-volatile ram
365A  B0871C       2577              LDB   TEMPB1,TIP_K4H        ;put TC K4 high byte into register
365D  171D         2578              INCB  TEMPB2                ;increment address
365F  2874         2579              CALL  WR_NVR_X              ;call write non-volatile ram
3661  B0881C       2580              LDB   TEMPB1,TIP_K5L        ;put TC K5 low byte into register
3664  171D         2581              INCB  TEMPB2                ;increment address
3666  286D         2582              CALL  WR_NVR_X              ;call write non-volatile ram
3668  B0891C       2583              LDB   TEMPB1,TIP_K5H        ;put TC K5 high byte into register
366B  171D         2584              INCB  TEMPB2                ;increment address
366D  2866         2585              CALL  WR_NVR_X              ;call write non-volatile ram
366F  F0           2586              RET                         ;return
                   2587
3670  FA           2588  WR_NVR_TEMP: DI                         ;disable interrupts
3671  B0A31C       2589              LDB   TEMPB1,TEMP_SELECT    ;get selected tip temperature number
3674  B13F1D       2590              LDB   TEMPB2,#3FH           ;get selected tip temperature address
3677  285C         2591              CALL  WR_NVR_X              ;call non volatile RAM
3679  FB           2592              EI                          ;enable interrupts
367A  F0           2593              RET                         ;return
                   2594
367B  FA           2595  WR_NVR_TEMP1: DI                        ;disable interrupts
367C  B1351D       2596              LDB   TEMPB2,#35H           ;preset temperature no. 1 address
367F  2854         2597              CALL  WR_NVR_X              ;call write non-volatile ram
3681  FB           2598              EI                          ;enable interrupts
3682  F0           2599              RET                         ;return
                   2600
3683  FA           2601  WR_NVR_TEMP2: DI                        ;disable interrupts
3684  B1371D       2602              LDB   TEMPB2,#37H           ;preset temperature no. 2 address
3687  284C         2603              CALL  WR_NVR_X              ;call write non-volatile ram
3689  FB           2604              EI                          ;enable interrupts
368A  F0           2605              RET                         ;return
                   2606
368B  FA           2607  WR_NVR_TEMP3: DI                        ;disable interrupts
368C  B1391D       2608              LDB   TEMPB2,#39H           ;get preset temperature no. 3 address
368F  2844         2609              CALL  WR_NVR_X              ;write non-volatile ram
3691  FB           2610              EI                          ;enable interrupts
3692  F0           2611              RET                         ;return
                   2612
3693  FA           2613  WR_NVR_TEMP4: DI                        ;disable interrupts
3694  B13B1D       2614              LDB   TEMPB2,#3BH           ;preset temperature no. 4 address
3697  283C         2615              CALL  WR_NVR_X              ;call write non-volatile ram
```

MCS-96 MACRO ASSEMBLER    THIRTEENTH.A9                                                      02/04/93 10:35:11

```
LOC  OBJECT        STMT        SOURCE STATEMENT
3699 FB            2616                    EI                          ;enable interrupts
369A F0            2617                    RET                         ;return
                   2618
369B FA            2619        WR_NVR_SET: DI                          ;disable interrupts
369C B03E1C        2620                    LDB  TEMPB1,MAIN_SETL       ;put set temp into data register
369F B13F1D        2621                    LDB  TEMPB2,#3FH            ;set temp address
36A2 2831          2622                    CALL WR_NVR_X               ;call write non-volatile ram
36A4 B03F1C        2623                    LDB  TEMPB1,MAIN_SETH       ;put set temp into data register
36A7 171D          2624                    INCB TEMPB2                 ;set temp address
36A9 282A          2625                    CALL WR_NVR_X               ;call write non-volatile ram
36AB FB            2626                    EI                          ;enable interrupts
36AC F0            2627                    RET                         ;return
                   2628
36AD F2            2629        WR_NVR_ALARM: PUSHF                     ;disable interrupts
36AE B0AE1C        2630                    LDB  TEMPB1,ALARM_SETL      ;put set temp into data register
36B1 B1411D        2631                    LDB  TEMPB2,#41H            ;set temp address
36B4 281F          2632                    CALL WR_NVR_X               ;call write non-volatile ram
36B6 B0AF1C        2633                    LDB  TEMPB1,ALARM_SETH      ;put set temp into data register
36B9 171D          2634                    INCB TEMPB2                 ;set temp address
36BB 2818          2635                    CALL WR_NVR_X               ;call write non-volatile ram
36BD F3            2636                    POPF                        ;enable interrupts
36BE F0            2637                    RET                         ;return
                   2638
36BF B10834        2639        SHIFT_RD:   LDB  INDEXB1,#08H           ;initialize index
36C2 111C          2640                    CLRB TEMPB1                 ;fill data register with zeros
36C4 19011C        2641        ANOTHER_BITR: SHLB TEMPB1,#1            ;shift left to convert to byte
36C7 2878          2642                    CALL RD                     ;read NV-RAM data
36C9 741B1C        2643                    ADDB TEMPB1,TEMPB4          ;put data in LSB
36CC 2891          2644                    CALL CLK_HI                 ;send clock high to NV-RAM
36CE 2883          2645                    CALL CLK_LO                 ;send clock low to NV-RAM
36D0 1534          2646                    DECB INDEXB1                ;decrement index
36D2 D7F0          2647                    JNE  ANOTHER_BITR           ;continue till all bits shifted
36D4 F0            2648                    RET                         ;return
                   2649
36D5 283A          2650        WR_NVR_X:   CALL START                  ;send start condition to NV-RAM
36D7 B1A01A        2651                    LDB  TEMPB3,#0A0H           ;put slave address into shift register
36DA 2813          2652                    CALL SHIFT_WR               ;send data and clock to NV-RAM
36DC B01D1A        2653                    LDB  TEMPB3,TEMPB2          ;put data address into shift register
36DF 280E          2654                    CALL SHIFT_WR               ;send data and clock to NV-RAM
36E1 B01C1A        2655                    LDB  TEMPB3,TEMPB1          ;put data into shift register
36E4 2809          2656                    CALL SHIFT_WR               ;send data and clock to NV-RAM
36E6 2832          2657                    CALL STOP                   ;send stop condition to NV-RAM
36E8 EFAAF8        2658                    CALL DELAY_10MSEC           ;delay till NV-RAM write complete
36EB B12516        2659                    LDB  IOC1,#25H              ;restore IOC1
36EE F0            2660                    RET                         ;return
                   2661
36EF B10834        2662        SHIFT_WR:   LDB  INDEXB1,#08H           ;initialize index
36F2 19011A        2663        ANOTHER_BITW: SHLB TEMPB3,#1            ;shift first bit to carry
36F5 DB04          2664                    JC   CARRY_SETW             ;test carry
36F7 282A          2665                    CALL WR_0                   ;output 0 if carry not set
36F9 2002          2666                    SJMP MORE_NVRW              ;continue processing
36FB 2835          2667        CARRY_SETW: CALL WR_1                   ;output 1 if carry set
36FD 2860          2668        MORE_NVRW:  CALL CLK_HI                 ;toggle clock
36FF 2852          2669                    CALL CLK_LO                 ;here
3701 1534          2670                    DECB INDEXB1                ;decrement index
3703 D7ED          2671                    JNE  ANOTHER_BITW           ;continue till all bits shifted
3705 283A          2672        READ_AGAINW: CALL RD                    ;read data to poll acknowlage
```

```
MCS-96 MACRO ASSEMBLER    THIRTEENTH.A9.                                02/04/93 10:35:11

LOC  OBJECT           STMT         SOURCE STATEMENT
3707 99001B           2673              CMPB TEMPB4,#00H       ;test acknowlege
370A D7F9             2674              JNE  READ_AGAINW      ;continue polling
370C 2851             2675              CALL CLK_HI            ;toggle clock
370E 2843             2676              CALL CLK_LO            ;here
3710 F0               2677              RET                    ;return
                      2678
3711 281F             2679  START:      CALL WR_1              ;set data high
3713 284A             2680              CALL CLK_HI            ;begin start condition with clock high
3715 280C             2681              CALL WR_0              ;start here
3717 283A             2682              CALL CLK_LO            ;ready for next operation
3719 F0               2683              RET                    ;return
                      2684
371A 2807             2685  STOP:       CALL WR_0              ;set data low
371C 2841             2686              CALL CLK_HI            ;begin start condition with clock high
371E 2812             2687              CALL WR_1              ;start here
3720 2831             2688              CALL CLK_LO            ;ready for next operation
3722 F0               2689              RET                    ;return
                      2690
                      2691  ;WR_SYNC:    LDB  HSO_MODE,#25H     ;write 1 to SYNC
                      2692  ;            ADD  HSO_TIME,TIMER1,#0004H ;now
                      2693  ;            CALL DELAY_40USEC      ;delay 40 usec
                      2694  ;            LDB  HSO_MODE,#05H     ;write 0 to SYNC
                      2695  ;            ADD  HSO_TIME,TIMER1,#0004H ;now
                      2696  ;            CALL DELAY_40USEC      ;delay 40 usec
                      2697  ;            RET
                      2698
                      2699
3723 B13516           2700  WR_0:       LDB  IOC1,#35H         ;bit 4, HSO4/HSI2 = 1
3726 B10406           2701              LDB  HSO_MODE,#04H     ;write 0 to non volatile memory
3729 4504000A04       2702              ADD  HSO_TIME,TIMER1,#0004H ;now
372E EF46F8           2703              CALL DELAY_40USEC      ;delay 40 usec
3731 F0               2704              RET
                      2705
3732 B13516           2706  WR_1:       LDB  IOC1,#35H         ;bit 4, HSO4/HSI2 = 1
3735 B12406           2707              LDB  HSO_MODE,#24H     ;write 1 to non volatile memory
3738 4504000A04       2708              ADD  HSO_TIME,TIMER1,#0004H ;now
373D EF39F8           2709              CALL DELAY_40USEC      ;delay 40 usec
3740 F0               2710              RET
                      2711
3741 B12516           2712  RD:         LDB  IOC1,#25H         ;bit 4, HSO4/HSI2 = 0
3744 B0061B           2713              LDB  TEMPB4,HSI_STATUS ;get HSI status
3747 71201B           2714              ANDB TEMPB4,#20H       ;test HSI2
374A DF04             2715              JE   RD_ZERO           ;data = 0
374C B1011B           2716              LDB  TEMPB4,#01H       ;set data bit = 1
374F F0               2717              RET
3750 111B             2718  RD_ZERO:    CLRB TEMPB4            ;set data bit = 0
3752 F0               2719              RET
                      2720
3753 B10006           2721  CLK_LO:     LDB  HSO_MODE,#00H     ;set non volatile memory clk (SCL) = 0
3756 4504000A04       2722              ADD  HSO_TIME,TIMER1,#0004H ;set HSO0 now
375B EF1BF8           2723              CALL DELAY_40USEC      ;delay 40 usec
375E F0               2724              RET
                      2725
375F B12006           2726  CLK_HI:     LDB  HSO_MODE,#20H     ;set non volatile memory clk (SCL) = 1
3762 4504000A04       2727              ADD  HSO_TIME,TIMER1,#0004H ;set HSO0 now
3767 EF0FF8           2728              CALL DELAY_40USEC      ;delay 40 usec
376A F0               2729              RET
```

MCS-96 MACRO ASSEMBLER    THIRTEENTH.A9.                                          02/04/93 10:35:11

```
LOC  OBJECT              STMT     SOURCE STATEMENT
                         2730
                         2731   ;         *********** END NON VOLATILE MEMORY **************
                         2732
                         2733   ;         ********************* BEEPER *********************
                         2734
376B F2                  2735   BEEP:     PUSHF                   ;save PSW on stack and DI
376C C81E                2736             PUSH TEMPW1             ;save TEMPW1 on stack
376E A100011E            2737             LD   TEMPW1,#0100H      ;beep for one second
3772 B12206              2738   MORE_BEEP: LDB HSO_MODE,#22H      ;set beeper output high
3775 4504000A04          2739             ADD  HSO_TIME,TIMER1,#0004H ;now
377A 281C                2740             CALL BEEP_DELAY         ;call beep cycle timer
377C B10206              2741             LDB  HSO_MODE,#02H      ;set beeper output low
377F 4504000A04          2742             ADD  HSO_TIME,TIMER1,#0004H ;now
3784 2812                2743             CALL BEEP_DELAY         ;call beep cycle timer
3786 051E                2744             DEC  TEMPW1             ;decrement cycle counter
3788 D7E8                2745             JNE  MORE_BEEP          ;process another cycle
378A CC1E                2746             POP  TEMPW1             ;restore TEMPW1 from stack
378C B11806              2747             LDB  HSO_MODE,#18H      ;set software timer 1 to interrupt
378F 45204E0A04          2748             ADD  HSO_TIME,TIMER1,#4E20H ;at a 25 Hz rate
3794 1109                2749             CLRB INT_PENDING        ;clear pending interrupts
3796 F3                  2750             POPF                    ;restore PSW from stack and EI
3797 F0                  2751             RET                     ;return
                         2752
3798 C81E                2753   BEEP_DELAY: PUSH TEMPW1           ;save TEMPB1 on stack
379A A10A001E            2754             LD   TEMPW1,#000AH      ;initialize counter 14X40usec (880 HZ)
379E EFD8F7              2755   D_BEEP_TIME: CALL DELAY_40USEC    ;delay 40 usec
37A1 051E                2756             DEC  TEMPW1             ;decrement counter
37A3 D2F9                2757             JGT  D_BEEP_TIME        ;continue if count not zero
37A5 CC1E                2758             POP  TEMPW1             ;restore TEMPB2 from stack
37A7 F0                  2759             RET                     ;return after counts
                         2760
                         2761   ;         ****************** END BEEPER *********************
                         2762
                         2763   ;*********************** INTERRUPT ROUTINES *****************************
                         2764
                         2765   ;         *********** TIMER1 INTERRUPT ROUTINE **************
                         2766
3F50                     2767             CSEG AT 3F50H           ;TIMER1 interrupt routine
3F50 F0                  2768             RET                     ;return
                         2769
                         2770   ;         ********** END TIMER1 INTERRUPT ROUTINE ***********
                         2771
                         2772   ;         **** A/D CONVERTION COMPLETE INTERRUPT ROUTINE ****
                         2773
3F60                     2774             CSEG AT 3F60H           ;A/D CONV COMPLETE interrupt routine
3F60 B1011C              2775             LDB  TEMPB1,#01H        ;set A/D converter ready flag
3F63 F0                  2776             RET                     ;return
                         2777
                         2778   ;         ** END A/D CONVERSION COMPLETE INTERRUPT ROUTINE **
                         2779
                         2780   ;         ****** HSI DATA AVAILABLE INTERRUPT ROUTINE *******
                         2781
3F70                     2782             CSEG AT 3F70H           ;HSI DATA AVAILABLE interrupt routine
3F70 F0                  2783             RET                     ;return
                         2784
                         2785   ;         **** END HSI DATA AVAILABLE INTERRUPT ROUTINE *****
                         2786
```

MCS-96 MACRO ASSEMBLER    THIRTEENTH.A9                                        02/04/93 10:35:11    5

```
LOC  OBJECT            STMT    SOURCE STATEMENT
                       2787  ; ************ HSO INTERRUPT ROUTINE **************
                       2788
3F80                   2789             CSEG AT 3F80H          ;HSO interrupt routine
3F80 F0                2790             RET                    ;return
                       2791
                       2792  ; ************ END HSO INTERRUPT ROUTINE ************
                       2793
                       2794  ; ************ HSI.0 INTERRUPT ROUTINE ************
                       2795
3F90                   2796             CSEG AT 3F90H          ;HSI.0 interrupt routine
3F90 F0                2797             RET                    ;return
                       2798
                       2799  ; *********** END HSI.0 INTERRUPT ROUTINE ***********
                       2800
                       2801  ; ******** SOFTWARE TIMERS INTERRUPT ROUTINE ********
                       2802
3FA0                   2803             CSEG AT 3FA0H          ;SOFTWARE TIMERS interrupt routine
3FA0 F2                2804             PUSHF                  ;save PSW on the stack
3FA1 B1A008            2805             LDB  INT_MASK,#0A0H    ;enable software timer & EXTINT interrupt
3FA4 EF6BE1            2806             CALL T1_SERVICE        ;routines serviced at timer1 rate
3FA7 F3                2807             POPF
3FA8 F0                2808             RET                    ;return
                       2809
                       2810  ; ****** END SOFTWARE TIMERS INTERRUPT ROUTINE ******
                       2811
                       2812  ; ********** SERIAL PORT INTERRUPT ROUTINE **********
                       2813
3FC0                   2814             CSEG AT 3FC0H          ;SERIAL PORT interrupt routine
3FC0 F0                2815             RET                    ;return
                       2816
                       2817  ; ******** END SERIAL PORT INTERRUPT ROUTINE ********
                       2818
                       2819  ; *********** EXTERNAL INTERRUPT ROUTINE ***********
                       2820
3FD0                   2821             CSEG AT 3FD0H          ;EXTINT interrupt routine
3FD0 F2                2822             PUSHF                  ;save program status on stack
3FD1 71FD09            2823             ANDB INT_PENDING,#0FDH ;clear A/D pending bit
3FD4 B10208            2824             LDB  INT_MASK,#02H     ;enable A/D interrupt mask
3FD7 FB                2825             EI                     ;enable A/D interrupts
3FD8 EF67E1            2826             CALL SIXTY_HERTZ       ;routines serviced 60HZ rate
3FDB 717F09            2827             ANDB INT_PENDING,#7FH  ;reset false external interrupts
3FDE F3                2828             POPF                   ;restore program status
3FDF F0                2829             RET                    ;return
                       2830
                       2831  ; ********* END EXTERNAL INTERRUPT ROUTINE **********
                       2832
                       2833  ; ******** SOFTWARE TRAP INTERRUPT ROUTINE **********
                       2834
3FF0                   2835             CSEG AT 3FF0H          ;SOFTWARE TRAP interrupt routine
3FF0 F2                2836             PUSHF                  ;disable interrupts and clear flags
3FF1 D7FE              2837  TRAP_LOOP: JNE  TRAP_LOOP         ;loop
                       2838
                       2839  ; ****** END SOFTWARE TRAP INTERRUPT ROUTINE ********
                       2840
                       2841  ;********************** END INTERRUPT ROUTINES **************************
                       2842
3FF3                   2843             END
```

MCS-96 MACRO ASSEMBLER    THIRTEENTH.A9/                                                02/04/93 10:35:11 P

LOC  OBJECT            STMT     SOURCE STATEMENT

MCS-96 MACRO ASSEMBLER    THIRTEENTH.A9.

SYMBOL TABLE LISTING
--------------------

| N A M E | VALUE | ATTRIBUTES |
|---|---|---|
| AD_HI_BYTE. . . . . . . . . . . . | 0003H | NULL ABS BYTE |
| AD_LO_BYTE. . . . . . . . . . . . | 0002H | NULL ABS BYTE |
| AD_START. . . . . . . . . . . . | 0002H | NULL ABS BYTE |
| ADD_AMBIENT . . . . . . . . . . | 30B1H | CODE ABS ENTRY |
| ALARM . . . . . . . . . . . . . | 2698H | CODE ABS ENTRY |
| ALARM_ENTER . . . . . . . . . . | 255AH | CODE ABS ENTRY |
| ALARM_FLAG. . . . . . . . . . . | 00B3H | NULL ABS BYTE |
| ALARM_SET . . . . . . . . . . . | 00AEH | NULL ABS WORD |
| ALARM_SETH. . . . . . . . . . . | 00AFH | NULL ABS BYTE |
| ALARM_SETL. . . . . . . . . . . | 00AEH | NULL ABS BYTE |
| ALARMH_LIMIT. . . . . . . . . . | 2558H | CODE ABS WORD |
| ALARML_LIMIT. . . . . . . . . . | 2556H | CODE ABS WORD |
| ALL_OFF . . . . . . . . . . . . | 32ACH | CODE ABS ENTRY |
| AMBIENT_75. . . . . . . . . . . | 3008H | CODE ABS WORD |
| AMP_AUTO_BIAS . . . . . . . . . | 2FC6H | CODE ABS ENTRY |
| ANOTHER_100MS . . . . . . . . . | 2FB5H | CODE ABS ENTRY |
| ANOTHER_BITR. . . . . . . . . . | 36C4H | CODE ABS ENTRY |
| ANOTHER_BITW. . . . . . . . . . | 36F2H | CODE ABS ENTRY |
| ANOTHER_BLNK. . . . . . . . . . | 2ECAH | CODE ABS ENTRY |
| ANOTHER_CHR . . . . . . . . . . | 2DC9H | CODE ABS ENTRY |
| ANOTHER_DASH. . . . . . . . . . | 2EB4H | CODE ABS ENTRY |
| ANOTHER_KEY . . . . . . . . . . | 22BFH | CODE ABS ENTRY |
| ASSEMBLE_KEY. . . . . . . . . . | 2668H | CODE ABS ENTRY |
| BAUD_RATE . . . . . . . . . . . | 000EH | NULL ABS BYTE |
| BEEP. . . . . . . . . . . . . . | 376BH | CODE ABS ENTRY |
| BEEP_AND_EX . . . . . . . . . . | 3202H | CODE ABS ENTRY |
| BEEP_DELAY. . . . . . . . . . . | 3798H | CODE ABS ENTRY |
| BIAS_INT. . . . . . . . . . . . | 008CH | NULL ABS WORD |
| BIAS_INTH . . . . . . . . . . . | 008DH | NULL ABS BYTE |
| BIAS_INTL . . . . . . . . . . . | 008CH | NULL ABS BYTE |
| BIAS_RUN_FLAG . . . . . . . . . | 0090H | NULL ABS BYTE |
| BIASW1. . . . . . . . . . . . . | 008EH | NULL ABS WORD |
| BLANK . . . . . . . . . . . . . | 2C4BH | CODE ABS BYTE |
| BLANKS_OK . . . . . . . . . . . | 2E64H | CODE ABS ENTRY |
| CAL_COMP_FLAG . . . . . . . . . | 00B1H | NULL ABS BYTE |
| CAL_INDEX . . . . . . . . . . . | 004EH | NULL ABS WORD |
| CAL_SET . . . . . . . . . . . . | 0066H | NULL ABS WORD |
| CAL2_PRESS. . . . . . . . . . . | 244BH | CODE ABS ENTRY |
| CAL2_PRESSED. . . . . . . . . . | 31A0H | CODE ABS ENTRY |
| CALL_TOGGLE . . . . . . . . . . | 2475H | CODE ABS ENTRY |
| CARRY_SETW. . . . . . . . . . . | 36FBH | CODE ABS ENTRY |
| CL_AND_EXIT . . . . . . . . . . | 2515H | CODE ABS ENTRY |
| CLEAR . . . . . . . . . . . . . | 2C4CH | CODE ABS BYTE |
| CLEAR_ALARM . . . . . . . . . . | 2BEAH | CODE ABS BYTE |
| CLK_HI. . . . . . . . . . . . . | 375FH | CODE ABS ENTRY |
| CLK_LO. . . . . . . . . . . . . | 3753H | CODE ABS ENTRY |
| COLUMN. . . . . . . . . . . . . | 8000H | NULL ABS BYTE |
| CONT_COUNT. . . . . . . . . . . | 3287H | CODE ABS ENTRY |
| CORRECTION. . . . . . . . . . . | 009CH | NULL ABS WORD |
| CTX . . . . . . . . . . . . . . | 2774H | CODE ABS BYTE |
| CYCLE_COUNT . . . . . . . . . . | 0094H | NULL ABS WORD |
| D_10MSEC_M. . . . . . . . . . . | 2FAAH | CODE ABS ENTRY |
| D_10MSEC_MORE . . . . . . . . . | 2FB9H | CODE ABS ENTRY |

MCS-96 MACRO ASSEMBLER    THIRTEENTH.A9                                02/04/93 10:35:11 P

| NAME | VALUE | ATTRIBUTES |
|---|---|---|
| D_3USEC_MORE | 2F7FH | CODE ABS ENTRY |
| D_40USEC | 216FH | CODE ABS ENTRY |
| D_40USEC_M | 2F9BH | CODE ABS ENTRY |
| D_40USEC_MORE | 2F8CH | CODE ABS ENTRY |
| D_BEEP_TIME | 379EH | CODE ABS ENTRY |
| DEC_NULL_CNT | 3149H | CODE ABS ENTRY |
| DECIMAL_HEX | 2F58H | CODE ABS ENTRY |
| DELAY | 00B0H | NULL ABS BYTE |
| DELAY_10MSEC | 2F95H | CODE ABS ENTRY |
| DELAY_2MSEC | 2F86H | CODE ABS ENTRY |
| DELAY_30SEC | 2FA4H | CODE ABS ENTRY |
| DELAY_40USEC | 2F79H | CODE ABS ENTRY |
| DELAY_5USEC | 2F76H | CODE ABS ENTRY |
| DELAY_A_D | 2169H | CODE ABS ENTRY |
| DELAY_CAL | 310DH | CODE ABS ENTRY |
| DIODE_FIL | 0060H | NULL ABS WORD |
| DIODE_INTR | 005EH | NULL ABS WORD |
| DISP_C0 | 287AH | CODE ABS BYTE |
| DISP_C1A | 28BAH | CODE ABS BYTE |
| DISP_C1B | 28FAH | CODE ABS BYTE |
| DISP_C2A | 293AH | CODE ABS BYTE |
| DISP_C2B | 297AH | CODE ABS BYTE |
| DISP_C3A | 29BAH | CODE ABS BYTE |
| DISP_C3B | 29FAH | CODE ABS BYTE |
| DISP_CCM | 2A3AH | CODE ABS BYTE |
| DISP_L1 | 26F2H | CODE ABS BYTE |
| DISP_M1 | 26B2H | CODE ABS BYTE |
| DISP_M0 | 2A7AH | CODE ABS BYTE |
| DISP_M01 | 2B3AH | CODE ABS BYTE |
| DISP_M02 | 2B7AH | CODE ABS BYTE |
| DISP_O2 | 2ABAH | CODE ABS BYTE |
| DISP_O3 | 2AFAH | CODE ABS BYTE |
| DISP_ON | 2C4FH | CODE ABS BYTE |
| DISP_P1 | 2732H | CODE ABS BYTE |
| DISP_SHFT | 2C50H | CODE ABS BYTE |
| DISP_TM | 277AH | CODE ABS BYTE |
| DISP_TMA | 27BAH | CODE ABS BYTE |
| DISP_TMB | 27FAH | CODE ABS BYTE |
| DISP_TMC | 283AH | CODE ABS BYTE |
| DISPLAY_DATA | 8003H | NULL ABS BYTE |
| DISPLAY_MODE | 8002H | NULL ABS BYTE |
| DIVIDEND | 0054H | NULL ABS WORD |
| DIVIDEND_OK | 2F40H | CODE ABS ENTRY |
| E_DATA | 0037H | NULL ABS BYTE |
| E2SB | 0044H | NULL ABS WORD |
| E2SBH | 0045H | NULL ABS BYTE |
| E2SBL | 0044H | NULL ABS BYTE |
| ELSB | 0042H | NULL ABS WORD |
| ELSBH | 0043H | NULL ABS BYTE |
| ELSBL | 0042H | NULL ABS BYTE |
| EMSB | 0046H | NULL ABS WORD |
| EMSBH | 0047H | NULL ABS BYTE |
| EMSBL | 0046H | NULL ABS BYTE |
| END_CAL1_RUN | 3171H | CODE ABS ENTRY |
| END_SCALE | 3099H | CODE ABS ENTRY |
| ENTRY_DATA | 003CH | NULL ABS WORD |

MCS-96 MACRO ASSEMBLER    THIRTEENTH.A9:                                02/04/93 10:35:11

| N A M E | VALUE | ATTRIBUTES |
|---|---|---|
| ENTRY_MODE | 2C4EH | CODE ABS BYTE |
| ENTRY_NUM | 003AH | NULL ABS BYTE |
| ER_STAR | 2D94H | CODE ABS ENTRY |
| ERASE_ALARM | 2D49H | CODE ABS ENTRY |
| ERASE_RUNNING | 2D35H | CODE ABS ENTRY |
| ERASE_STR | 32A6H | CODE ABS ENTRY |
| ERROR | 0066H | NULL ABS WORD |
| ERROR_HIGH | 32E6H | CODE ABS ENTRY |
| EX_CAL1 | 3185H | CODE ABS ENTRY |
| EX_CAL1_NOW | 3104H | CODE ABS ENTRY |
| EX_CAL2_RUN | 3208H | CODE ABS ENTRY |
| EXIT_A_ENTER | 2593H | CODE ABS ENTRY |
| EXIT_ALARM | 26B1H | CODE ABS ENTRY |
| EXIT_BIAS | 2FFBH | CODE ABS ENTRY |
| EXIT_CAL1 | 238DH | CODE ABS ENTRY |
| EXIT_CAL2 | 23B0H | CODE ABS ENTRY |
| EXIT_CAL3 | 23C7H | CODE ABS ENTRY |
| EXIT_FMT_C3 | 2F08H | CODE ABS ENTRY |
| EXIT_FORMAT | 2F2BH | CODE ABS ENTRY |
| EXIT_LOCK | 2338H | CODE ABS ENTRY |
| EXIT_M_DOWN | 25D4H | CODE ABS ENTRY |
| EXIT_M_ENTER | 2555H | CODE ABS ENTRY |
| EXIT_M_LEFT | 25A5H | CODE ABS ENTRY |
| EXIT_M_UP | 25C1H | CODE ABS ENTRY |
| EXIT_MODE | 2518H | CODE ABS ENTRY |
| EXIT_OPTM | 262EH | CODE ABS ENTRY |
| EXIT_REFRESH | 21F8H | CODE ABS ENTRY |
| EXIT_T1_SERV | 2141H | CODE ABS ENTRY |
| EXIT_TEMP | 34F5H | CODE ABS ENTRY |
| EXIT_TIPBK | 3458H | CODE ABS ENTRY |
| EXIT_TIPWK | 35FFH | CODE ABS ENTRY |
| EXIT_X_ENTER | 230FH | CODE ABS ENTRY |
| FILTER_TC | 21F9H | CODE ABS ENTRY |
| FIRST_C1 | 2430H | CODE ABS ENTRY |
| FIRST_C2 | 2441H | CODE ABS ENTRY |
| FIRST_CAL_1 | 30D2H | CODE ABS ENTRY |
| FIRST_CAL_2 | 3186H | CODE ABS ENTRY |
| FORMAT_C1_L2 | 2EE2H | CODE ABS ENTRY |
| FORMAT_C1_L3 | 2EE8H | CODE ABS ENTRY |
| FORMAT_C1_L4 | 2EEEH | CODE ABS ENTRY |
| FORMAT_C2_L3 | 2EF4H | CODE ABS ENTRY |
| FORMAT_C2_L4 | 2EFAH | CODE ABS ENTRY |
| FORMAT_C3_L4 | 2F00H | CODE ABS ENTRY |
| FORMAT_C3_OK | 2F06H | CODE ABS ENTRY |
| FORMAT_M1_L2 | 2ED6H | CODE ABS ENTRY |
| FORMAT_M1_L3 | 2EDCH | CODE ABS ENTRY |
| FORMAT_M02_L2 | 2F09H | CODE ABS ENTRY |
| FORMAT_M02_L4 | 2F0FH | CODE ABS ENTRY |
| FORMAT_MX_LX | 2F15H | CODE ABS ENTRY |
| FUNCTION | 2C51H | CODE ABS BYTE |
| GET_A_D_4 | 2212H | CODE ABS ENTRY |
| GET_A_D_5 | 2221H | CODE ABS ENTRY |
| GET_A_D_6 | 223FH | CODE ABS ENTRY |
| GET_A_D_7 | 224EH | CODE ABS ENTRY |
| H_LIMIT | 251CH | CODE ABS WORD |
| HEATER_CNTL | 320BH | CODE ABS ENTRY |

MCS-96 MACRO ASSEMBLER    THIRTEENTH.A9/                                02/04/93 10:35:11 P

| N A M E | VALUE | ATTRIBUTES |
|---|---|---|
| HEATER_COUNT | 3276H | CODE ABS ENTRY |
| HEX_ASCII | 2683H | CODE ABS BYTE |
| HEX_DATA | 0092H | NULL ABS WORD |
| HEX_TO_DEC | 2F2CH | CODE ABS ENTRY |
| HOME | 2C4DH | CODE ABS BYTE |
| HPX | 2772H | CODE ABS BYTE |
| HSI_MODE | 0003H | NULL ABS BYTE |
| HSI_STATUS | 0006H | NULL ABS BYTE |
| HSI_TIME | 0004H | NULL ABS WORD |
| HSO_MODE | 0006H | NULL ABS BYTE |
| HSO_TIME | 0004H | NULL ABS WORD |
| HTR_CONTROL | 326FH | CODE ABS ENTRY |
| HTR_PERCENT | 0096H | NULL ABS WORD |
| HX0A | 0050H | NULL ABS WORD |
| HX64 | 0052H | NULL ABS WORD |
| INDEXB1 | 0034H | NULL ABS BYTE |
| INIT | 33BDH | CODE ABS ENTRY |
| INIT_DISP | 2DBFH | CODE ABS ENTRY |
| INIT_DISP_C0 | 2CC9H | CODE ABS ENTRY |
| INIT_DISP_C1A | 2CD0H | CODE ABS ENTRY |
| INIT_DISP_C1B | 2CD7H | CODE ABS ENTRY |
| INIT_DISP_C2A | 2CDEH | CODE ABS ENTRY |
| INIT_DISP_C2B | 2CE5H | CODE ABS ENTRY |
| INIT_DISP_C3A | 2CECH | CODE ABS ENTRY |
| INIT_DISP_C3B | 2CF3H | CODE ABS ENTRY |
| INIT_DISP_CCN | 2CFAH | CODE ABS ENTRY |
| INIT_DISP_DX | 2DAAH | CODE ABS ENTRY |
| INIT_DISP_L1 | 2CB4H | CODE ABS ENTRY |
| INIT_DISP_M1 | 2CADH | CODE ABS ENTRY |
| INIT_DISP_MD | 2C52H | CODE ABS ENTRY |
| INIT_DISP_M0 | 2D01H | CODE ABS ENTRY |
| INIT_DISP_M01 | 2D08H | CODE ABS ENTRY |
| INIT_DISP_M02 | 2D0FH | CODE ABS ENTRY |
| INIT_DISP_02 | 2D16H | CODE ABS ENTRY |
| INIT_DISP_03 | 2D1DH | CODE ABS ENTRY |
| INIT_DISP_P1 | 2CBBH | CODE ABS ENTRY |
| INIT_DISP_TM | 2CC2H | CODE ABS ENTRY |
| INIT_DISP_TMA | 2D24H | CODE ABS ENTRY |
| INIT_TC | 33C0H | CODE ABS ENTRY |
| INIT_TEMP | 3323H | CODE ABS ENTRY |
| INIT_TIP | 3367H | CODE ABS ENTRY |
| INIT_TIP_NUM | 3311H | CODE ABS ENTRY |
| INITT | 3364H | CODE ABS ENTRY |
| INITTN | 330EH | CODE ABS ENTRY |
| INITTT | 3320H | CODE ABS ENTRY |
| INT_EXTERNAL | 200EH | NULL ABS WORD |
| INT_HISPEED | 2006H | NULL ABS WORD |
| INT_HSI_AVAL | 2004H | NULL ABS WORD |
| INT_HSIO | 2008H | NULL ABS WORD |
| INT_MASK | 0008H | NULL ABS BYTE |
| INT_PENDING | 0009H | NULL ABS BYTE |
| INT_SERIAL | 200CH | NULL ABS WORD |
| INT_SOFTWARE | 2010H | NULL ABS WORD |
| INT_TIMERS | 200AH | NULL ABS WORD |
| INT_VEC_AD | 2002H | NULL ABS WORD |
| INT_VEC_TIMER | 2000H | NULL ABS WORD |

MCS-96 MACRO ASSEMBLER    THIRTEENTH.A9                                    02/04/93 10:35:11 P

```
     N A M E                      VALUE     ATTRIBUTES

IOC0. . . . . . . . . . . . . . . 0015H     NULL ABS BYTE
IOC1. . . . . . . . . . . . . . . 0016H     NULL ABS BYTE
IOS0. . . . . . . . . . . . . . . 0015H     NULL ABS BYTE
IOS1. . . . . . . . . . . . . . . 0016H     NULL ABS BYTE
IS_CAL_COMP . . . . . . . . . .   21A3H     CODE ABS ENTRY
IS_CAL_COMP2. . . . . . . . . .   21BFH     CODE ABS ENTRY
J_TEST_PRE_SEL. . . . . . . . .   2347H     CODE ABS ENTRY
KEY . . . . . . . . . . . . . .   003BH     NULL ABS BYTE
KEY_PREVIOUS. . . . . . . . . .   0035H     NULL ABS BYTE
KEYB_SERVICE. . . . . . . . . .   229BH     CODE ABS ENTRY
KEYX. . . . . . . . . . . . . .   2287H     CODE ABS BYTE
L_LIMIT . . . . . . . . . . . .   251AH     CODE ABS WORD
LESS_THAN_40. . . . . . . . . .   3234H     CODE ABS ENTRY
LIMITS_OK . . . . . . . . . . .   313AH     CODE ABS ENTRY
LTX . . . . . . . . . . . . . .   2778H     CODE ABS BYTE
LUX . . . . . . . . . . . . . .   2776H     CODE ABS BYTE
MAIN_DOWN . . . . . . . . . . .   25C2H     CODE ABS ENTRY
MAIN_ENTER. . . . . . . . . . .   251EH     CODE ABS ENTRY
MAIN_ESCAPE . . . . . . . . . .   25D5H     CODE ABS ENTRY
MAIN_LEFT . . . . . . . . . . .   2594H     CODE ABS ENTRY
MAIN_OUT. . . . . . . . . . . .   0040H     NULL ABS WORD
MAIN_OUT_TEMP . . . . . . . . .   0098H     NULL ABS WORD
MAIN_SET. . . . . . . . . . . .   003EH     NULL ABS WORD
MAIN_SETH . . . . . . . . . . .   003FH     NULL ABS BYTE
MAIN_SETL . . . . . . . . . . .   003EH     NULL ABS BYTE
MAIN_UP . . . . . . . . . . . .   25A6H     CODE ABS ENTRY
M03_OFF . . . . . . . . . . . .   2C0AH     CODE ABS BYTE
M03_ON. . . . . . . . . . . . .   2C1AH     CODE ABS BYTE
M04_OFF . . . . . . . . . . . .   2C2AH     CODE ABS BYTE
M04_ON. . . . . . . . . . . . .   2C3AH     CODE ABS BYTE
MODE_SELECT . . . . . . . . . .   22F1H     CODE ABS ENTRY
MODE_STATUS . . . . . . . . . .   0038H     NULL ABS BYTE
MORE_BEEP . . . . . . . . . . .   3772H     CODE ABS ENTRY
MORE_CAL. . . . . . . . . . . .   3112H     CODE ABS ENTRY
MORE_CAL_2. . . . . . . . . . .   244EH     CODE ABS ENTRY
MORE_NVRW . . . . . . . . . . .   36FDH     CODE ABS ENTRY
NEW_KEY_FLAG. . . . . . . . . .   0036H     NULL ABS BYTE
NEXT_COLUMN . . . . . . . . . .   22A5H     CODE ABS ENTRY
NEXT_LIMIT. . . . . . . . . . .   3130H     CODE ABS ENTRY
NEXT_OPTION1. . . . . . . . . .   24C6H     CODE ABS ENTRY
NEXT_OPTION2. . . . . . . . . .   24CFH     CODE ABS ENTRY
NEXT_OPTION3. . . . . . . . . .   24D8H     CODE ABS ENTRY
NEXT_ROW. . . . . . . . . . . .   22ADH     CODE ABS ENTRY
NEXT_SP1. . . . . . . . . . . .   314EH     CODE ABS ENTRY
NEXT_SP2. . . . . . . . . . . .   31D5H     CODE ABS ENTRY
NO_ASSEMBLE . . . . . . . . . .   2682H     CODE ABS ENTRY
NO_BLANKS . . . . . . . . . . .   2ED5H     CODE ABS ENTRY
NO_CAL. . . . . . . . . . . . .   2614H     CODE ABS ENTRY
NO_DASHES . . . . . . . . . . .   2EBFH     CODE ABS ENTRY
NO_LOCK . . . . . . . . . . . .   25EBH     CODE ABS ENTRY
NO_NEW_KEY. . . . . . . . . . .   22EDH     CODE ABS ENTRY
NO_NULL . . . . . . . . . . . .   3126H     CODE ABS ENTRY
NO_PRE_SEL. . . . . . . . . . .   25F2H     CODE ABS ENTRY
NO_TEMP_OUT . . . . . . . . . .   32ECH     CODE ABS ENTRY
NO_TIP_MEM. . . . . . . . . . .   25F9H     CODE ABS ENTRY
NOT_COMPLETE. . . . . . . . . .   3300H     CODE ABS ENTRY
```

MCS-96 MACRO ASSEMBLER    THIRTEENTH.A9/                                              02/04/93 10:35:11 P

| N A M E | VALUE | ATTRIBUTES |
|---|---|---|
| NO1_IN_MAIN1 | 240FH | CODE ABS ENTRY |
| NOT_IN_MAIN2 | 241DH | CODE ABS ENTRY |
| NUM_OF_DIG | 0039H | NULL ABS BYTE |
| OFF | 2BFAH | CODE ABS BYTE |
| OFF_CYCLE | 32AEH | CODE ABS ENTRY |
| OUTPUT_CAL | 30A6H | CODE ABS ENTRY |
| OVER_48 | 325EH | CODE ABS ENTRY |
| PORT0 | 000EH | NULL ABS BYTE |
| PORT1 | 000FH | NULL ABS BYTE |
| PORT2 | 0010H | NULL ABS BYTE |
| POSITIVE | 322AH | CODE ABS ENTRY |
| POWER | 009EH | NULL ABS WORD |
| POWER_FLAG | 006CH | NULL ABS BYTE |
| POWER_INT | 00A0H | NULL ABS WORD |
| POWER_OFF | 2190H | CODE ABS ENTRY |
| POWER_ON | 24BEH | CODE ABS ENTRY |
| POWER_ON2 | 2628H | CODE ABS ENTRY |
| POWERH | 009FH | NULL ABS BYTE |
| POWERL | 009EH | NULL ABS BYTE |
| PRESS_CAL | 2BCAH | CODE ABS BYTE |
| PWM_CONTROL | 0017H | NULL ABS BYTE |
| QUOTIENT | 0054H | NULL ABS BYTE |
| RD | 3741H | CODE ABS ENTRY |
| RD_NVR_ALARM | 354EH | CODE ABS ENTRY |
| RD_NVR_BIAS | 33D1H | CODE ABS ENTRY |
| RD_NVR_SET | 353CH | CODE ABS ENTRY |
| RD_NVR_TCK | 33DFH | CODE ABS ENTRY |
| RD_NVR_TEMP | 34D4H | CODE ABS ENTRY |
| RD_NVR_TEMP1 | 34F6H | CODE ABS ENTRY |
| RD_NVR_TEMP2 | 3508H | CODE ABS ENTRY |
| RD_NVR_TEMP3 | 351AH | CODE ABS ENTRY |
| RD_NVR_TEMP4 | 352CH | CODE ABS ENTRY |
| RD_NVR_TEMPN | 34C9H | CODE ABS ENTRY |
| RD_NVR_TIP | 3437H | CODE ABS ENTRY |
| RD_NVR_TIP1 | 3464H | CODE ABS ENTRY |
| RD_NVR_TIP2 | 346CH | CODE ABS ENTRY |
| RD_NVR_TIP3 | 3474H | CODE ABS ENTRY |
| RD_NVR_TIP4 | 347CH | CODE ABS ENTRY |
| RD_NVR_TIPN | 3459H | CODE ABS ENTRY |
| RD_NVR_TIPX | 3484H | CODE ABS ENTRY |
| RD_NVR_X | 3560H | CODE ABS ENTRY |
| RD_ZERO | 3750H | CODE ABS ENTRY |
| READ_AGAINW | 3705H | CODE ABS ENTRY |
| REFRESH_CAL1 | 2194H | CODE ABS ENTRY |
| REFRESH_CAL2 | 21B0H | CODE ABS ENTRY |
| REFRESH_CAL3 | 21C9H | CODE ABS ENTRY |
| REFRESH_DISP | 2179H | CODE ABS ENTRY |
| REFRESH_M1 | 217EH | CODE ABS ENTRY |
| REFRESH_M01 | 21D8H | CODE ABS ENTRY |
| REFRESH_M02 | 21EAH | CODE ABS ENTRY |
| REFSH_C1_NOW | 21A9H | CODE ABS ENTRY |
| REFSH_C2_NOW | 21C5H | CODE ABS ENTRY |
| REFSH_C3_NOW | 21D4H | CODE ABS ENTRY |
| REMAINDER | 0055H | NULL ABS BYTE |
| RETN_ADDRESS | 007CH | NULL ABS WORD |
| RUNNING | 2BBAH | CODE ABS BYTE |

```
MCS-96 MACRO ASSEMBLER    THIRTEENTH.A9                          02/04/93 10:35:11 P

N A M E                     VALUE      ATTRIBUTES

SCALE_AGAIN . . . . . . . . . . .     308EH     CODE ABS ENTRY
    SCALE_INX . . . . . . . . . . . .     002AH     NULL ABS WORD
    SCALE_INX1. . . . . . . . . . . .     002CH     NULL ABS WORD
    SCALE_INX2. . . . . . . . . . . .     002EH     NULL ABS WORD
    SCALE_INX3. . . . . . . . . . . .     0030H     NULL ABS WORD
    SCALE_INX4. . . . . . . . . . . .     0032H     NULL ABS WORD
    SCALE_INXH. . . . . . . . . . . .     002BH     NULL ABS BYTE
    SCALE_INXL. . . . . . . . . . . .     002AH     NULL ABS BYTE
    SCALE_POWER . . . . . . . . . . .     326CH     CODE ABS ENTRY
    SCALE_TC. . . . . . . . . . . . .     3050H     CODE ABS ENTRY
    SCALE_TC_K1 . . . . . . . . . . .     30A7H     CODE ABS ENTRY
    SCALE_TC_KX . . . . . . . . . . .     30C6H     CODE ABS ENTRY
    SCALE_TIP . . . . . . . . . . . .     3016H     CODE ABS ENTRY
    SCALE_TX. . . . . . . . . . . . .     3089H     CODE ABS ENTRY
    SCALEW1 . . . . . . . . . . . . .     0020H     NULL ABS WORD
    SCALEW1H. . . . . . . . . . . . .     0021H     NULL ABS BYTE
    SCALEW1L. . . . . . . . . . . . .     0020H     NULL ABS BYTE
    SCALEW2 . . . . . . . . . . . . .     0022H     NULL ABS WORD
    SCALEW2H. . . . . . . . . . . . .     0023H     NULL ABS BYTE
    SCALEW2L. . . . . . . . . . . . .     0022H     NULL ABS BYTE
    SCALEW3 . . . . . . . . . . . . .     0024H     NULL ABS WORD
    SCALEW3H. . . . . . . . . . . . .     0025H     NULL ABS BYTE
    SCALEW3L. . . . . . . . . . . . .     0024H     NULL ABS BYTE
    SCALEW4 . . . . . . . . . . . . .     0026H     NULL ABS WORD
    SCALEW4H. . . . . . . . . . . . .     0027H     NULL ABS BYTE
    SCALEW4L. . . . . . . . . . . . .     0026H     NULL ABS BYTE
    SCALEW5 . . . . . . . . . . . . .     0028H     NULL ABS WORD
    SCALEW5H. . . . . . . . . . . . .     0029H     NULL ABS BYTE
    SCALEW5L. . . . . . . . . . . . .     0028H     NULL ABS BYTE
    SERIAL_BUFFER . . . . . . . . . .     0007H     NULL ABS BYTE
    SERIAL_CON. . . . . . . . . . . .     0011H     NULL ABS BYTE
    SERIAL_STATUS . . . . . . . . . .     0011H     NULL ABS BYTE
    SET_ALARM . . . . . . . . . . . .     2BDAH     CODE ABS BYTE
    SET_ALARM_FL. . . . . . . . . . .     26AEH     CODE ABS ENTRY
    SET_BIAS_FLAG . . . . . . . . . .     2468H     CODE ABS ENTRY
    SET_CAL . . . . . . . . . . . . .     25FFH     CODE ABS ENTRY
    SET_DELAY . . . . . . . . . . . .     00A6H     NULL ABS WORD
    SET_MAIN. . . . . . . . . . . . .     2652H     CODE ABS ENTRY
    SETN_VALID. . . . . . . . . . . .     3315H     CODE ABS ENTRY
    SHIFT_RD. . . . . . . . . . . . .     36BFH     CODE ABS ENTRY
    SHIFT_WR. . . . . . . . . . . . .     36EFH     CODE ABS ENTRY
    SIXTY_HERTZ . . . . . . . . . . .     2142H     CODE ABS ENTRY
    SP. . . . . . . . . . . . . . . .     0018H     NULL ABS WORD
    STAR. . . . . . . . . . . . . . .     2C4AH     CODE ABS BYTE
    STAR_FLAG . . . . . . . . . . . .     00B2H     NULL ABS BYTE
    START . . . . . . . . . . . . . .     3711H     CODE ABS ENTRY
    START_LOOP. . . . . . . . . . . .     2110H     CODE ABS ENTRY
    STOP. . . . . . . . . . . . . . .     371AH     CODE ABS ENTRY
    SUBT_DIODE. . . . . . . . . . . .     306CH     CODE ABS ENTRY
    T1_SERVICE. . . . . . . . . . . .     2112H     CODE ABS ENTRY
    T2SB. . . . . . . . . . . . . . .     004AH     NULL ABS WORD
    T2SBH . . . . . . . . . . . . . .     004BH     NULL ABS BYTE
    T2SBL . . . . . . . . . . . . . .     004AH     NULL ABS BYTE
    TC_BIAS . . . . . . . . . . . . .     006EH     NULL ABS WORD
    TC_BIASH. . . . . . . . . . . . .     006FH     NULL ABS BYTE
    TC_BIASL. . . . . . . . . . . . .     006EH     NULL ABS BYTE
```

MCS-96 MACRO ASSEMBLER    THIRTEENTH.A9                                                    02/04/93 10:35:11 P

| NAME | VALUE | ATTRIBUTES |
|---|---|---|
| TC_CAL. . . . . . . . . . . . . . . | 31A7H | CODE ABS ENTRY |
| TC_CAL_FLAG . . . . . . . . . . . | 0091H | NULL ABS BYTE |
| TC_DISP . . . . . . . . . . . . . | 00AAH | NULL ABS WORD |
| TC_DISP_INT . . . . . . . . . . . | 00ACH | NULL ABS WORD |
| TC_FIL. . . . . . . . . . . . . . | 007AH | NULL ABS WORD |
| TC_INTR . . . . . . . . . . . . . | 008AH | NULL ABS WORD |
| TC_K1 . . . . . . . . . . . . . . | 0070H | NULL ABS WORD |
| TC_K1H. . . . . . . . . . . . . . | 0071H | NULL ABS BYTE |
| TC_K1L. . . . . . . . . . . . . . | 0070H | NULL ABS BYTE |
| TC_K2 . . . . . . . . . . . . . . | 0072H | NULL ABS WORD |
| TC_K2H. . . . . . . . . . . . . . | 0073H | NULL ABS BYTE |
| TC_K2L. . . . . . . . . . . . . . | 0072H | NULL ABS BYTE |
| TC_K3 . . . . . . . . . . . . . . | 0074H | NULL ABS WORD |
| TC_K3H. . . . . . . . . . . . . . | 0075H | NULL ABS BYTE |
| TC_K3L. . . . . . . . . . . . . . | 0074H | NULL ABS BYTE |
| TC_K4 . . . . . . . . . . . . . . | 0076H | NULL ABS WORD |
| TC_K4H. . . . . . . . . . . . . . | 0077H | NULL ABS BYTE |
| TC_K4L. . . . . . . . . . . . . . | 0076H | NULL ABS BYTE |
| TC_K5 . . . . . . . . . . . . . . | 0078H | NULL ABS WORD |
| TC_K5H. . . . . . . . . . . . . . | 0079H | NULL ABS BYTE |
| TC_K5L. . . . . . . . . . . . . . | 0078H | NULL ABS BYTE |
| TC_OUT. . . . . . . . . . . . . . | 0064H | NULL ABS WORD |
| TC_OUT_OK . . . . . . . . . . . . | 3088H | CODE ABS ENTRY |
| TC_RAW. . . . . . . . . . . . . . | 005AH | NULL ABS WORD |
| TC_RUN_FLAG . . . . . . . . . . . | 006DH | NULL ABS BYTE |
| TC_SQR_COEF . . . . . . . . . . . | 300AH | CODE ABS WORD |
| TC_VALID. . . . . . . . . . . . . | 3374H | CODE ABS ENTRY |
| TEMP_RD_FLAG. . . . . . . . . . . | 006AH | NULL ABS BYTE |
| TEMP_SELECT . . . . . . . . . . . | 00A3H | NULL ABS BYTE |
| TEMPB1. . . . . . . . . . . . . . | 001CH | NULL ABS BYTE |
| TEMPB1LONG. . . . . . . . . . . . | 001CH | NULL ABS WORD |
| TEMPB2. . . . . . . . . . . . . . | 001DH | NULL ABS BYTE |
| TEMPB3. . . . . . . . . . . . . . | 001AH | NULL ABS BYTE |
| TEMPB4. . . . . . . . . . . . . . | 001BH | NULL ABS BYTE |
| TEMPW1. . . . . . . . . . . . . . | 001EH | NULL ABS WORD |
| TEST_40 . . . . . . . . . . . . . | 32F6H | CODE ABS ENTRY |
| TEST_999. . . . . . . . . . . . . | 2F36H | CODE ABS ENTRY |
| TEST_BIAS_F . . . . . . . . . . . | 245FH | CODE ABS ENTRY |
| TEST_CAL. . . . . . . . . . . . . | 241FH | CODE ABS ENTRY |
| TEST_CAL_2. . . . . . . . . . . . | 2435H | CODE ABS ENTRY |
| TEST_CAL_3. . . . . . . . . . . . | 2453H | CODE ABS ENTRY |
| TEST_CAL_SE1. . . . . . . . . . . | 2479H | CODE ABS ENTRY |
| TEST_CAL_SE2. . . . . . . . . . . | 2488H | CODE ABS ENTRY |
| TEST_CAL_SE3. . . . . . . . . . . | 2498H | CODE ABS ENTRY |
| TEST_CAL1_CA. . . . . . . . . . . | 237CH | CODE ABS ENTRY |
| TEST_CAL2_CA. . . . . . . . . . . | 2393H | CODE ABS ENTRY |
| TEST_CAL3_CA. . . . . . . . . . . | 23B6H | CODE ABS ENTRY |
| TEST_DOWN . . . . . . . . . . . . | 2323H | CODE ABS ENTRY |
| TEST_ESCAPE . . . . . . . . . . . | 233AH | CODE ABS ENTRY |
| TEST_LEFT . . . . . . . . . . . . | 2311H | CODE ABS ENTRY |
| TEST_LOCK . . . . . . . . . . . . | 232CH | CODE ABS ENTRY |
| TEST_NO1. . . . . . . . . . . . . | 22FFH | CODE ABS ENTRY |
| TEST_NO2. . . . . . . . . . . . . | 2309H | CODE ABS ENTRY |
| TEST_NEW_KEY. . . . . . . . . . . | 22DBH | CODE ABS ENTRY |
| TEST_NULL . . . . . . . . . . . . | 3120H | CODE ABS ENTRY |
| TEST_NULLT. . . . . . . . . . . . | 3106H | CODE ABS ENTRY |

MCS-96 MACRO ASSEMBLER    THIRTEENTH.A9,                                    02/04/93 10:35:11 P

| NAME | VALUE | ATTRIBUTES |
|---|---|---|
| TEST_OPT............... | 24A5H | CODE ABS ENTRY |
| TEST_OPT_N01........... | 24E1H | CODE ABS ENTRY |
| TEST_OPT_N02........... | 24EFH | CODE ABS ENTRY |
| TEST_OPT_N03........... | 24F8H | CODE ABS ENTRY |
| TEST_OPT_N04........... | 2507H | CODE ABS ENTRY |
| TEST_PRE_SEL........... | 2403H | CODE ABS ENTRY |
| TEST_TC_999............ | 307EH | CODE ABS ENTRY |
| TEST_TC_CAL............ | 23A4H | CODE ABS ENTRY |
| TEST_TIP_MEM........... | 2411H | CODE ABS ENTRY |
| TEST_UF................ | 231AH | CODE ABS ENTRY |
| TESTR_TIP2............. | 3441H | CODE ABS ENTRY |
| TESTR_TIP3............. | 3449H | CODE ABS ENTRY |
| TESTR_TIP4............. | 3451H | CODE ABS ENTRY |
| TESTS_TEMP2............ | 34DEH | CODE ABS ENTRY |
| TESTS_TEMP3............ | 34E6H | CODE ABS ENTRY |
| TESTS_TEMP4............ | 34EEH | CODE ABS ENTRY |
| TESTW_TIP2............. | 35E8H | CODE ABS ENTRY |
| TESTW_TIP3............. | 35F0H | CODE ABS ENTRY |
| TESTW_TIP4............. | 35F8H | CODE ABS ENTRY |
| TIMER1................. | 000AH | NULL ABS WORD |
| TIMER2................. | 000CH | NULL ABS WORD |
| TIP_CAL................ | 30F4H | CODE ABS ENTRY |
| TIP_CAL_NULL........... | 00A8H | NULL ABS WORD |
| TIP_FIL................ | 007EH | NULL ABS WORD |
| TIP_INTR............... | 0058H | NULL ABS WORD |
| TIP_K1................. | 0080H | NULL ABS WORD |
| TIP_K1H................ | 0081H | NULL ABS BYTE |
| TIP_K1L................ | 0080H | NULL ABS BYTE |
| TIP_K2................. | 0082H | NULL ABS WORD |
| TIP_K2H................ | 0083H | NULL ABS BYTE |
| TIP_K2L................ | 0082H | NULL ABS BYTE |
| TIP_K3................. | 0084H | NULL ABS WORD |
| TIP_K3H................ | 0085H | NULL ABS BYTE |
| TIP_K3L................ | 0084H | NULL ABS BYTE |
| TIP_K4................. | 0086H | NULL ABS WORD |
| TIP_K4H................ | 0087H | NULL ABS BYTE |
| TIP_K4L................ | 0086H | NULL ABS BYTE |
| TIP_K5................. | 0088H | NULL ABS WORD |
| TIP_K5H................ | 0089H | NULL ABS BYTE |
| TIP_K5L................ | 0088H | NULL ABS BYTE |
| TIP_OUT................ | 0062H | NULL ABS WORD |
| TIP_RAW................ | 0056H | NULL ABS WORD |
| TIP_RUN_FLAG........... | 006BH | NULL ABS BYTE |
| TIP_SELECT............. | 00A2H | NULL ABS BYTE |
| TIP_SQR_COEF........... | 3014H | CODE ABS WORD |
| TIP_TEMP............... | 009AH | NULL ABS WORD |
| TIP_TEMP_0............. | 300CH | CODE ABS WORD |
| TIP_TEMP_1............. | 300EH | CODE ABS WORD |
| TIP_TEMP_2............. | 3010H | CODE ABS WORD |
| TIP_TEMP_3............. | 3012H | CODE ABS WORD |
| TIPF_OUT............... | 00A4H | NULL ABS WORD |
| TIPK_VALID............. | 3327H | CODE ABS ENTRY |
| TIPH_VALID............. | 3303H | CODE ABS ENTRY |
| TLSB................... | 0048H | NULL ABS WORD |
| TLSBH.................. | 0049H | NULL ABS BYTE |
| TLSBL.................. | 0048H | NULL ABS BYTE |

MCS-96 MACRO ASSEMBLER    THIRTEENTH.A9.                                    02/04/93 10:35:11

| N A M E | VALUE | ATTRIBUTES |
|---|---|---|
| TMSB. | 004CH | NULL ABS WORD |
| TMSBH | 004DH | NULL ABS BYTE |
| TMSBL | 004CH | NULL ABS BYTE |
| TOGGLE_CAL. | 25FAH | CODE ABS ENTRY |
| TOGGLE_LOCK | 25E5H | CODE ABS ENTRY |
| TOGGLE_MO1. | 2644H | CODE ABS ENTRY |
| TOGGLE_MO2. | 264BH | CODE ABS ENTRY |
| TOGGLE_OPTL | 262FH | CODE ABS ENTRY |
| TOGGLE_OPTM | 2615H | CODE ABS ENTRY |
| TOGGLE_OPTP | 2636H | CODE ABS ENTRY |
| TOGGLE_PRE_S. | 25ECH | CODE ABS ENTRY |
| TOGGLE_TM | 25F3H | CODE ABS ENTRY |
| TOGGLE_TMA. | 263DH | CODE ABS ENTRY |
| TRAP_LOOP | 3FF1H | CODE ABS ENTRY |
| TST_CA_CAL_M. | 2367H | CODE ABS ENTRY |
| TST_CA_LOCK | 2349H | CODE ABS ENTRY |
| TST_CA_PRE_S. | 2353H | CODE ABS ENTRY |
| TST_CA_TIP_M. | 235DH | CODE ABS ENTRY |
| TST_MO1 | 23F1H | CODE ABS ENTRY |
| TST_MO2 | 23FAH | CODE ABS ENTRY |
| TST_OPTL. | 23D6H | CODE ABS ENTRY |
| TST_OPTM. | 23CDH | CODE ABS ENTRY |
| TST_OPTP. | 23DFH | CODE ABS ENTRY |
| TST_TEMP_0. | 2FFCH | CODE ABS WORD |
| TST_TEMP_1. | 2FFEH | CODE ABS WORD |
| TST_TEMP_2. | 3000H | CODE ABS WORD |
| TST_TEMP_3. | 3002H | CODE ABS WORD |
| TST_TEMP_4. | 3004H | CODE ABS WORD |
| TST_TEMP_5. | 3006H | CODE ABS WORD |
| TST_TMA | 23E6H | CODE ABS ENTRY |
| VAR_DELAY | 2FE3H | CODE ABS ENTRY |
| VCC_RAW | 005CH | NULL ABS WORD |
| WAIT_FOR_RDY. | 2278H | CODE ABS ENTRY |
| WATCHDOG. | 000AH | NULL ABS BYTE |
| WR_0. | 3723H | CODE ABS ENTRY |
| WR_1. | 3732H | CODE ABS ENTRY |
| WR_C1_L2. | 2DF7H | CODE ABS ENTRY |
| WR_C1_L3. | 2DFFH | CODE ABS ENTRY |
| WR_C1_L4. | 2E07H | CODE ABS ENTRY |
| WR_C2_L3. | 2E0FH | CODE ABS ENTRY |
| WR_C2_L4. | 2E17H | CODE ABS ENTRY |
| WR_C3_L4. | 2E1FH | CODE ABS ENTRY |
| WR_CHR_NOW. | 2D98H | CODE ABS ENTRY |
| WR_M1_L1. | 2DD8H | CODE ABS ENTRY |
| WR_M1_L2. | 2DE7H | CODE ABS ENTRY |
| WR_M1_L3. | 2DEFH | CODE ABS ENTRY |
| WR_MO2_L2 | 2E27H | CODE ABS ENTRY |
| WR_MO2_L3 | 2E2FH | CODE ABS ENTRY |
| WR_MO2_L4 | 2E3EH | CODE ABS ENTRY |
| WR_MX_LX. | 2E46H | CODE ABS ENTRY |
| WR_NVR_ALARM. | 36ADH | CODE ABS ENTRY |
| WR_NVR_BIAS | 357BH | CODE ABS ENTRY |
| WR_NVR_SET. | 369BH | CODE ABS ENTRY |
| WR_NVR_TCX. | 3586H | CODE ABS ENTRY |
| WR_NVR_TEMP | 3670H | CODE ABS ENTRY |
| WR_NVR_TEMP1. | 367BH | CODE ABS ENTRY |

```
MCS-96 MACRO ASSEMBLER    THIRTEENTH.A9.                                    02/04/93 10:35:11

N A M E                       VALUE    ATTRIBUTES

WR_NVR_TEMP2. . . . . . . . . 3683H    CODE ABS ENTRY
    WR_NVR_TEMP3. . . . . . . . . 368BH    CODE ABS ENTRY
    WR_NVR_TEMP4. . . . . . . . . 3693H    CODE ABS ENTRY
    WR_NVR_TIP. . . . . . . . . . 3600H    CODE ABS ENTRY
    WR_NVR_TIP1 . . . . . . . . . 360BH    CODE ABS ENTRY
    WR_NVR_TIP2 . . . . . . . . . 3613H    CODE ABS ENTRY
    WR_NVR_TIP3 . . . . . . . . . 361BH    CODE ABS ENTRY
    WR_NVR_TIP4 . . . . . . . . . 3623H    CODE ABS ENTRY
    WR_NVR_TIPK . . . . . . . . . 35DEH    CODE ABS ENTRY
    WR_NVR_TIPX . . . . . . . . . 362BH    CODE ABS ENTRY
    WR_NVR_X. . . . . . . . . . . 36D5H    CODE ABS ENTRY
    WR_POWER. . . . . . . . . . . 2E99H    CODE ABS ENTRY
    WRITE_ALARM . . . . . . . . . 2D3FH    CODE ABS ENTRY
    WRITE_M03_OFF . . . . . . . . 2D5DH    CODE ABS ENTRY
    WRITE_M03_ON. . . . . . . . . 2D67H    CODE ABS ENTRY
    WRITE_M04_OFF . . . . . . . . 2D71H    CODE ABS ENTRY
    WRITE_M04_ON. . . . . . . . . 2D7BH    CODE ABS ENTRY
    WRITE_OFF . . . . . . . . . . 2D53H    CODE ABS ENTRY
    WRITE_RUNNING . . . . . . . . 2D2BH    CODE ABS ENTRY
    WRITE_STAR. . . . . . . . . . 2D85H    CODE ABS ENTRY
    ZERO. . . . . . . . . . . . . 0000H    NULL ABS WORD

ASSEMBLY COMPLETED,   NO ERROR(S) FOUND.
```

I claim:

1. A system for setting temperature of a thermo-electric load and automatically maintaining such temperature, comprising:

microcomputer means including program storage means for storing a computer program for controlling the operation of said microcomputer means;

input/output means connected to said microcomputer means;

heater control circuit means operatively connected between a thermoelectric load and said input/output means for electrically heating such load in accordance with a heating control routine of the stored program operating said microcomputer means;

a first temperature sensing circuit means including load sensor means structurally affixed and thermally responsive to such thermoelectric load and having an output connected to said input/output means for providing temperature data signal to said microcomputer for feeding-back temperature to said microcomputer;

user data entry means connected to said input/output means of said microcomputer for causing user-selected temperature set point data to be loaded into said microcomputer and stored, and said computer program including a temperature control routine means for causing the thermoelectric load to be heated by said heater control circuit means to said temperature selected by said user-entered set point data;

a second temperature sensing means including a multipurpose external thermocouple temperature probe separate from said load sensor means and a thermocouple amplifier means connecting said external thermocouple temperature probe to said input/output means of said microcomputer means, and wherein the user selected calibration routine of the program storage means has means for calibrating said thermocouple amplifier means so that a true output voltage of said thermocouple temperature probe is read by said microcomputer means and means for calibrating said load sensor of said first temperature sensing means to said external thermocouple temperature probe of said sensing means; and said program storage means of said microcomputer means having a user-selected calibration routine selected by said user data entry means for automatically calibrating said temperature sensing circuit means.

2. In the system of claim 1, said thermocouple amplifier having variable bias means comprising a pulse width modulated output means of said microcomputer means, and the stored computer program including an amplifier bias calibration routine means for controlling the percentage of pulse width modulation of said pulse width modulation output means to adjust a bias of said thermocouple amplifier means.

3. The system of claim 1, wherein the stored computer program for said microcomputer means includes internal interrupt means for interrupting processing by said microcomputer means at predetermined repetitive time intervals, and further comprising display means for displaying operating conditions and settings of said system and keypad means for accepting user entries of temperature set points and operating commands, said timed internal interrupt means including a display update routine means and keypad polling routine means for respectively updating the display means with current operating conditions and settings and polling the keypad means for user entries during each of the timed internal interrupts.

4. The system of claim 3, wherein the stored computer program comprises calibration routine means, and said keypad means has a user selectable calibration entry key for selecting said calibration routine means by said microcomputer means.

5. The system of claim 4 wherein said calibration routine means of the computer program comprises:

thermocouple calibration routine means for calibrating said external thermocouple probe connected to said microcomputer means in accordance with a plurality of reference temperatures;

thermocouple amplifier bias calibration routine means for calibrating gain of said thermocouple amplifier means to remove amplifier gain offsets and ambient temperature errors; and sensor calibration routine means for calibrating said load sensor means disposed with said thermoelectric load to temperatures measured by said external thermocouple temperature probe.

6. The apparatus of claim 5, further comprising ambient temperature error correction means including a diode mounted on said apparatus and an ambient temperature sensing amplifier connected to said diode having an analog signal output connected to said input/output means of said microcomputer means for supplying said microcomputer means with ambient temperature correction data signal.

7. A microcomputer based soldering iron heating, temperature control and calibration apparatus, comprising:

a housing;

microcontroller means and program storage means mounted within said housing, and a computer program for operating said microcontroller means in accordance therewith;

input/output means for said microcontroller means;

digital display means supportively mounted on said housing and coupled through input/output means to said microcomputer means for displaying to a user the settings and operating conditions of said apparatus;

keypad means supportively mounted on said housing for accepting user entries of temperature set point data and calling up calibration routines; and wherein the stored computer program for said microcontroller means includes internal interrupt means for interrupting processing by said microcontroller means at predetermined repetitive time intervals, said timed internal interrupt means including a display update routine means and keypad polling routine means for respectively updating said display means with current operating conditions and settings and polling the keypad means for user entries during each of the timed internal interrupts.

8. The apparatus of claim 7, wherein said soldering iron comprises an electrically energized heater element in thermocommunication with a soldering tip, and a temperature sensing element also in thermocommunication with said soldering iron tip, said heater element and said temperature sensing element having electrical leads connected by cable means to said housing; heater control circuit means connected to said leads from said heater element; temperature sensing circuit means connected to said leads from said temperature sensing element; said heater control circuit means and said temperature sensing circuit means coupled by input/output means to said microcontroller means; said program having temperature selection routine means for accepting and storing temperature set points by user entry keys and a temperature control routine for causing the heating of said heater element means by said heater control circuit means and said microcontroller means to cause the tip of said soldering iron as measured by said temperature sensor means to assume a user-selected temperature entered on said keypad means and displayed by said display means in accordance with the stored program.

9. The apparatus of claim 7, wherein said stored program means has a lock code routine means for locking out changes to temperature set points stored in said microcontroller means, said lock code routine means including keyboard entry release means responsive to entering a predetermined lock code on said keypad means to allow changing of said temperature set points.

10. The apparatus of claim 7, wherein said heater control circuit means comprises a solid state switching circuit means and a source of alternating current for resistive heating of said heater element, and wherein said microcontroller means operating according to the computer program causes said heater control circuit means to connect one or more full cycles of alternating current across said thermoelectric load at a controlled duty cycle.

11. The apparatus of claim 10, said microcontroller having program routine means for causing said display means to display said duty cycle.

12. The apparatus of claim 10, wherein said microcontroller means has an external interrupt mode, and further comprising zero crossing detector means coupled to the alternating current source for detecting a zero crossing of an alternating current waveform, said zero crossing detection circuit means causing said microcontroller means to jump to said external interrupt mode in response to the detection of a zero crossing of said alternating current waveform, and wherein said computer program includes an external interrupt program routine for causing said heater control circuit means to switch one or more full cycles of the alternating current across said heater element.

13. The apparatus of claim 7, further comprising an external thermocouple temperature probe and a thermocouple amplifier means connecting said external thermocouple temperature probe to said input/output means of said microcontroller means, and wherein the stored computer program includes a calibration routine having means for calibrating said thermocouple amplifier means so that a true output voltage of said thermocouple temperature probe is entered into said microcontroller means.

14. The apparatus of claim 7, wherein the stored computer program comprises calibration routine means, and said keypad means has a user selectable calibration entry key for selecting said calibration routine means by said microcontroller means.

15. The apparatus of claim 14, wherein said calibration routine means of the computer program comprises:

thermocouple calibration routine means for calibrating an external thermocouple probe connected to said microcontroller means in accordance with a plurality of reference temperatures;

thermocouple amplifier bias calibration routine means for calibrating gain of a thermocouple amplifier to remove inherent offset from amplifier gain; and sensor calibration routine means for calibrating output from a sensor disposed proximate said heater element to temperatures measured by said thermocouple temperature sensor means.

16. The apparatus of claim 15, further comprising ambient temperature error correction means including a diode mounted on said apparatus and an ambient temperature sensing amplifier connected to said diode having an analog signal output connected to said input/output means of said microcontroller means for sending to said microcontroller means an ambient temperature correction data signal.

17. A method of controlling a soldering iron comprising:

measuring temperature of components proximate a soldering point by a separate thermocouple temperature sensor probe interfaced to a programmed microcontroller and operating said microcontroller so as to concurrently measure and display probe detected temperature while regulating the temperature of the soldering iron by means of a separate temperature sensor element built in to the soldering iron to a user entered temperature set point, whereby the safe temperature level of critical electronic components can be monitored by said external thermocouple probe and displayed on said digital display means simultaneously with the control of the temperature of said soldering iron via the separate temperature sensor element in the iron.

* * * * *